United States Patent
Umeda et al.

(10) Patent No.: US 7,218,367 B2
(45) Date of Patent: May 15, 2007

(54) OPTICAL COMPENSATION SHEET AND LIQUID CRYSTAL DISPLAY

(75) Inventors: Hiroki Umeda, Hino (JP); Noriyasu Kuzuhara, Hino (JP); Nobuo Kubo, Hino (JP); Sota Kawakami, Hino (JP); Nobuyuki Takiyama, Hino (JP); Koji Tasaka, Hino (JP)

(73) Assignee: Konica Corporation, Tokyo (JP)

( * ) Notice: Subject to any disclaimer, the term of this patent is extended or adjusted under 35 U.S.C. 154(b) by 656 days.

(21) Appl. No.: 09/819,800

(22) Filed: Mar. 29, 2001

(65) Prior Publication Data

US 2003/0067572 A1    Apr. 10, 2003

(30) Foreign Application Priority Data

Apr. 3, 2000 (JP) ............................. 2000/100677
Nov. 13, 2000 (JP) ............................. 2000/345352

(51) Int. Cl.
*G02F 1/1335* (2006.01)
(52) U.S. Cl. ................. 349/119; 349/120; 349/121
(58) Field of Classification Search ............... 349/117, 349/118, 119–121
See application file for complete search history.

(56) References Cited

U.S. PATENT DOCUMENTS 5,196,953 A * 3/1993 Yeh et al. ................... 349/119
5,646,703 A * 7/1997 Kamada et al. ............. 349/118
5,694,187 A * 12/1997 Abileah et al. ............. 349/120
5,805,253 A * 9/1998 Mori et al. ................. 349/118

(Continued)

FOREIGN PATENT DOCUMENTS

EP    0 887 691 A2    12/1998

(Continued)

OTHER PUBLICATIONS

P. van de Witte et al., Novel Compensation Foils for Active-Matrix TN Displays (SID 97 Digest at pp. 687-688, 690 and 693).*

(Continued)

*Primary Examiner*—Toan Ton
(74) *Attorney, Agent, or Firm*—Finnegan, Henderson, Farabow, Garrett & Dunner, L.L.P.

(57) ABSTRACT

An optical compensation sheet comprising at least two optically anisotropic layers each formed by orienting an optically anisotropic compound, the orientation direction in the optically anisotropic layer plane of the optically anisotropic compound in the two optically anisotropic layers intersecting each other at an angle of from 80 to 100 degrees, wherein, viewing the two layers from one side of the sheet, one of the two layers, when the compound is uniaxial, is oriented so that a first angle of optic axis of the uniaxial optically anisotropic compound to the sheet plane increases continuously or stepwise in the thickness direction of the sheet, or when the compound is biaxial, is oriented so that a second angle of a direction giving maximum refractive index of the biaxial optically anisotropic compound to the sheet plane increases continuously or stepwise in the thickness direction of the sheet, and the other layer, when the compound is uniaxial, is oriented so that the first angle decreases continuously or stepwise in the thickness direction of the sheet, or when the compound is biaxial, is oriented so that the second angle decreases continuously or stepwise in the thickness direction of the sheet.

19 Claims, 36 Drawing Sheets

U.S. PATENT DOCUMENTS

| | | | | |
|---|---|---|---|---|
| 5,895,106 | A * | 4/1999 | VanderPloeg et al. | 349/120 |
| 5,978,055 | A | 11/1999 | Van De Witte et al. | |
| 5,990,997 | A * | 11/1999 | Jones et al. | 349/120 |
| 6,061,113 | A * | 5/2000 | Kawata | 349/117 |
| 6,064,457 | A * | 5/2000 | Aminaka | 349/117 |
| 6,115,095 | A | 9/2000 | Suzuki et al. | |
| 6,400,433 | B1 * | 6/2002 | Arakawa et al. | 349/117 |
| 6,630,973 | B1 * | 10/2003 | Matsuoka et al. | 349/117 |
| 2002/0063828 | A1 * | 5/2002 | Negoro et al. | 349/117 |

FOREIGN PATENT DOCUMENTS

| | | |
|---|---|---|
| EP | 0 926 533 A2 | 6/1999 |
| JP | 56-66826 | 6/1981 |
| JP | 60-60624 | 4/1985 |
| JP | 62-195622 | 8/1987 |
| JP | 63-21381 | 1/1988 |
| JP | 63-96630 | 4/1988 |
| JP | 63-96631 | 4/1988 |
| JP | 02-196219 | 8/1990 |
| JP | 03-83017 | 4/1991 |
| JP | 04-97130 | 3/1992 |
| JP | 06-43457 | 2/1994 |
| JP | 07-146409 | 6/1995 |
| JP | 07-287120 | 10/1995 |
| JP | 07-333430 | 12/1995 |
| JP | 07-333433 | 12/1995 |
| JP | 08-005837 | 1/1996 |
| JP | 08-15681 | 1/1996 |
| JP | 08-027284 | 1/1996 |
| JP | 2640083 | 5/1997 |
| JP | 2641086 | 5/1997 |
| JP | 2692033 | 9/1997 |
| JP | 2692035 | 9/1997 |
| JP | 09-281331 | 10/1997 |
| JP | 2747789 | 2/1998 |
| JP | 2767382 | 4/1998 |
| JP | 10-186356 | 7/1998 |
| JP | 11133408 | 5/1999 |
| JP | 11-246692 | 9/1999 |
| JP | 2000-235117 | 8/2000 |
| WO | WO 98/12584 | 3/1998 |
| WO | WO 01/20392 A1 | 3/2001 |

OTHER PUBLICATIONS

"Ekishou no Kagaku: quarterly publication", Kagaku Sosetsu No. 22 (1994), p. 60-72, edited by Nihon Kagakukai (Gakkai Shuppan center).

S. Chandrasekhar et al., A Thermotropic Biaxial Nematic Liquid Crystal, Mol. Cryst. Liq. Cryst., 1988, vol. 165, pp. 123-130.

D. Demus et al., Handbook of Liquid Crystals, vol. 2B, Low Molecular Weight Liquid Crystals II, pp. 933-943, published by Wiley VCH Co.

Y. Toko et al. "Random Orientation Method for Twisting Orientation by Adding a Chiral agent", J. Appl. Phys. A74 (3), p. 2071, (1993).

Polymer Preprints, Japan vol. 47, No. 11, 1998, pp. 2894-2895.

* cited by examiner

FIG. 13 (a)
FIG. 13 (b)
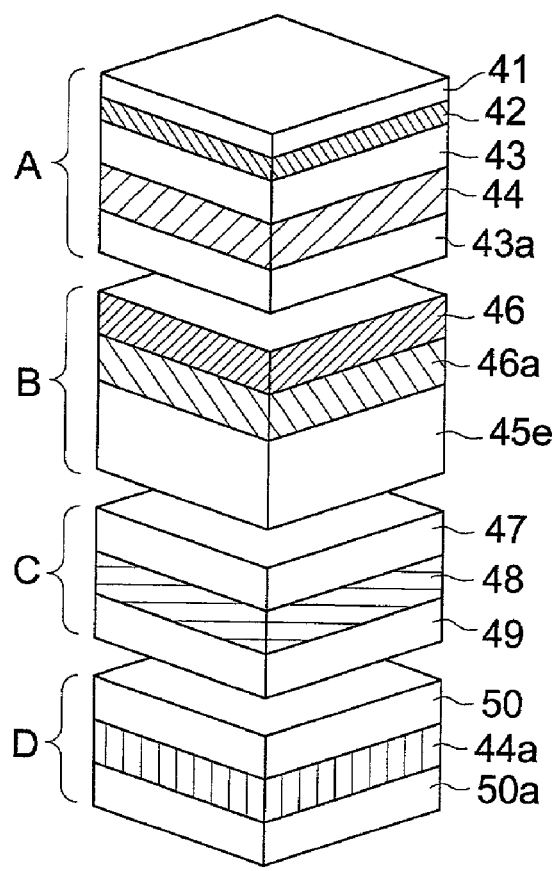
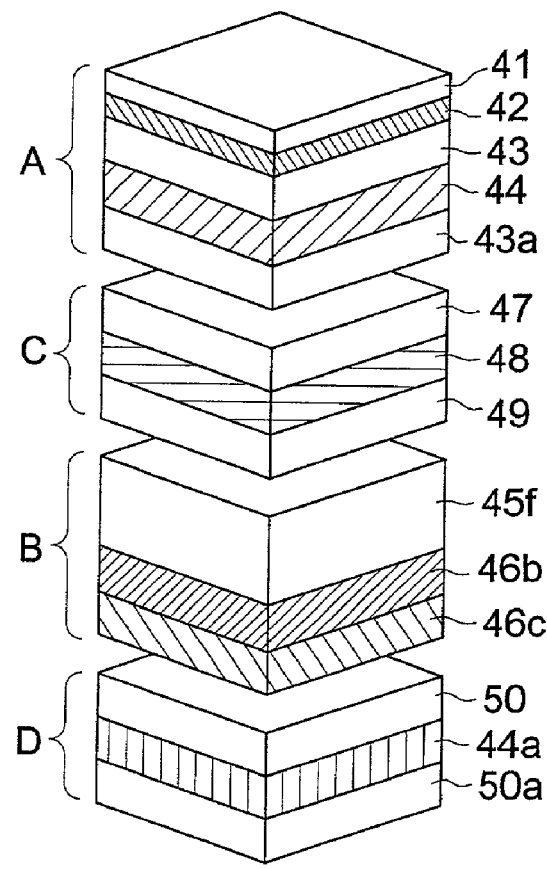

FIG. 14 (a)
FIG. 14 (b)
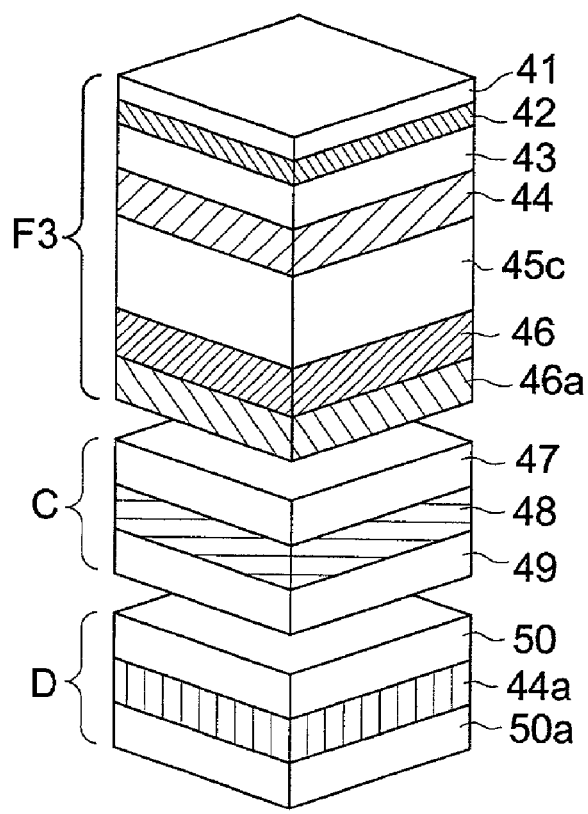
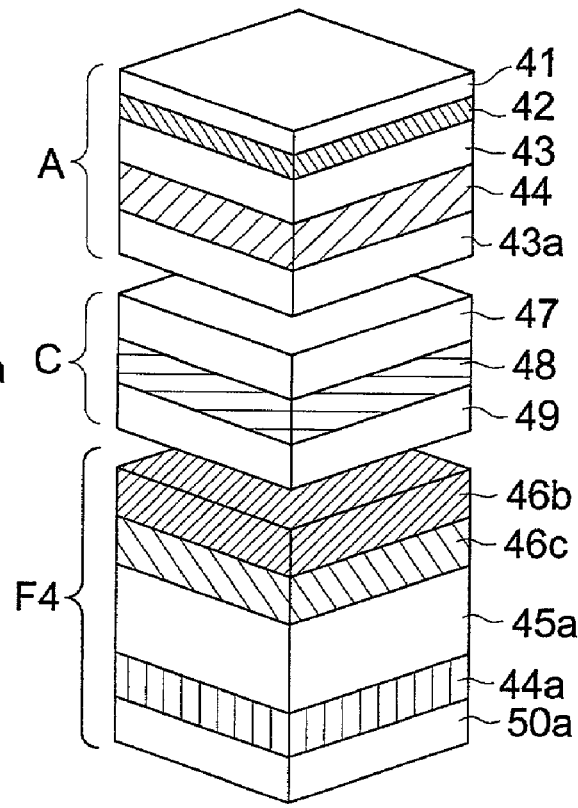

OPTICAL COMPENSATION SHEET AND LIQUID CRYSTAL DISPLAY

FIELD OF THE INVENTION

The present invention relates to an optical compensation sheet and a liquid crystal display.

BACKGROUND OF THE INVENTION

The following examples (or "constitutions") as described below have been proposed as an optical compensation sheet for obtaining a wide viewing angle of a liquid crystal display:

(1) a method providing a discotic liquid crystal compound, which is a negative uniaxial compound, on a support;

(2) a method of providing on a support a nematic polymeric liquid crystal compound with a positive optical anisotropy, which is subjected to hybrid orientation in which the pretilt angle of the liquid crystal molecules varies in the thickness direction; and (3) a method providing on a support two layers containing a nematic liquid crystal compound with a positive optical anisotropy, in which the orientation direction of the layers crosses each other at approximately 90 degrees, so that an optical property approximate to a negative uniaxial optical property is obtained.

However, the above examples (or "constitutions") have the following problems.

Method (1) shows a defect specific to a discotic liquid crystal compound in that, in a TN mode liquid crystal display panel employing the discotic liquid crystal compound, the displayed image appears yellow when viewing the panel obliquely.

In method (1), the temperature developing the liquid crystal is high and therefore orientation cannot be fixed on an isotropic transparent support such as TAC (cellulose triacetate). This requires additional processing, in which a liquid crystal compound is oriented and fixed on a first support and transferred onto a second support such as TAC. Since this processing is more complex, it results in lower productivity.

There is disclosed in, for example, Japanese Patent O.P.I. Publication No. 8-15681, one example of an optically anisotropic layer employing a positive uniaxial low molecular weight liquid crystal compound according to method (3). The example is an optically anisotropic layer comprised of four layers which consist of a first oriented layer having an orientation ability, a rod-shaped, positive uniaxial low molecular weight liquid crystal compound layer, in which the liquid crystal compound is oriented and fixed, provided on the first oriented layer, a second oriented layer having an orientation ability provided on the rod-shaped, positive uniaxial low molecular weight liquid crystal compound layer, and a rod-shaped, positive uniaxial low molecular weight liquid crystal compound layer, in which the liquid crystal compound is oriented and fixed, provided on the second oriented layer. In this example, a property approximate to a disc-shaped compound can be obtained, for example, by arranging the two rod-shaped, liquid crystal compound layers so that the orientation directions in the plane of the two layers cross each other at 90 degrees.

Accordingly, method (3) above is extremely advantageous for use in a liquid crystal TV (television) giving priority to color reproduction, since there is no problem related to a yellowing occurring with the use of a discotic liquid crystal compound.

Although the use of the discotic liquid crystal compound requires only one layer, method (3) requires two liquid crystal compound layers, which results in lower efficiency.

However, the above three methods have a common fundamental problem. They require an optical compensation sheet to be provided on both sides of, for example, a liquid crystal cell in order to achieve optical compensation, resulting in a cost increase. Further, in these methods, the use of one optical compensation sheet destroys symmetry, and results in asymmetry of the viewing angle. For example, when the optical compensation sheet is arranged so that the rubbing axis is rotated 45 degrees, symmetry may be improved but the viewing angle property is not improved. There have been no proposals in which the use of only one, optical compensation sheet improves the viewing angle property to the same degree as or more than the use of two optical compensation sheets;

SUMMARY OF THE INVENTION

An object of the invention is to provide an optical compensation sheet which improves viewing angle properties in a TN type LCD such as TN-TFT, that is, coloration or image reversal phenomenon in a displayed image, when viewing the display obliquely.

Another object of the invention is to provide a liquid crystal display employing the optical compensation sheet, which has a simple structure and improves viewing angle properties.

BRIEF EXPLANATION OF THE DRAWINGS

FIGS. 13(a) and 13(b) show two embodiments of preferable layer structures used in the liquid crystal display of the invention.

FIGS. 14(a) and 14(b) show two embodiments of preferable layer structures used in the liquid crystal display of the invention.

DETAILED DESCRIPTION OF THE INVENTION

Figure 1:
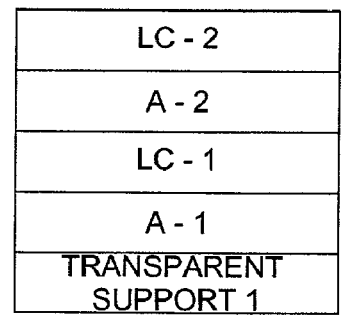
FIG. 1 shows one embodiment of the optical compensation of the invention.

The above problems in the invention can be solved by the following constitutions:

1. An optical compensation sheet comprising at least two optically anisotropic layers each formed by orienting an optically anisotropic compound, the orientation direction in the optically anisotropic layer plane of the optically anisotropic compound in the two optically anisotropic layers intersecting each other at an angle of from 80 to 100 degrees, wherein, viewing the two optically anisotropic layers from one side of the optical compensation sheet, one of the two optically anisotropic layers, when the optically anisotropic compound is uniaxial, is oriented so that a first angle of the optic axis of the uniaxial optically anisotropic compound to the optical compensation sheet plane increases continuously or stepwise in the thickness direction of the optical compensation sheet, or when the optically anisotropic compound is biaxial, is oriented so that a second angle of a direction giving maximum refractive index of the biaxial optically anisotropic compound to the optical compensation sheet plane increases continuously or stepwise in the thickness direction of the optical compensation sheet, and the other optically anisotropic layer, when the optically anisotropic compound is uniaxial, is oriented so that the first angle decreases continuously or stepwise in the thickness direction of the optical compensation sheet, or when the optically anisotropic compound is biaxial, is oriented so that the second angle decreases continuously or stepwise in the thickness direction of the optical compensation sheet.

2. The optical compensation sheet of claim 1, wherein the optically anisotropic compound is a liquid crystal compound.

3. The optical compensation sheet of claim 2, wherein the optically anisotropic compound is a positive uniaxial liquid crystal compound, the at least two optically anisotropic layers each are formed by orienting the positive uniaxial liquid crystal compound, and the orientation direction in the optically anisotropic layer plane of the liquid crystal compound in the two optically anisotropic layers intersects each other at an angle of from 80 to 100 degrees, and wherein, viewing the two optically anisotropic layers from one side of the optical compensation sheet, one of the two optically anisotropic layers is oriented so that the first angle of the optic axis of the liquid crystal compound to the optical compensation sheet plane increases continuously or stepwise in the thickness direction of the optical compensation sheet and the other optically anisotropic layer is oriented so that the first angle decreases continuously or stepwise in the thickness direction of the optical compensation sheet.

4. The optical compensation sheet of claim 2, wherein the optically anisotropic compound is a biaxial liquid crystal compound, the at least two optically anisotropic layers each are formed by orienting the biaxial liquid crystal compound, and the orientation direction in the optically anisotropic layer plane of the liquid crystal compound in the two optically anisotropic layers intersects each other at an angle of from 80 to 100 degrees, and wherein, viewing the two optically anisotropic layers from one side of the optical compensation sheet, one of the two optically anisotropic layers is oriented so that the second angle of a direction giving maximum refractive index of the liquid crystal compound molecule to the optical compensation sheet plane increases continuously or stepwise in the thickness direction of the optical compensation sheet and the other optically anisotropic layer is oriented so that the second angle decreases continuously or stepwise in the thickness direction of the optical compensation sheet.

5. The optical compensation sheet of claim 2, wherein the optically anisotropic compound is a negative uniaxial liquid crystal compound, the at least two optically anisotropic layers each are formed by orienting the negative uniaxial liquid crystal compound, and the orientation direction in the optically anisotropic layer plane of the liquid crystal compound in the two optically anisotropic layers intersects each other at an angle of from 80 to 100 degrees, and wherein, viewing the two optically anisotropic layers from one side of the optical compensation sheet, one of the two optically anisotropic layers is oriented so that the first angle of the optic axis of the liquid crystal compound to the optical compensation sheet plane increases continuously or stepwise in the thickness direction of the optical compensation sheet and the other optically anisotropic layer is oriented so that the first angle decreases continuously or stepwise in the thickness direction of the optical compensation sheet.

6. The optical compensation sheet of claim 2, wherein the at least two optically anisotropic layers comprises a first optically anisotropic layer formed by orienting a positive uniaxial liquid crystal compound and a second optically anisotropic layer formed by orienting a biaxial liquid crystal compound, and the orientation direction in the optically anisotropic layer plane of the two liquid crystal compounds in the first and second optically anisotropic layers intersects each other at an angle of from 80 to 100 degrees, and wherein, viewing the two optically anisotropic layers from one side of the optical compensation sheet, the first optically anisotropic layer is oriented so that the first angle of the optic axis of the positive uniaxial liquid crystal compound to the optical compensation sheet plane increases continuously or stepwise in the thickness direction of the optical compensation sheet, and the second optically anisotropic layer is oriented so that the second angle of a direction giving maximum refractive index of the biaxial liquid crystal compound molecule to the optical compensation sheet plane decreases continuously or stepwise in the thickness direction of the optical compensation sheet.

7. The optical compensation sheet of claim 1, providing a wavelength dispersion property satisfying the following formulae (2) and (3):

$$R_e = (nx1 - ny1) \times d \quad \text{formula (1)}$$

$$R_e(589.3) - R_e(480) \leq 45 \text{ nm} \quad \text{formula (2)}$$

$$0.7 \leq R_e(480)/R_e(589.3) \leq 1.4 \quad \text{formula (3)}$$

wherein, regarding the direction giving maximum refractive index in the plane of the optical compensation sheet as the X axis, the direction in the optical compensation sheet plane normal to the X axis as the Y axis, and the direction perpendicular to the optical compensation sheet plane as the Z axis, viewing the point (referred to also as the origin), at which the X, Y and Z axes intersect, from any point on the Yz plane perpendicular to the optical compensation sheet plane, and obtaining angle (θ) giving minimum of a retardation in the plane (Re) at wavelength 590 nm represented by formula (1) above in the plane perpendicular to the viewing direction, retardation Re (589.3) in the plane perpendicular to the viewing direction at the wavelength 589.3 nm and retardation Re (480) in the plane perpendicular to the viewing direction at the wavelength 480 nm each are measured at angle (θ), and wherein nx1 represents maximum refractive index at wavelength 590 nm in the plane perpendicular to the viewing direction, ny1 represents minimum refractive index at wavelength 590 nm in the plane perpendicular to the viewing direction, and d represents a thickness of the sheet.

8. The optical compensation sheet of claim 1, comprising at least one support.

9. The optical compensation sheet of claim 8, wherein one layer of the two optically anisotropic layers is provided on one side of the support and the other layer of the two optically anisotropic layers is provided on the other side of the support.

10. The optical compensation sheet of claim 8, wherein the two optically anisotropic layers are provided on one side of the support.

11. The optical compensation sheet of claim 8, comprising two supports, wherein the two optically anisotropic layers are provided between the two supports.

12. The optical compensation sheet of claim 8, wherein the support is transparent and substantially optically isotropic.

13. The optical compensation sheet of claim 8, wherein the support is transparent and has a negative uniaxial optical property with the optic axis in the direction perpendicular to the optical compensation sheet plane.

14. The optical compensation sheet of claim 13, wherein the support satisfies the following formulae (4) and (4'):

$$nx2 \geq ny2 > nz2 \quad \text{formula (4)}$$

$$(nx2 - ny2)/nx2 \leq 0.01 \quad \text{formula (4')}$$

wherein nx2 represents maximum refractive index in the plane of the support, ny2 represents refractive index in the plane of the support in the direction perpendicular to the direction giving nx2, and nz2 represents refractive index in the support thickness direction.

15. The optical compensation sheet of claim 14, wherein the support has a retardation ($R_t$) in the thickness direction of 5 to 250 nm.

16. The optical compensation sheet of claim 8, wherein the support is comprised mainly of cellulose esters.

17. The optical compensation sheet of claim 1, wherein at least one of the two optically anisotropic layers has a retardation ($R_0$) in the plane of 50 to 200 nm, $R_0$ being represented by formula (a):

$$R_0 = (nx - ny) \times d \quad \text{formula (a)}$$

wherein nx represents maximum refractive index in the plane of the optically anisotropic layer, ny represents refractive index in the plane of the optically anisotropic layer in the direction perpendicular to the direction giving nx, and d represents a thickness of the optically anisotropic layer.

18. The optical compensation sheet of claim 1, wherein at least one of the two optically anisotropic layers satisfies the following:

when the direction normal to the optically anisotropic layer is regarded as 90 degrees, the direction parallel to the optically anisotropic layer and giving maximum refractive index in the plane of the optically anisotropic layer is regarded as zero degrees, and retardation is measured at an incident angle of from 0 to 90 degrees to the optically anisotropic layer, angle θa (°), giving maximum retardation ($R_e$) in the plane at 590 nm represented by the following formula (1) in the plane perpendicular to the incident direction, is in the range of from more than zero degrees to less than 90 degrees, and the maximum value of retardation is in the range of from 65 to 250 nm, $$R_e = (nx1 - ny1) \times d \quad \text{formula (1)}$$

wherein nx1 represents maximum refractive index at 590 nm in the plane perpendicular to the incident direction, ny1 represents minimum refractive index at 590 nm in the plane perpendicular to the incident direction, and d represents a thickness of the optical compensation sheet.

19. A liquid crystal display comprising a liquid crystal cell provided between a first polarizing plate and a second polarizing plate, wherein an optical compensation sheet is provided either between the first polarizing plate and the liquid crystal cell or between the second polarizing plate and the liquid crystal cell, the optical compensation sheet comprising at least two optically anisotropic layers each formed by orienting an optically anisotropic compound, and the orientation direction in the optically anisotropic layer plane of the optically anisotropic compound in the two optically anisotropic layers intersecting each other at an angle of from 80 to 100 degrees, and wherein, viewing the two optically anisotropic layers from one side of the optical compensation sheet, one of the two optically anisotropic layers, when the optically anisotropic compound is uniaxial, is oriented so that a first angle of the optic axis of the uniaxial optically anisotropic compound to the optical compensation sheet plane increases continuously or stepwise in the thickness direction of the optical compensation sheet, or when the optically anisotropic compound is biaxial, is oriented so that a second angle of a direction giving maximum refractive index of the biaxial optically anisotropic compound to the optical compensation sheet plane increases continuously or stepwise in the thickness direction of the optical compensation sheet, and the other optically anisotropic layer, when the optically anisotropic compound is uniaxial, is oriented so that the first angle decreases continuously or stepwise in the thickness direction of the optical compensation sheet, or when the optically anisotropic compound is biaxial, is oriented so that the second angle decreases continuously or stepwise in the thickness direction of the optical compensation sheet.

20. The liquid crystal display of claim 19, wherein the orientation direction of one of the two optically anisotropic layers is substantially perpendicular to the transmission axis of the first polarizing plate and is substantially parallel to the transmission axis of the second polarizing plate, or the orientation direction of one of the two optically anisotropic layers is substantially perpendicular to the transmission axis of the second polarizing plate and is substantially parallel to the transmission axis of the first polarizing plate.

21. A polarizing plate for elliptically polarized light comprising the optical compensation sheet.

22. An optical compensation sheet comprising at least two optically anisotropic layers each formed by orienting an optically positive uniaxial liquid crystal compound, wherein, when viewing the two layers from one side of the optical compensation sheet, one of the layers is a layer which is oriented so that an angle of the optic axis of the liquid crystal compound to the optical compensation sheet plane increases continuously or stepwise in the thickness direction of the optical compensation sheet and the other a layer which is oriented so that the angle decreases continuously or stepwise in the thickness direction of the optical compensation sheet, and the orientation direction in the plane of the two liquid crystal compounds in the two layers intersects each other at an angle of from 80 to 100 degrees.

23. The optical compensation sheet of item 22, wherein the at least two optically anisotropic layers are provided only on one side of a liquid crystal cell.

24. An optical compensation sheet comprising at least two optically anisotropic layers, each formed by orienting an optically biaxial liquid crystal compound, wherein, when viewing the two layers from one side of the optical compensation sheet, one of the layers is a layer which is oriented so that an angle of the direction giving maximum refractive index of the liquid crystal molecule to the optical compensation sheet plane increases continuously or stepwise in the thickness direction of the optical compensation sheet and the other a layer which is oriented so that the angle decreases continuously or stepwise in the thickness direction of the optical compensation sheet, and the orientation direction in the plane of the liquid crystal compound in the two layers intersects each other at an angle of from 80 to 100 degrees.

25. The optical compensation sheet of item 24, wherein the at least two optically anisotropic layers are provided only on one side of a liquid crystal cell.

26. An optical compensation sheet comprising at least two optically anisotropic layers, each formed by orienting an optically negative uniaxial liquid crystal compound, wherein, when viewing the two layers from one side of the optical compensation sheet, one of the layers is a layer which is oriented so that an angle of the optic axis of the liquid crystal molecule to the optical compensation sheet plane increases continuously or stepwise in the thickness direction of the optical compensation sheet and the other a layer which is oriented so that the angle decreases continuously or stepwise in the thickness direction of the optical compensation sheet, and the orientation direction in the plane of the liquid crystal compound in the two layers intersects each other at an angle of from 80 to 100 degrees.

27. The optical compensation sheet of item 26, wherein the at least two optically anisotropic layers are provided only on one side of a liquid crystal cell.

28. An optical compensation sheet comprising at least two optically anisotropic layers, each formed by orienting a liquid crystal compound, wherein, when viewing the two layers from one side of the optical compensation sheet, one of the layers is a layer in which the liquid crystal compound is an optically positive uniaxial liquid crystal compound, and an angle of the optic axis of the optically positive uniaxial liquid crystal compound to the optical compensation sheet plane increases continuously or stepwise in the thickness direction of the optical compensation sheet and the other a layer in which the liquid crystal compound is an optically biaxial liquid crystal compound, and an angle of the direction giving maximum refractive index of the optically biaxial liquid crystal compound to the optical compensation sheet plane decreases continuously or stepwise in the thickness direction of the optical compensation sheet, and the orientation direction in the plane of the liquid crystal compound in the two layers intersects each other at an angle of from 80 to 100 degrees.

29. The optical compensation sheet of item 28, wherein the at least two optically anisotropic layers are provided only on one side of a liquid crystal cell.

30. An optical compensation sheet comprising at least two optically anisotropic layers, each formed by orienting a liquid crystal compound, wherein, when viewing the two layers from one side of the optical compensation sheet, one of the layers is a layer in which the liquid crystal compound is an optically positive uniaxial liquid crystal compound A, and angle A of the optic axis of the optically positive uniaxial liquid crystal compound to the optical compensation sheet plane decreases or increases continuously or stepwise in the thickness direction of the optical compensation sheet and the other a layer in which the liquid crystal compound is an optically biaxial liquid crystal compound B, and angle B of the direction giving maximum refractive index of the optically biaxial liquid crystal compound to the optical compensation sheet plane increases or decreases continuously or stepwise in the thickness direction of the optical compensation sheet, provided that angles A and B viewing from the one side do not simultaneously increase nor decrease, and the orientation direction in the plane of the liquid crystal compounds A and B in the two layers intersects each other at an angle of from 80 to 100 degrees.

31. The optical compensation sheet of item 30, wherein the at least two optically anisotropic layers are provided only on one side of a liquid crystal cell.

32. An optical compensation sheet comprising at least two optically anisotropic layers, each comprised of a birefringent material, wherein, when viewing the two layers from one side of the optical compensation sheet, one of the layers is a layer which is oriented so that an angle of the direction giving maximum refractive index in the refractive index ellipsoid of the birefringent material to the optical compensation sheet plane increases continuously or stepwise in the thickness direction of the optical compensation sheet and the other a layer which is oriented so that the angle decreases continuously or stepwise in the thickness direction of the optical compensation sheet, and the orientation direction in the plane of the birefringent materials in the two layers intersects each other at an angle of from 80 to 100 degrees.

33. The optical compensation sheet of item 32, wherein the at least two optically anisotropic layers are provided only on one side of a liquid crystal cell.

34. An optical compensation sheet comprising at least two optically anisotropic layers, each formed by orienting a liquid crystal compound, and the two optically anisotropic layers being provided only on one side of a liquid crystal cell, (1) wherein, when viewing the two layers from one side of the optical compensation sheet, one of the layers is oriented so that an angle of the optic axis of the liquid crystal compound to the optical compensation sheet plane decreases continuously or stepwise in the thickness direction of the optical compensation sheet, the other layer is oriented so that the angle increases continuously or stepwise in the thickness direction of the optical compensation sheet, and the orientation direction in the plane of the liquid crystal compound in the two layers intersects each other at an angle of from 80 to 100 degrees, and (2) wherein, when regarding the direction giving maximum refractive index in the plane of the optical compensation sheet as the X axis, the direction in the optical compensation sheet plane normal to the X axis as the Y axis, and the direction perpendicular to the optical compensation sheet plane as the Z axis, viewing the point (referred to also as the origin), at which the X, Y and Z axes intersect, from any point on the YZ plane perpendicular to the optical compensation sheet plane, and obtaining angle ($\theta$) giving minimum of a retardation (Re) in the plane represented by formula (1) in the plane perpendicular to the viewing direction, the optical compensation sheet has such a wavelength dispersion property that the retardation Re (589.3) in the plane at the wavelength 589.3 nm and the retardation Re (480) in the plane at the wavelength 480 nm, each being measured at angle ($\theta$) obtained above, satisfy the following formulae (2) and (3):

$R_e = (nx1 - ny1) \times d$  formula (1)

$R_e(589.3) - R_e(480) \leq 45$ nm  formula (2)

$0.7 \leq R_e(480)/R_e(589.3) \leq 1.4$  formula (3)

wherein nx1 represents maximum refractive index at wavelength 589.3 nm in the plane (which is not necessarily the sheet plane) perpendicular to the incident direction, ny1 represents minimum refractive index at wavelength 589.3 nm in the plane, and d represents a thickness, and when there are plural layers as elements showing nx1 and nx2, d represents a thickness of the sheet.

35. An optical compensation sheet of any one of items 22 to 34, comprising two oriented layers, which are subjected to orientation treatment so that the orientation directions of the two oriented layers cross each other at an angle of from 80 to 100 degrees, a first optically anisotropic layer containing a liquid crystal compound to be oriented and fixed on the one oriented layer, and a second optically anisotropic layer containing a birefringent material to be oriented and fixed on the other oriented layer, wherein the first optically anisotropic layer is provided on one side of a support and the second optically anisotropic layer provided on the other side of the support.

36. An optical compensation sheet of any one of items 22 to 34, comprising two oriented layers, which are subjected to orientation treatment so that the orientation directions of the two oriented layers cross each other at an angle of from 80 to 100 degrees, a first optically anisotropic layer containing a liquid crystal compound to be oriented and fixed on the one oriented layer, and a second optically anisotropic layer containing a birefringent material to be oriented and fixed on the other oriented layer, wherein the first and second optically anisotropic layers are provided on one side of a support.

37. An optical compensation sheet of any one of items 22 to 34, comprising two oriented layers, which are subjected to orientation treatment so that the orientation directions of the two oriented layers cross each other at an angle of from 80 to 100 degrees, a first optically anisotropic layer containing a liquid crystal compound to be oriented and fixed on the one oriented layer, and a second optically anisotropic layer containing a birefringent material to be oriented and fixed on the other oriented layer, wherein the first and second optically anisotropic layers are provided between two supports.

38. An optical compensation sheet of item 35, wherein the two oriented layers, which orient an optically anisotropic layer, each is oriented layer A giving a pretilt angle of not more than 40 degrees or oriented layer B giving a pretilt angle of not less than 45 degrees.

39. An optical compensation sheet of any one of items 22 to 31, items 36 and 37, comprising a first optically anisotropic layer containing a liquid crystal compound A to be oriented and fixed provided on a first oriented layer A giving a pretilt angle of not more than 40 degrees and a second optically anisotropic layer containing a liquid crystal compound B to be oriented and fixed provided on a second oriented layer B giving a pretilt angle of not less than 45 degrees, each being provided only on one side of a support, wherein the orientation directions in the plane of the first and second optically anisotropic layers intersect each other at an angle of from 80 to 100 degrees.

40. An optical compensation sheet of any one of items 22 through 34, items 35 and 37, wherein the sheet is manufactured by the method comprising the following steps (1), (2) and (3):

(1) forming a first optically anisotropic layer which is fixed at a temperature developing a liquid crystal phase of liquid crystal compound A, through oriented layer A subjected to orientation treatment, on a first support, (2) forming a second optically anisotropic layer which is fixed at a temperature developing a liquid crystal phase of liquid crystal compound B, through oriented layer B subjected to orientation treatment, on a second support, (3) laminating the first optically anisotropic layer onto the second optically anisotropic layer directly or through at least one layer selected from a sticky layer, an adhesive layer and other layers so that the orientation direction in the optical compensation sheet plane of the first and second optically anisotropic layers intersects each other at an angle of from 80 to 100 degrees.

41. An optical compensation sheet of any one of items 22 through 34, and item 36, wherein the sheet is manufactured by the method comprising the following steps (1), (2) (3), and (4):

(1) forming a first optically anisotropic layer which is fixed at a temperature developing a liquid crystal phase of liquid crystal compound A, through oriented layer A subjected to orientation treatment, on a first support, (2) forming a second optically anisotropic layer which is fixed at a temperature developing a liquid crystal phase of liquid crystal compound B, through oriented layer B subjected to orientation treatment, on a second support, (3) laminating the second optically anisotropic layer on the first optically anisotropic layer directly or through at least one layer selected from a sticky layer, an adhesive layer and other layers so that the orientation direction in the optical compensation sheet plane of the first and second optically anisotropic layers intersects each other at an angle of from 80 to 100 degrees, and (4) peeling the second support.

42. A method for manufacturing an optical compensation sheet comprising continuous coating on a web support and comprising the following steps (1), (2) (3), and (4):

(1) continuously providing an orientation layer directly or through another layer on one side of a web support, (2) orienting the orientation layer in the direction of approximately 45 degrees to the mechanical direction, (3) continuously coating a crystal liquid compound on the resulting oriented layer and fixing at a temperature developing the crystal liquid phase to obtain a web sheet, and (4) folding the web sheet into two along a line parallel to the mechanical direction on the surface of the web support, and laminating the folded two halves directly or through a sticky layer or other layers.

43. An optical compensation sheet of any one of items 22 through 34, and items 35 and 37, wherein the optical compensation sheet is manufactured by the method of item 21 above.

44. A method for manufacturing an optical compensation sheet comprising continuous coating on a web support and comprising the following steps (1), (2) (3), and (4):

(1) continuously providing an orientation layer directly or through another layer on one side of a web support, (2) orienting the orientation layer in the direction of approximately 45 degrees to the mechanical direction, (3) continuously coating a liquid crystal compound on the resulting oriented layer and fixing at a temperature developing the crystal liquid phase to obtain a web sheet, and (4) laminating the two web sheets directly or through an adhesive layer or other layers so that the liquid crystal compound layers face each other or so that the supports face each other.

45. An optical compensation sheet of any one of items 22 through 34, and items 35 and 37, wherein the sheet is manufactured by the method of item 23 above.

46. A manufacturing method of the optical compensation sheet of item 42 or 44, the method comprising the steps of laminating the two web sheets with the supports facing outwardly, and peeling one of the supports.

47. An optical compensation sheet of any one of items 22 through 41, and items 43 and 45, wherein the support is transparent and substantially optically isotropic.

48. An optical compensation sheet of any one of items 22 through 41, and items 43 and 45, wherein the support is transparent and has a negative uniaxial optical property having the optic axis in the direction perpendicular to the optical compensation sheet plane.

49. An optical compensation sheet of item 48, wherein the support satisfies the following formula (4):

$$nx2 \geq ny2 > nz2 \qquad \text{formula (4)}$$

wherein nx2 represents maximum refractive index in the plane of the support, ny2 represents refractive index in the plane of the support in the direction perpendicular to the direction giving nx2, and nz2 represents refractive index in the thickness direction of the support, provided that the difference between nx2 and ny2 is not more than 1%.

50. An optical compensation sheet of item 49, wherein the support has a retardation ($R_t$) in the thickness direction of 5 to 250 nm.

51. An optical compensation sheet of any one of items 22 through 41, and items 43, 45, 47, 48 and 49, wherein the support is transparent, and is comprised mainly of cellulose esters.

52. An optical compensation sheet of any one of items 22 through 41, and items 43, 45, 47, 48, 49 and 51, wherein the optical compensation sheet is provided between a polarizing plate and a liquid crystal cell of a liquid crystal panel for driving, the orientation direction in the plane of one optically anisotropic layer is approximately perpendicular to the transmission axis of the polarizing plate, and the orientation direction in the plane of the other optically anisotropic layer is approximately parallel to the transmission axis of the polarizing plate.

53. An optical compensation sheet of any one of items 22 through 41, and items 43, 45, 47 to 50 and 51, wherein at least one of the at least two optically anisotropic layers has a retardation ($R_O$) in the plane of 50 to 200 nm, retardation ($R_O$) in the plane being represented by the following formula (a):

$$R_O = (nx - ny) \times d \qquad \text{formula (a)}$$

wherein nx represents maximum refractive index in the plane in the X direction, ny represents refractive index in the plane in the direction perpendicular to the direction giving nx, and d represents a thickness (nm) of the support.

54. An optical compensation sheet of any one of items 22 through 41, and items 43, 45, 47 to 51 and 52, wherein at least one of the two optically anisotropic layers satisfies the following:

when regarding the normal direction as 90 degrees, and the direction parallel to the optically anisotropic layer and giving maximum refractive index in the plane of the optically anisotropic layer as zero degrees, angle θa (°), giving a maximum of a retardation ($R_e$) in the plane represented by formula (1) above, is within the range of from more than zero degrees to less than 90 degrees, and the retardation maximum is within the range of from 65 to 250 nm, the retardation being measured at an incident angle of from 0 to 90 degrees to the optically anisotropic layer.

55. An optical compensation sheet of any one of items 22 through 41, and items 43, 45, 47 to 53 and 54, wherein the angle giving a maximum of a retardation ($R_e$) in at least one of the two optically anisotropic layers is in the range of from 20 degrees to 70 degrees, the angle being represented by an angle between the direction normal to the optical compensation sheet plane and the orientation direction of the optically anisotropic layer.

56. An optical compensation sheet of any one of items 22 through 41, and items 43, 45, 47 to 54 and 55, wherein the direction giving a minimum of a retardation ($R_e$) in the plane represented by formula (1) above is in the range of from 10 to 75 degrees.

57. An optical compensation sheet of any one of items 22 through 41, and items 43, 45, 47 to 55 and 56, wherein at least one of the two optically anisotropic layers has a thickness of 0.5 to 2.2 nm.

58. A liquid crystal display, comprising a liquid crystal cell, in which a nematic type liquid crystal compound is incorporated between two substrates, the orientation directions of which intersect approximately 90 degrees, the liquid crystal cell being provided between two polarizing elements, and the optical compensation sheet of any one of items 22 through 41, and items 43, 45, 47 to 56 and 57 (the sheet may be integrated with the polarizing element) being provided between the liquid crystal cell and one of the two polarizing elements, wherein when viewing the two optically anisotropic layers from the substrate side with respect to the direction normal to the substrate, one of the layers is a layer in which an angle between the direction giving maximum refractive index in the refractive index ellipsoid and the substrate increases continuously or stepwise in the direction farther from the substrate, and the other a layer in which the angle decreases continuously or stepwise in the direction farther from the substrate, the two orientation directions each giving maximum refractive index in the plane of the two optically anisotropic layers intersect approximately 90 degrees, and the orientation direction giving maximum refractive index in the plane of the optically anisotropic layer is approximately parallel with the orientation direction of the substrate.

59. A liquid crystal display comprising the optical compensation sheet of any one of items 22 through 41, and items 43, 45, 47 to 56 and 57.

60. A liquid crystal display comprising the optical compensation sheet of any one of items 22 through 41, and items 43, 45, 47 to 56 and 57, wherein the sheet is provided between a liquid crystal cell and a polarizing plate (referred to also as a polarizing element), the sheet being provided either on the display side or on the back light side of the liquid crystal cell.

61. A liquid crystal display comprising, in the display panel, the optical compensation sheet of any one of items 22 through 41, and items 43, 45, 47 to 56 and 57 between a polarizing plate (or polarizing element) and a liquid crystal cell for driving, the optical compensation sheet comprising an optically anisotropic layer, wherein when viewing the anisotropic layer from the upper or lower end side of the display panel, the projected optical alignment in the sheet thickness direction is symmetrical with respect to a center line in the sheet thickness direction at the sheet center from the obverse side to the rear side of the sheet.

62. An optical compensation sheet, with which a liquid crystal display is provided, comprising at least two optically anisotropic layers formed by orienting a liquid crystal compound, wherein (1) the optical compensation sheet is provided between a liquid crystal cell and a polarizing element, the optical compensation sheet being integrated with a polarizing plate including the polarizing element, and (2) the surface side of the polarizing plate provided on the optical compensation sheet opposite the optical compensation sheet side is subjected to anti-reflection treatment, anti-glare treatment or hard coat treatment.

63. An optical compensation sheet, with which a liquid crystal display is provided, comprising at least two optically anisotropic layers formed by orienting a liquid crystal compound, wherein (1) the optical compensation sheet is provided between a liquid crystal cell and a polarizing element, the optical compensation sheet being integrated with a polarizing plate including the polarizing element, and (2) when viewing the two layers from one side of the optical compensation sheet, one of the two layers is a layer which is oriented so that an angle of the optic axis of the liquid crystal compound to the optical compensation sheet plane decreases continuously or stepwise in the direction of the optical compensation sheet thickness direction, and the orientation direction in the plane of the liquid crystal compound in the two layers intersect each other at an angle of from 80 to 100 degrees, and (3) the surface side of the polarizing plate provided on the optical compensation sheet is subjected to anti-reflection treatment, anti-glare treatment or hard coat treatment.

64. An optical compensation sheet, with which a liquid crystal display is provided, comprising at least two optically anisotropic layers each formed by orienting a liquid crystal compound, wherein (1) the optical compensation sheet is provided between a liquid crystal cell and a polarizing element, the optical compensation sheet being integrated with a polarizing plate including the polarizing element, (2) when viewing the two layers from one side of the optical compensation sheet, one of the two layers is a layer which is oriented so that an angle of the major axis of the liquid crystal compound to the optical compensation sheet plane decreases continuously or stepwise in the thickness direction of the optical compensation sheet and the orientation direction in the plane of the liquid crystal compound in the two optically anisotropic layers intersects each other at an angle of from 80 to 100 degrees, (3) the surface side of the polarizing plate provided on the optical compensation sheet is subjected to anti-reflection treatment, anti-glare treatment or hard coat treatment, and (4) when regarding the direction giving maximum refractive index in the plane of the optical compensation sheet as X axis, the direction in the optical compensation sheet plane normal to the X axis as the Y axis, and the direction perpendicular to the optical compensation sheet plane as the Z axis, viewing the point (referred to also as the origin), at which the X, Y and Z axes intersect, from any point on the YZ plane perpendicular to the optical compensation sheet plane, and obtaining an angle (θ) giving minimum of a retardation (Re) in the plane represented by formula (1) in the plane perpendicular to the viewing direction, the optical compensation sheet has such a wavelength dispersion property that the retardation Re (589.3) in the plane at the wavelength 589.3 nm and the retardation Re (480) in the plane at the wavelength 480 nm, each being measured at the angle (θ), satisfy formulae (2) and (3) above.

65. An optical compensation sheet, with which a liquid crystal display is provided, comprising at least two optically anisotropic layers each formed by orienting a liquid crystal compound, wherein (1) the optical compensation sheet is provided between a liquid crystal cell and a polarizing element, the optical compensation sheet being integrated with a polarizing plate including the polarizing element, (2) when viewing the two layers from one side of the optical compensation sheet, one of the two layers is a layer which is oriented so that an angle of the optic axis of the liquid crystal compound to the optical compensation sheet plane decreases continuously or stepwise in the thickness direction of the optical compensation sheet and the orientation direction in the plane of the optically anisotropic compound in the two optically anisotropic layers intersects each other at an angle of from 80 to 100 degrees, and (3) the surface side of the polarizing plate provided on the optical compensation sheet is subjected to anti-reflection treatment, anti-glare treatment or hard coat treatment.

66. An optical compensation sheet, with which a liquid crystal display is provided, comprising at least two optically anisotropic layers each formed by orienting a liquid crystal compound, wherein (1) the optical compensation sheet is provided between a liquid crystal cell and a polarizing element, the optical compensation sheet being integrated with a polarizing plate including the polarizing element, (2) when viewing the two layers from one side of the optical compensation sheet, one of the two layers is a layer which is oriented so that an angle of the optic axis of the liquid crystal compound to the optical compensation sheet plane decreases continuously or stepwise in the thickness direction of the optical compensation sheet and the orientation direction in the plane of the optically anisotropic compound in the two optically anisotropic layers intersects each other at an angle of from 80 to 100 degrees, (3) the surface side of the polarizing plate provided on the optical compensation sheet is subjected to anti-reflection treatment, anti-glare treatment or hard coat treatment, and (4) when regarding the direction giving maximum refractive index in the plane of the optical compensation sheet as X axis, the direction in the optical compensation sheet plane normal to the X axis as the Y axis, and the direction perpendicular to the optical compensation sheet plane as the Z axis, viewing the point (referred to also as the origin), at which the X, Y and Z axes intersect, from any point on the YZ plane perpendicular to the optical compensation sheet plane, and obtaining an angle (θ) giving minimum of a retardation (Re) in the plane represented by formula (1) in the plane perpendicular to the viewing direction, the optical compensation sheet has such a wavelength dispersion property that the retardation Re (589.3) in the plane at the wavelength 589.3 nm and the retardation Re (480) in the plane at the wavelength 480 nm, each being measured at the angle (θ), satisfy formulae (2) and (3) above.

67. A liquid crystal display comprising the optical compensation sheet of any one of items 62 to 66.

DETAILED DESCRIPTION OF THE PREFERRED EMBODIMENT

Next, the present invention will be explained in detail.

The optical compensation sheet of the invention comprises at least two optically anisotropic layers each formed by orienting an optically anisotropic compound. Viewing the two layers from one side of the optical compensation sheet, one of the two layers, when the optically anisotropic compound is uniaxial, is oriented so that a first angle of the optic axis of the uniaxial optically anisotropic compound to the optical compensation sheet plane increases continuously or stepwise in the thickness direction of the optical compensation sheet and the other is oriented so that the first angle decreases continuously or stepwise in the thickness direction of the optical compensation sheet, or when the optically anisotropic compound is biaxial, is oriented so that a second angle of a direction giving maximum refractive index of the biaxial optically anisotropic compound to the optical compensation sheet plane increases continuously or stepwise in the thickness direction of the optical compensation sheet, and the other layer, when the optically anisotropic compound is uniaxial, is oriented so that the first angle decreases continuously or stepwise in the thickness direction of the optical compensation sheet, or when the optically anisotropic compound is biaxial, is oriented so that the second angle decreases continuously or stepwise in the thickness direction of the optical compensation sheet, wherein the orientation direction in the optically anisotropic layer plane of the optically anisotropic compound in the two optically anisotropic layers intersects each other at an angle of from 80 to 100 degrees.

In the invention, the orientation direction in the optically anisotropic layer plane of the optically anisotropic compound in the two optically anisotropic layers intersects each other at an angle of preferably from 85 to 95 degrees, and more preferably 90 degrees. In the invention, the optically anisotropic layers formed by orienting an optically anisotropic compound is preferably optically anisotropic layers formed by orienting the optically anisotropic compound and fixing it.

In the invention, the optical compensation sheet preferably means a sheet overcoming birefringence of a liquid crystal cell in a liquid crystal display between the liquid crystal cell and a polarizing plate. Examples of the optical compensation sheet include a viewing angle increasing film. The viewing angle increasing films include a film capable of increasing viewing angle and maintaining good contrast, a film capable of increasing viewing angle and overcoming reversal of gray scale, a film capable of increasing viewing angle and maintaining good black image, a film capable of increasing viewing angle and maintaining good hue, and a film with these plural effects capable of increasing viewing angle.

The optically anisotropic compound in the invention means a compound in which at least one of refractive indices nx, ny, and nz in the three axis X, Y, and Z directions is different from the other refractive indices. When the aggregates comprising a plurality of molecules show the above property, the optically anisotropic compounds in the invention mean such aggregates.

Conventional optical compensation sheets show an optical compensation property capable of being put into practical use only by providing it on both sides of a liquid crystal cell. Surprisingly, the present inventors have found that an extremely excellent optical compensation property has been obtained by providing only one optical compensation sheet comprising the optically anisotropic layer as described and structured above between a liquid crystal cell and a polarizing plate sheet, the optical compensation sheet being provided on one side of the liquid crystal cell or the polarizing plate sheet.

The optical compensation sheet of the invention provides such excellent optical compensation properties that it shows high contrast with a so-called, wide viewing angle, no coloring on the sheet plane, and a very narrow reversal area, when viewing the optical compensation sheet from an oblique direction. The use of only one optical compensation sheet of the invention per liquid crystal cell reduces cost by half, and the optical compensation sheet of the invention can be applied to twice as many liquid crystal cells as the conventional optical compensation sheet.

A sheet in which optical compensation can be carried out by the use of only one optical compensation sheet has the following advantages due to positioning of the optical compensation sheet in providing it in a liquid crystal display panel.

Generally, a polarizing plate on the display side (observer side) is different in surface properties from the rear (back light) side of a liquid crystal cell. On the display side, for example, a special polarizing plate is used in which the surface of the polarizing plate is subjected to AG (anti-glare) treatment. In this case, for example, the obverse side of the polarizing plate is subjected to AG treatment, and an optical compensation film is adhered to the rear side of the polarizing plate, resulting in more manufacturing processes, which may lower yields. Once problems occur during adherence of the surface treated polarizing plate to an optical compensation film, there is nothing to be done but to discard the polarizing plate, also resulting in cost increase. However, the optical compensation sheet according to the invention can be laminated onto the surface of a polarizing plate on the back light side of a liquid crystal cell, which does not require special surface treatment, saving a polarizing plate having the additional property as described above. Further, the optical compensation sheet of the invention is advantageously laminated onto a polarizing plate on the obverse side the surface of which has been subjected to surface treatment such as AG treatment. That is, although two polarizing plates are essential to a liquid crystal display, it is possible to use an ordinary polarizing plate without special surface treatment as one used on the rear side of the display. As a result, it is possible to use, in common, ordinary polarizing plates and other parts used in various liquid crystal displays, resulting in reduction of cost.

Yellowing, which results from triacetyl cellulose used in an optical compensation sheet, or for example, a wavelength dispersion property of a discotic liquid crystal compound etc., can be restrained by use of the optical compensation sheet of the invention, since the number of the optical compensation sheet used is reduced to one.

The present invention provides an optical compensation sheet capable of attaining optical compensation by only one sheet, a polarizing plate employing the same, and a liquid crystal display employing the same. Further, the present invention improves contrast variation due to viewing angle which is specific to a twisted nematic (TN) type liquid crystal display or particularly dependence of image quality upon viewing angle in an active matrix type liquid crystal display used as a full color display.

As a technique described above, there is the description in Japanese Patent O.P.I. Publication No. 10-186356, "an optical compensation sheet can also be provided only on one side of a liquid crystal display." However, there are no examples in which reverse area, contrast or hue in a TN-TFT type liquid crystal display is improved by providing an optical compensation sheet on only one side of the display.

Preferred examples of the optically anisotropic compounds in the invention include a liquid crystal compound. For example, when the optically anisotropic compound is a positive uniaxial liquid crystal compound, at least two optically anisotropic layers are formed by orienting the positive uniaxial liquid crystal compound. When viewing the two layers from one side of the optical compensation sheet, it is preferred in the invention that one of the two layers is oriented so that the angle of the optic axis of the liquid crystal compound to the optical compensation sheet plane increases continuously or stepwise in the thickness direction of the optical compensation sheet, the other layer is oriented so that the angle decreases continuously or stepwise in the thickness direction of the optical compensation sheet, and the orientation direction in the optically anisotropic layer plane of the liquid crystal compound in the two optically anisotropic layers intersects each other at an angle of from 80 to 100 degrees.

When the optically anisotropic compound is a biaxial liquid crystal compound, at least two optically anisotropic layers each are formed by orienting the biaxial liquid crystal compound. When viewing the two layers from one side of the optical compensation sheet, it is preferred in the invention that one of the two layers is oriented so that the angle of a direction giving maximum refractive index of the liquid crystal compound molecule to the optical compensation sheet plane increases continuously or stepwise in the thickness direction of the optical compensation sheet, the other layer is oriented so that the angle decreases continuously or stepwise in the thickness direction of the optical compensation sheet, and the orientation direction in the optically anisotropic layer plane of the liquid crystal compound in the two optically anisotropic layers intersects each other at an angle of from 80 to 100 degrees.

When the optically anisotropic compound is a negative uniaxial liquid crystal compound, at least two optically anisotropic layers each are formed by orienting the negative uniaxial liquid crystal compound. When viewing the two layers from one side of the optical compensation sheet, it is preferred in the invention that one of the two layers is oriented so that the angle of the optic axis of the liquid crystal compound to the optical compensation sheet plane increases continuously or stepwise in the thickness direction of the optical compensation sheet, the other layer is oriented so that the angle decreases continuously or stepwise in the thickness direction of the optical compensation sheet, and the orientation direction in the optically anisotropic layer plane of the liquid crystal compound in the two optically anisotropic layers intersects each other at an angle of from 80 to 100 degrees.

The liquid crystal compound used in one of the two optically anisotropic layers is different from one used in the other optically anisotropic layer. One example will be shown below which comprises an optically anisotropic layer formed by orienting a positive uniaxial liquid crystal compound and an optically anisotropic layer formed by orienting a biaxial liquid crystal compound. When viewing the two layers from one side of the optical compensation sheet, it is preferred in the invention that the optically anisotropic layer comprising an optically anisotropic layer formed by orienting a positive uniaxial liquid crystal compound is oriented so that the angle of the optic axis of the liquid crystal compound to the optical compensation sheet plane increases continuously or stepwise in the thickness direction of the optical compensation sheet, the optically anisotropic layer comprising an optically anisotropic layer formed by orienting the biaxial liquid crystal compound is oriented so that the angle of a direction giving maximum refractive index of the liquid crystal compound molecule to the optical compensation sheet plane decreases continuously or stepwise in the thickness direction of the optical compensation sheet, and the orientation direction in the optically anisotropic layer plane of the liquid crystal compound in the two optically anisotropic layers intersects each other at an angle of from 80 to 100 degrees. Other examples of the optically anisotropic compounds may be ones obtained by cutting a single crystal compound in a specific angle and thickness.

The optical compensation sheet of the invention preferably provides a wavelength dispersion property satisfying the following formulae (2) and (3):

$$R_e = (nx1 - ny1) \times d \quad \text{formula (1)}$$

$$R_e(589.3) - R_e(480) \leq 45 \text{ nm} \quad \text{formula (2)}$$

$$0.7 \leq R_e(480)/R_e(589.3) \leq 1.4 \quad \text{formula (3)}$$

wherein, regarding the direction giving maximum refractive index in the plane of the optical compensation sheet as the X axis, the direction in the optical compensation sheet plane normal to the X axis as the Y axis, and the direction perpendicular to the optical compensation sheet plane as the Z axis, viewing the point (referred to also as the origin), at which the X, Y and Z axes intersect, from any point on the YZ plane perpendicular to the optical compensation sheet plane, and obtaining angle (θ) giving minimum of a retardation (Re) at wavelength 590 nm in the plane represented by formula (1) above in the plane perpendicular to the viewing direction, retardation Re (589.3) in the plane at the wavelength 589.3 nm and retardation Re (480) in the plane at the wavelength 480 nm each are measured at angle (θ), and wherein nx1 represents maximum refractive index at wavelength 590 nm in the plane perpendicular to the viewing direction, ny1 represents minimum refractive index at wavelength 590 nm in the plane perpendicular to the viewing direction, and d represents a thickness of the sheet.

Orientation of a liquid crystal compound in a liquid crystal compound layer in the invention will be explained below.

The wavelength dispersion property in the invention, when the incident direction is a normal direction, is represented by the subtraction of retardation in the plane at 480 nm from retardation in the plane at 589.3 nm and the ratio of the retardation at 480 nm to the retardation at 589.3 nm, the retardation in the plane at 589.3 nm being regarded as standard. The wavelengths of 589.3 nm, 590 nm and 480 nm vary a little depending on the measuring device used, but the deviation within the range ±1 nm does not need correction. Further, the deviation within the range ±5 nm does not need correction also, but retardation at 480 or 589.3 nm is preferably obtained according to the method described later.

The wavelength dispersion property of the optical compensation sheet of the invention is influenced by a tilt angle of the liquid crystal molecules used in the sheet or lamination methods of optically anisotropic layers. The wavelength dispersion property of one optically anisotropic layer does not necessarily accord with the property of materials used in it, and the wavelength dispersion property due only to the materials cannot be applied to the wavelength dispersion property of the optical compensation sheet.

When the direction perpendicular to the sheet plane is defined as 0 degrees, and the axis giving maximum refractive index in the sheet plane is a rotational axis, the wavelength dispersion of the optical compensation sheet of the invention is computed from measurements measured employing lights having wavelengths of 589.3 nm and 480 nm from the point, which gives a minimum of retardation $(R_e)$ as represented by formula (1) above obtained of from measurements measured with the angle of incidence from −90 to 90 degrees along the axis giving minimum refractive index in the sheet plane.

When the measurement at 480 nm, 589.3 nm and 590 nm is difficult, retardation at 480 nm, 589.3 nm and 590 nm can be calculated by the following formula:

$$R(\lambda) = a + b/\lambda^2 + c/\lambda^4 + d/\lambda^6 + \ldots$$

wherein λ is a wavelength selected at intervals of from 50 to 100 nm in the wavelength range of from 450 to 800 nm, and R(λ) is retardation at λ measured under the conditions described above. The more the data, the more preferable. Three data has substantially no problem, and four data are more preferable.

In view of obtaining the effects of the invention, in the wavelength dispersion property of the optical compensation sheet of the invention, $R_e(589.3) - R_e(480)$ represented by formula (2) above is preferably not more than 45 nm, and more preferably not more than 15 mm, and the ratio $R_e(480)/R_e(589.3)$ is preferably from 0.7 to 1.4, and more preferably from 0.8 to 1.2.

In the optical compensation sheet which is provided on only one side of the liquid crystal cell used in a liquid crystal display represented by a TN-TFT type liquid crystal display, the wavelength dispersion property adjusted to fall within the range as described above can provide improved contrast and improved properties (such as visual property or viewing angle property) at an image reverse area (particularly at lower portions) of the display, and can particularly minimize the problem in conventional optical compensation sheets such as yellowing occurring when viewing the display obliquely, and realize good color reproduction, resulting in an extremely high quality display.

It has been found in the present invention that yellowing of a displayed image of the liquid crystal display, which has so far been a great problem, has been reduced by adjusting the wavelength dispersion property of the optical compensation sheet, particularly the relationship between retardation $(R_e)$ at 589.3 nm and retardation $(R_e)$ at 480 nm, to a specific range. The present invention provides a liquid crystal display with good color reproduction by employing the optical compensation sheet of the invention minimizing the above problem. It is preferred that with respect to the relationship with a retardation $R_e$ (λ') at visible wavelength λ' longer than 589.3 nm, value $R_e(589.3) - R_e(\lambda')$ is smaller than value $|R_e(589.3) - R_e(480)|$, and value $R_e(\lambda')/R_e(589.3)$ is in the range of from 0.7 to 1.3.

Besides the optically anisotropic layer, the optical compensation sheet may have a support, or an oriented layer for orienting an optically anisotropic compound in the optically anisotropic layer. Further, the optical compensation sheet may be integrated with a polarizing plate or a polarizing plate protective film. One optically anisotropic layer may be provided on one side of the support and the other optically anisotropic layer may be provided on the other side of the support. The two optically anisotropic layers may be provided on only one side of the support. The optical compensation sheet may comprise two supports, wherein the two optically anisotropic layers are provided between the two supports. An oriented layer may be provided between the support and the optically anisotropic layer or between two optically anisotropic layers. The oriented layer may give a pretilt angle of not more than 40 degrees or a pretilt angle of not less than 45 degrees. It is preferred that the support is transparent and substantially optically isotropic. The support may have a negative uniaxial optical property with the optic axis in the direction perpendicular to the optical compensation sheet plane. When the support has a negative uniaxial optical property with the optic axis in the direction perpendicular to the optical compensation sheet plane, the support preferably satisfies the following formulae (4) and (4'):

$$nx2 \geq ny2 > nz2 \qquad \text{formula (4)}$$

$$(nx2-ny2)/nx2 \leq 0.01 \qquad \text{formula (4')}$$

wherein nx2 represents maximum refractive index in the plane of the support, ny2 represents refractive index in the plane of the support in the direction perpendicular to the direction giving nx2, and nz2 represents refractive index in the support thickness direction.

When the support has a negative uniaxial optical property with the optic axis in the direction perpendicular to the optical compensation sheet plane, the support preferably has a retardation ($R_t$) in the thickness direction of 5 to 250 nm.

Materials used for the support will be detailed later, but the support comprises cellulose esters in an amount of preferably 50 weight % or more, and more preferably 80 weight % or more.

In the optical compensation sheet of the invention, it is preferred that at least one of the two optically anisotropic layers (preferably the two optically anisotropic layers each) has a retardation ($R_0$) in the plane of 50 to 200 nm, $R_0$ being represented by formula (a):

$$R_0 = (nx-ny) \times d \qquad \text{formula (a)}$$

wherein nx represents maximum refractive index in the plane of the optically anisotropic layer, ny represents refractive index in the plane of the optically anisotropic layer in the direction perpendicular to the direction giving nx, and d represents a thickness of the optically anisotropic layer.

In the optical compensation sheet of the invention, it is preferred that at least one of the two optically anisotropic layers (preferably two optically anisotropic layers each) satisfies the following conditions:

when the direction normal to the optically anisotropic layer is regarded as 90 degrees, the direction parallel to the optically anisotropic layer and giving a maximum refractive index in the plane of the optically anisotropic layer is regarded as zero degrees, and retardation is measured at an incident angle of from 0 to 90 degrees to the optically anisotropic layer, angle θa (°), giving maximum retardation ($R_e$) in the plane at 590 nm represented by the following formula (1) in the plane perpendicular to the incident direction, is in the range of from more than zero degrees to less than 90 degrees, and the retardation maximum is in the range of from 65 to 250 nm, $$R_e = (nx1 - ny1) \times d \qquad \text{formula (1)}$$

wherein nx1 represents maximum refractive index at 590 nm in the plane perpendicular to the incident direction, ny1 represents minimum refractive index at 590 nm in the plane perpendicular to the incident direction, and d represents a thickness of the sheet.

In the above embodiment, θa is more preferably in the range of 20 to 70 degrees. Further, angle giving minimum of retardation ($R_e$) in the plane is more preferably in the range of from 10 to 75 degrees.

Thickness of the optically anisotropic layer is in the range of preferably 0.5 to 2.2 μm, and thickness of the optical compensation sheet of the invention is in the range of preferably 1 to 1,000 μm and more preferably 30 to 500 μm.

In the invention, there can be used an optical compensation sheet comprising two optically anisotropic layers having the same materials and the same layer thickness as the optical compensation sheet of the invention, in which one optically anisotropic layer is of substantially the same orientation form as the other. Such an optical compensation sheet is obtained by turning one of the two optically anisotropic layers of the optical compensation sheet of the invention so that the orientation direction of the optically anisotropic compound in the two optically anisotropic layers is substantially the same.

The optical compensation sheet of the invention comprises two or more layers formed by orienting birefringent materials, characterized in that the orientation directions of the two layers are approximately normal in the plane to each other. The term "approximately normal" means that it may deviate a little from 90 degrees as far as there is no problem such as coloration due to interference, but means a range of preferably from 80 to 100 degrees, more preferably a range of from 85 to 95 degrees, and most preferably 90 degrees. Further, a component unit of the birefringent materials is oriented in one of the two layers so that the angle between the direction giving maximum refractive index in a refractive index ellipsoid of the component unit and the optical compensation sheet plane increases in the thickness direction of the sheet toward the other side (B) from one side (A) of the optical compensation sheet, and is oriented in the other layer so that the angle decreases in the thickness direction of the optical compensation sheet toward the other side B from one side A of the optical compensation sheet.

The component unit of the birefringent materials herein referred to is considered to be a component having the optic axis. For example, the component unit means a liquid crystal molecule having a birefringent property. However, it is not necessarily limited to the molecule unit, and may be an aggregate having a specific optic axis, which is comprised of several kinds of molecules. The expression, "the angle described above to the sheet plane increases or decreases" means that each layer does not have the optic axis as the whole layer, and increase or decrease of the angle in the thickness direction of the sheet may be continuous or discontinuous. Hereinafter, this orientation in the thickness direction of the sheet refers to also as hybrid orientation. With respect to the hybrid orientation form effective for the present invention, the following can be mentioned. For example, in the sheet comprising two layers, it is preferred that the angle described above increases in the direction towards the side B from the side A in one layer, and decreases in the direction towards the side B from the side A in the other layer, or that the angle decreases in the direction towards the side B from the side A in one layer, and increases in the direction towards the side B from the side A in the other layer. When the angles in the two layers increase or decrease simultaneously, or are constant, the effects of the invention cannot be obtained. The angle can vary in the range between 0 degrees and 90 degrees. The angle varies in the range of preferably 5 degrees to 85 degrees. The range is preferably wider, but varies due to the structure of the liquid crystal cell used. With respect to the varying form (hybrid form) of the angle, the varying form in one layer is preferably the same as that in the other layer in the section of the sheet.

In the optical compensation sheet of the invention, it is preferred that one of the two optically anisotropic layers has a retardation ($R_0$) in the plane represented by formula (a) of 50 to 200 nm. Further, it is more preferred that the two optically anisotropic layers each have a retardation ($R_0$) in the plane represented by formula (a) of preferably 50 to 200 nm.

In the optical compensation sheet of the invention, it is preferred that angle θa (°) giving maximum retardation ($R_e$) in the plane represented by formula (1) in the plane of at least one of the two optically anisotropic layers is in the range of from more than zero degrees to less than 90 degrees, and preferably from 20 to 70 degrees, and the retardation maximum of $R_e$ is in the range of from 65 to 250 nm. It is more preferred that angle θa (°) each of the two optically anisotropic layers is in the range of from more than zero degrees to less than 90 degrees, and preferably from 20 to 70 degrees, and the retardation maximum of $R_e$ is in the range of from 65 to 250 nm.

In the optical compensation sheet of the invention, it is preferred that thickness of at least one of the two optically anisotropic layers is in the range of preferably 0.5 to 2.2 μm, and it is more preferred that thickness of each of the two optically anisotropic layers is in the range of preferably 0.5 to 2.2 μm.

In the optical compensation sheet of the invention, retardation ($R_t$) in the thickness direction is in the range of preferably 85, nm to less than 340 nm.

A liquid crystal compound can be suitably used in order to form the optically anisotropic layer as described above by controlling the orientation. The liquid crystal compound used in the invention will be explained below.

The liquid crystal compound used in the invention may be a low molecular liquid crystal compound or a polymer liquid crystal compound. With respect to optical characteristics, a positive uniaxial rod-shaped liquid crystal compound or a biaxial liquid crystal compound is preferably used. The liquid crystal compound may be a negative uniaxial crystal compound, and for example, typically, a discotic liquid crystal compound can be used. With respect to the biaxial liquid crystal compound there is a compound of rod-shaped molecule structure, or a compound of a comparatively broad disc structure such as a discotic liquid crystal compound.

The negative uniaxial liquid crystal compounds in the invention include typically discotic liquid crystal compounds, for example, compounds described in "Ekishou no Kagaku: quarterly publication, Kagaku Sosetsu No. 22 (1994), p. 60–72, edited by Nihon Kagakukai (Gakkai Shuppan center), and exemplarily, liquid crystal compounds having molecular structures 1 to 16 described on page 62 of the above literature. The liquid crystal compounds described in Japanese Patent Nos. 2587398, 2640083, 2641086, 2692033, 2692035, 2767382 and 2747789 are also discotic liquid crystal compounds.

In the invention the positive uniaxial anisotropic compounds referred to also as the positive uniaxial compounds) or biaxial compounds having an optical property those to rod-shaped liquid crystal compounds can be treated as having optical properties of the rod-shaped liquid crystal compounds. Herein, the term, "positive uniaxial" (optically uniaxial) means that in an anisotropic element having optical anisotropy, only two of refractive indices in three axis directions, nx, ny, and nz are equal and the two refractive indices are smaller than the remaining one, and the term, "biaxial" means that in an anisotropic element having optical anisotropy, any one of refractive indices in three axis directions, nx, ny, and nz are different from another. Further, the term, "negative uniaxial" means that in an anisotropic element having optical anisotropy, only two of refractive indices in three axis directions, nx, ny, and nz are equal and the two refractive indices are larger than the remaining one.

The positive uniaxial rod-shaped liquid crystal compound in the invention may be a compound having a positive dielectric constant anisotropy or a compound having a negative dielectric constant anisotropy, but is preferably a compound having a positive dielectric constant anisotropy in view of easy control of its inclination in the sheet thickness direction as described later.

Dielectric constant anisotropy (Δ∈) of the rod-shaped liquid crystal compound is represented by the difference Δ∈(Δ∈=∈//−∈⊥≠0) between dielectric constant (∈//) in a state in which the major axis of the molecule is oriented in parallel with the electric field direction and dielectric constant (∈⊥) in a state in which the minor axis of the molecule is oriented in parallel with the electric field direction. Dielectric constant anisotropy (Δ∈) has an influence on anisotropic property of refractive index of light transmitting liquid crystal molecules. The relationship between the both is represented by the following formula:

$$\Delta\in = (n//)^2 - (n\perp)^2$$

wherein Δn=n//−n⊥=ne−no, wherein ne represents an extraordinary light refractive index, and no represents an ordinary light refractive index, and no represents an refractive index to light in the orientation vector direction of liquid crystal molecules, and n⊥ represents an refractive index to light in the direction perpendicular to the orientation vector of liquid crystal molecules.

Herein, Δ∈ or Δn is a positive value in the liquid crystal compound used for driving an ordinary TN liquid crystal cell.

In the low molecular weight liquid crystal compound the whole molecule determines the optically anisotropic property (typically, refractive index anisotropy) of the liquid crystal compound. A polymer liquid crystal compound is divided into two kinds, and the one is a main chain type polymer liquid crystal compound and the other a side chain type polymer liquid crystal compound. In the both type polymer liquid crystal compounds, a structure containing a mesogenic group determines the optically anisotropic property in a similar manner as in the low molecular weight compound.

The mesogenic group (or a mesogenic unit) as described above refers to a part necessary for developing a liquid crystal property in a liquid crystal compound, and the mesogenic group ordinarily comprises a core group being a rigid part a spacer group being a flexible part, and an end group positioned at the molecular end. However, the mesogenic group is not limited to the above three groups as long as a liquid crystal compound has a group developing a liquid crystal property.

Examples of the positive uniaxial liquid crystal compounds will be shown below, but they are not limited thereto.

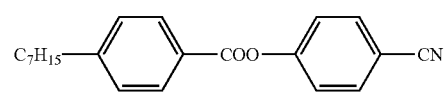

1

In addition to the above exemplified compounds, compounds described in "Ekishou no Kagaku: quarterly publication, Kagaku Sosetsu No. 22 (1994), p. 42, 44 edited by Nihon Kagakukai (Gakkai Shuppan center) can be used. The above described rod-shaped liquid crystal compounds having a positive uniaxiality can be suitably used as ordinary rod-shaped nematic liquid crystal compounds used in TN cells.

Compounds developing a nematic liquid crystal phase are preferably used as the rod-shaped liquid crystal compounds in the invention.

The biaxial liquid crystal compounds include compounds described n Yukigoseikagaku, Vol. 49, No. 5 (1991), p. 124–143, compounds described in D. W. Bruce et al., AN EU-SPONSORED' OXFORD WORKSHOP ON BIAXIAL NEMATICS' (St Benet's Hall, University of Oxford 20–22 Dec., 1996), p. 157–293 compounds described in S. Chandrasekhar et al., A Thermotropic Biaxial Nematic Liquid Crystal, Mol. Cryst. Liq. Cryst., 1988, Vol. 165, pp. 123–130, and compounds described in D. Demus, J. Goodby et al., Handbook of Liquid Crystals, Vol. 2B, Low Molecular Weight Liquid Crystals II, pp. 933–943, published by WILEY VCH Co.

The liquid crystal polymers in the invention are not specifically limited, but are preferably ones having a positive or negative specific double refractive index, which are detailed in "LIQUID CRYSTALLS, 1989, Vol. 5, No. 1, pp. 159–170".

The polymer liquid crystal compounds in the invention are divided into two kinds of polymer liquid crystal compounds having a mesogenic group, one is a polymer having a mesogenic group in the main chain and the other a polymer having a mesogenic group in the side chain. The polymer liquid crystal compounds in the invention are also divided into two kinds of thermotropic and liotropic polymer liquid crystal compounds.

The liquid crystal polymers in the invention are not specifically limited but are preferably ones forming a nematic liquid crystal. The polymer having a mesogenic group in the side chain is preferable in orientation property, and a thermotropic liquid crystal polymer is preferable in orientation fixation. The main chain used in the above side chain type liquid crystal polymers is preferably that of a vinyl type polymer, polysiloxane, polypeptide, polyphosphazene, polyethylene imine, and cellulose.

The oriented layer (orientation layer) in the invention will be explained below.

The oriented layer is generally provided on a transparent support or a subbing layer. The oriented layer controls an orientation direction of a liquid crystal compound layer provided on it. This gives an orientation inclined to an optical compensation sheet. The oriented layer may any layer as long as it gives an orientation property to an optically anisotropic layer. The preferred oriented layer is a rubbing layer containing an organic compound (preferably a polymer), an inorganic compound oblique evaporation layer, a layer having a microgroub, a multi-layered film (LB film) of ω-tricosanoic acid, dioctadecylmethylammonium chloride or methyl stearate, which is formed according to a Langmuir-Projet method, and a layer having a dielectrics oriented by application of an electric or magnetic fields The example giving an orientation property to a support itself is described in Japanese Patent O.P.I. Publication No. 9-281331.

The organic compounds used for forming an oriented layer include polymers such as polymethyl methacrylate, acrylic acid-methacrylic acid copolymer, styrene-maleimide copolymer polyvinyl alcohol, poly(N-methylolacrylamide), styrene-vinyl toluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, carboxymethylcelluloe, polyethylene, polypropyleene, and polycarbonate, and compounds such as silane coupling agents. The preferred polymers are polyimide, polystyrene, a polymer of styrene derivatives, gelatin, polyvinyl alcohol, or an alkyl modified polyvinyl alcohol (modified with preferably an alkyl having a carbon atom number of 6 or more). The oriented layer obtained by subjecting the above described polymer layer to orientation treatment can orient a liquid crystal compound obliquely.

Of the above described compounds, an alkyl modified polyvinyl alcohol is especially preferable. The alkyl modified polyvinyl alcohol is superior in uniformly orienting a liquid crystal compound. This is considered to be due to a strong interaction between the alkyl chain of the liquid crystal compound and the alkyl chain of the alkyl modified polyvinyl alcohol on the surface of the oriented layer. The alkyl in the alkyl modified polyvinyl alcohol has a carbon atom number of more preferably 6 to 14. It is preferable that the alkyl is bonded to polyvinyl alcohol through a linkage, —S—, —(CHB)C(CN)—, or —($C_2H_5$)N—CS—S—. The alkyl modified polyvinyl alcohol is a polyvinyl alcohol having alkyl n the molecular end, and preferably has a saponification degree of 80% or more and a polymerization degree of 200 or more. The polyvinyl alcohols described above having alkyl in the side chain include products such as MP 103, MP 203, and R 1130 manufactured by Kuraray Co., Ltd.

A polyimide layer (preferably polyimide having fluorine atoms), which is widely employed as an LCD oriented layer, is preferred as the organic oriented layer. It is possible to obtain said layer by coating, onto a transparent support, polyamic acid (for example, LQ/LX Series manufactured by Hitachi Kasei Co., Ltd., and SE Series manufactured by Nissan Kagaku Co., Ltd), heating the coated layer at 100 to 300° for 0.5 to 1 hour, and then rubbing the resultant heated layer. The oriented layer in the invention is preferably a hardened layer obtained by hardening a layer containing a polymer, in which a reactive group is incorporated to the above described polymer, or a mixture of the above described polymer and an isocyanate compound or an epoxy compound.

The above described rubbing treatment may be carried out utilizing a treatment method which is widely employed as an LCD liquid crystal orientation process. That is, it is possible to employ a method in which orientation is obtained by rubbing the surface of a layer to be oriented in a definite direction, employing paper, gauze, felt, rubber, nylon, polyester fiber, and the like. Generally, the surface of the layer to be oriented is rubbed several times, employing a cloth prepared by uniformly planted fiber having a uniform length and diameter, whereby the rubbing treatment is suitably carried out.

Orientation of the optical compensation sheet of the invention shows a hybrid orientation or changes its inclined degree due to a surface energy of the plane which a liquid crystal layer contacts (for example, a support plane or atmospheric air) or kind of liquid crystal compounds mixed, which can control the orientation. For example, an inclined angle of the above described rod-shaped compounds on the support sine can be generally adjusted by selecting liquid crystal compounds used in the invention or compounds used in an orientated layer, or selecting rubbing treatment methods. An inclined angle of the liquid crystal compounds on the obverse side (contacting atmospheric air) can be generally adjusted by selecting liquid crystal compounds used in the invention or another compound (such as a plasticizer, a surfactant a polymerizable monomer or polymer) used together with them. The varying degree of the inclined angle can be generally adjusted by the methods described above.

Oriented layers suitable to give a nematic hybrid orientation to a liquid crystal compound used in the invention include a rubbed oriented layer containing polyimide, a rubbed oriented layer containing polyethersulfone, a rubbed oriented layer containing polyphenylene sulfide, a rubbed oriented layer containing polyethylene terephthalate, a rubbed oriented layer containing polyethylene naphthalate, a rubbed oriented layer containing polyacrylate, and a rubbed oriented layer containing cellulose type plastics.

The plasticizer, surfactant, or polymerizable monomer as described above may be any, as long as it has compatibility with liquid crystal compounds used in the invention, changes the inclined angle of liquid crystal compounds used in the invention or does not jeopardize orientation. Of these, a polymerizable monomer (for example, a compound having a vinyl group, a vinyloxy group, an acroyl group or a methacroyl group) is preferred. The above compounds can be used in an amount of 1 to 50 weight % (preferably 5 to 30 weight %) based on the amount of liquid crystal compounds used.

The polymer as described above may be any, as long as it has compatibility with liquid crystal compounds used in the invention or changes the inclined angle of liquid crystal compounds used in the invention. One example of the polymer is cellulose ester. The preferred examples of the cellulose esters include cellulose acetate, cellulose acetate propionate, hydroxypropyl cellulose and cellulose acetate butyrate. The above polymer can be used in an amount of 0.1 to 10 weight % (preferably 0.1 to 8 weight %, and more preferably 0.1 to 5 weight %) based on the amount of liquid crystal compounds used, so that it does not jeopardize orientation of the liquid crystal compounds used. In the cellulose acetate butyrate, the butyrylation degree is 30% or more, and preferably 30 to 80%, and the acetylation degree is 30% or more, and preferably 30 to 80%. The viscosity according to ASTM D-817-72) of the cellulose acetate butyrate is preferably in the range of from 0.01 to 20 seconds.

As the rubbing methods, there are a mask rubbing method rubbing with a mask having a definite shape while moving (K. Takatori et al., "A Complementary T LCD with Wide-Viewing Angle Grayscale", Japa Display' 92, pp 591) and a coating method coating plural compounds for orientation (T. Kamada et al., Wide-Viewing Angle Full-Color TFT LCDs", Japa Display' 92 E 886) The mask rubbing method and the method of coating plural compounds comprise complex processes.

Further, these methods, when an oriented layer is formed, change inclined angle (so-called, a pretilt angle) of the liquid crystal compounds used, and only form two symmetric pretilt angles. Therefore, the orientation direction is only single, and improvement of viewing angle is limited to a specific direction.

In addition to the rubbing method, as a controlling method of the orientation direction of the liquid crystal compounds used there is an oblique evaporation method for employing an oblique evaporation film of $SiO_2$ (Japanese Patent O.P.I. Publication No. 56-66826). In addition to $SiO_2$, the inorganic compounds for the oblique evaporation film include metal oxides such as $TiO_2$ and $ZnO_2$, fluorides such as $MgF_2$, and metals such as Au and Al. Metal oxides having a high dielectric constant can be used as the oblique evaporation compounds, and are not limited to the above metal oxides. An inorganic oblique evaporation film can be formed employing a vacuum evaporation device. The inorganic oblique evaporation film can be formed by vacuum evaporating inorganic compounds on the fixed support or continuously vacuum evaporating inorganic compounds on the moving web support. As other methods, there are proposed a photolithographic method for forming grating protrusions and concave on the surface of the orientation film according to photolithography (Japanese Patent O.P.I. Publication No. 60-60624), a LB film method for orienting a polymer chain on upper direction in providing a multi-layer on a support (Japanese Patent O.P.I. Publication No. 62-195622), an ion irradiation method for irradiating ion obliquely (Japanese Patent O.P.I. Publication No. 3-83017), a high speed liquid jetting method for jetting liquid with high speed obliquely Japanese Patent O.P.I. Publication No. 63-96631), an ice blasting method jetting ice obliquely (Japanese Patent O.P.I. Publication No. 63-96630), an eximer laser method for forming periodical stripes by irradiating an eximer laser to a polymer surface (Japanese Patent O.P.I. Publication No. 2-196219) an electron beam scanning method for forming fine protrusions and concaves by scanning a thermoplastic compound with an electron beam (Japanese Patent O.P.I. Publication No. 4-97130), a centrifugal method for orienting a polymer chair of a coated layer by centrifugal force (Japanese Patent O.P.I. Publication No. 63-21381), a stamping method for transferring orientation by laminating a layer oriented in advance onto another base by means of pressure Japanese Patent O.P.I. Publication No. 6-43457), a Y Toko et al. random orientation method for twisting orientation by adding a chiral agent (J. Appl. Phys. A74 (3) p. 2071 (1993)) and a Hasegawa et al. photo decomposition method for photo-decomposing a polyimide film employing a polarized ultraviolet light (Ekishotoronkai Yokoshu, p. 232, (Number 2G604)(1994)).

As another method for orienting liquid crystal compounds there is a method employing an electric field or a magnetic field. As the method for orienting liquid crystal compounds obliquely in the invention, a magnetic field is preferably used. When a solution containing a liquid crystal molecule dispersed in a polymer matrix is coated on a support and a magnetic field is applied to the coated at an angle to the direction perpendicular to the support plane, the liquid crystal molecule is oriented in the direction. In this case, the intensity of the magnetic field is preferably 500 G or more, but a liquid crystal compound with a low intrinsic viscosity can be oriented at not more than 500 G or less.

The oriented layer in the invention may be any combination of the above described, and is not specifically limited, but an appropriate combination of the oriented layers and liquid crystal compounds can provide an angle (a tilt angle) inclined to a base plane with respect to the sheet thickness direction, as described later.

Next, fixation of the orientation of the liquid crystal compounds in the invention will be explained below.

In the invention, in order to obtain a more stable optical compensation layer of an optical compensation sheet, fixation of the oriented liquid crystal compounds is carried out. In the invention, low molecular weight liquid crystal compounds are cross-linked with each other or the polymer matrix is cross-linked with low molecular weight liquid crystal compounds in order to fix orientation of the liquid crystal compounds. Therefore, the low molecular weight liquid crystal compounds preferably have, in their molecular ends, a reactive group such as a substituent having an unsaturated group or a substituent having an active hydrogen.

As the methods for fixing orientation of the liquid crystal compounds in the invention, all the conventional methods for fixation can be used. Generally, it is preferred that orientation and fixation of the orientation are simultaneously carried out. For example, fixation of the orientation is carried out by forming a liquid crystal compound layer containing a low molecular weight liquid crystal compound or a high molecular weight liquid crystal compound on a support while maintaining at a temperature range (which varies due to kind of liquid crystal compounds, for example, from room temperature to 100° C.) developing its liquid crystal phase, orienting the liquid crystal compound, and fixing it by cooling to room temperature. The fixation is also carried out by coating a solution, in which a liquid solvent, on an oriented layer, drying the coated layer, heating the dried layer to a temperature developing a nematic phase, fixing the heated layer while maintaining the orientation (nematic phase), and cooling it. The fixation is also carried out by coating a solution, in which a liquid crystal compound and another compound (for example, a photopolymerizable monomer and a photopolymerization initiator) are dissolved in a solvent, on an oriented layer, drying the coated layer, heating the dried layer to a temperature developing a nematic phase, polymerizing the monomer (for example, by ultraviolet light irradiation).

As another method for fixing orientation, there are the following methods: a method of fixing orientation of liquid crystal compounds wherein a liquid crystal compound having at unsaturated bond is polymerized optionally in the presence of a photopolymerization initiator or a thermal polymerization initiator by heat or light; a method of fixing orientation of liquid crystal compounds wherein a mixture of liquid crystal compounds having in their molecular ends a reactive group such as a substituent having an unsaturated group or a substituent having an active hydrogen and a polymer matrix is heated, light-irradiated or pH changed to react; and a method of fixing orientation of liquid crystal compounds wherein liquid crystal compounds having a reactive group are cross-linked to another in an individual liquid crystal domain. However, in the invention the fixation is not limited to the above described.

The examples of the thermal polymerization initiator include an azo compound, an organic peroxide, an inorganic peroxide, and sulfinic acid. The examples of the photopolymerization initiator include benzophenones, acetophenones, benzoins, and thioxanthones.

The layer structure regarding the optical compensation sheet of the invention will be explained below.

The layer structure in the invention is not specifically limited, as long as there are at least two layers satisfying the orientation requirements as described above. The examples of the layer structure include the following structures. For explanation, an optically anisotropic layer, which has a birefringent layer, is regarded as being comprised of an oriented optically positive uniaxial rod-shaped liquid crystal compound. Regarding change of the angle of the optic axis of the liquid crystal molecule to the sheet plane, the change increases or decreases in the definite direction from A plane (one side) to B plane (the other side) of the sheet, and is described below as an "increasing layer" or a "decreasing layer", respectively. Viewing the layer structure from one side (the A plane) of the sheet, the following structures are considered:

(1) support/"increasing layer"/"decreasing layer"
(2) supper/"decreasing layer"/"increasing layer"
(3) "increasing layer"/support/"decreasing layer"
(4) "decreasing layer"/support/"increasing layer"
(5) support/"decreasing layer"/"increasing layer"/support
(6) support/"increasing layer"/"decreasing layer"/support The "increasing layer" or "decreasing layer" may be a plurality of layers, respectively. A combination of plural increasing layers or plural decreasing layers may show a combined effect.

Sheet (1) or (2) is prepared by providing a first oriented liquid crystal compound layer on a first support, through an oriented layer giving an ordinary pretilt angle from more than 0 to 40 degrees), similarly providing a second oriented liquid crystal compound layer on a second support, and transferring only the second oriented liquid crystal compound layer onto the first oriented liquid crystal compound layer, for example, through an adhesive layer. Sheet (5) or (6) is prepared in the same manner as above, except that the second support is also transferred.

The latter method in which the support is transferred makes it possible to more easily prepare the optical compensation sheet of the invention. That is, an optically anisotropic, layer is formed on a support, and the resulting sheet is folded in two sheets along an axis inclined at 45 degrees to the orientation direction in the plane with the support facing outwardly, and the optically anisotropic layers of the two folded half sheets are adhered to each other.

Sheet (1) can be also prepared by another method. For example, sheet (1) is prepared by providing a first oriented liquid crystal compound layer on a support, through an oriented layer giving an ordinary pretilt angle, and providing a second oriented liquid crystal compound layer on the first oriented liquid crystal compound layer, through an oriented layer giving a homeotropic orientation.

Similarly, sheet (2) is prepared in the same manner as in sheet (1) above, except that the first and second layers are interchanged.

Sheet (3 or (4) is a sheet having an oriented liquid crystal compound layer, through an oriented layer with similar properties, on each side of a support, the oriented layer on one side giving a homeotropic orientation, and the oriented layer on the other side giving an ordinary pretilt angle. Typically, sheet (3) or (4) can be obtained by providing an oriented liquid crystal compound layer on each side of a support. As another method, sheet (3) or (4) can be obtained by providing an optically anisotropic layer on a support, folding the resulting sheet in two sheets along an axis inclined at 45 degrees to the orientation direction in the plane, with the support facing inwardly, and adhering the supports of the two folded half sheets. In any layer structure as described above the angle between the orientation direction in the plane of one optically anisotropic layer and that of the other is approximately 90 degrees.

Arrangement of the optical compensation sheet of the invention adhered to a liquid crystal cell will be explained below.

The optical compensation sheet of the invention is preferably arranged so that the orientation direction of one optically anisotropic layer is in accordance with the transmission axis of the polarizing plate. The axis deviation from the orientation direction, if a little, has no problem, but is required to fall within the range of approximately ±5 degrees in order to maintain a definite effect.

Arrangement of the optical compensation sheet of the invention and the liquid crystal cell in the display panel will be explained employing the following typical example. The optical compensation sheet, comprising a first optically anisotropic layer and a second optically anisotropic layer in order from the display side, is arranged on the display side (observer side) of the liquid crystal cell, so that when the rubbing direction of the display side surface of the liquid crystal cell is inclined at 45 degrees in the direction from the upper right side to the lower left side of the display panel, the angle between the orientation direction the plane of the first layer and the sheet plane decreases in the direction of from the upper right side to the lower left side and the angle between the orientation direction in the plane of the second layer and the sheet plane decreases in the direction of from the upper left side to the lower right side. The present invention is not necessarily limited to this arrangement, but different arrangement produces a little different effect.

Next, an adhesive layer between the optically anisotropic layer and the support in the invention will be explained.

It is preferred in the optical compensation sheet of the invention that an adhesive layer is provided to improve adhesion between the polarizing element (or liquid crystal cell) and the support.

An adhesive layer or sticky layer is preferably provided between the liquid crystal, cell and the optical compensation sheet of the invention. Techniques disclosed in Japanese Patent O.P.I. Publication No. 2000-235117 can be used as a sticky layer, but the sticky layer in the invention is not specifically limited to these techniques. The sticky layer has a peeling strength of preferably 300 g/cm or more, more preferably 400 g/cm or more, and most preferably 500 g/cm or more. It is preferred in the optical compensation sheet that a UV hardened layer is provided on one side of the support and an adhesive layer for improving adhesion between the support and the polarizing element (or liquid crystal cell) is provided on the side of the support opposite the UV hardened layer.

The adhesive layer may be one or two or more layers. A hydrophilic polymer is preferably used as the adhesion layer in order to provide easier adhesion. Examples of the hydrophilic polymer include —COOH group-containing polymers such as preferably, a —COOH group-containing vinyl acetate-maleic acid copolymer, hydrophilic cellulose derivatives, vinyl alcohol derivatives, natural polymers, hydrophilic polyester derivatives, and polyvinyl derivatives.

The support used in the optical compensation sheet of the invention will be explained below.

The support in the invention is preferably a transparent support and more preferably a support having a transmittance of 80% or more. As materials of the support, a support made of materials with a small specific birefringence index such as triacetyl cellulose is preferable. A triacetyl cellulose film produced by Konica Corporation can be used as the support.

Materials with a good transmittance and a large specific refractive index are also preferable, if they have an isotropic property on viewing particularly from the front side at is manufacture. Such materials include Zeonex (produced by Nihon Zeon Co., Ltd.), and ARTON (produced by Nihon Gosei Gomu Co., Ltd.). Further, materials with a large specific birefringence index such as polycarbonate, polyacrylate, polysulfone and polyethersulfone can be applied by appropriate selection of manufacturing conditions such as solution casting, extrusion casting, longitudinal stretching and traverse stretching.

The support used in the invention is not specifically united as long as it is transparent, but a substantially optically isotropic support is preferable in that anisotropic properties of the optical compensation sheet can be controlled by a liquid crystal compound layer used.

A TN type liquid crystal cell shows a positive uniaxial property at black display during which the liquid crystal molecules present in the middle portions of the liquid crystal layer align perpendicularly. In order to increase further optical compensation ability in those portions, it is preferred that the support is a support having a negative uniaxial property with the optic axis in the normal direction, or a support having a biaxial property in which refractive index anisotropy in the plane is different and having a lower refractive index in the direction normal to the support plane (nx≠ny>nz, wherein nx represents one direction in the support plane, ny represents the direction perpendicular to nx, and nz represents the support thickness direction). As materials having such characteristics, includes acetylcellulose propionate. Acetylcellulose propionate preferably has an acetyl substitution degree of 2.0 and a propionyl substitution degree of 0.8.

When the optical compensation sheet of the invention is used in the liquid crystal display, it is preferable that the area in which image reversal is not produced is wider, and it is particularly preferable that image reversal is not produced in the lower side. Even in the direction that image reversal is easy to produce, the area with no image reversal is within the direction inclined at preferably not less than 20°, more preferably not less than 15°, and most preferably not less than 30° to the direction perpendicular to the display panel plane. The polarizing plate for elliptically polarized light in which the optical compensation sheet of the invention is adhered to a polarizing plate for elliptically polarized light, is also preferably embodiment of the invention. The polarizing plates for elliptically polarized light include a polarizing plate for linearly polarized light and a polarizing plate for circularly polarized light. The liquid crystal display of the invention comprises a liquid crystal cell provided between a first polarizing plate on the display side and a second polarizing plate on the back light side. The optical compensation sheet of the invention is provided either between the liquid crystal cell and the first polarizing plate or between the liquid crystal cell and the second polarizing plate. The preferred liquid crystal cell include a liquid crystal cell prepared by incorporating a nematic type liquid crystal compound between the two substrates, the orientation direction of which intersects each other at approximately 90 degrees.

In the invention, it is preferred that the orientation direction of one optically anisotropic layer is approximately perpendicular to the transmission axis of the first polarizing plate and is approximately parallel to the transmission axis of the second polarizing plate, or the orientation direction of one optically anisotropic layer is approximately perpendicular to the transmission axis of the second polarizing plate and is approximately parallel to the transmission axis of the first polarizing plate.

The liquid crystal display in the invention will be explained employing FIG. 8 to 38.

Figure 8:
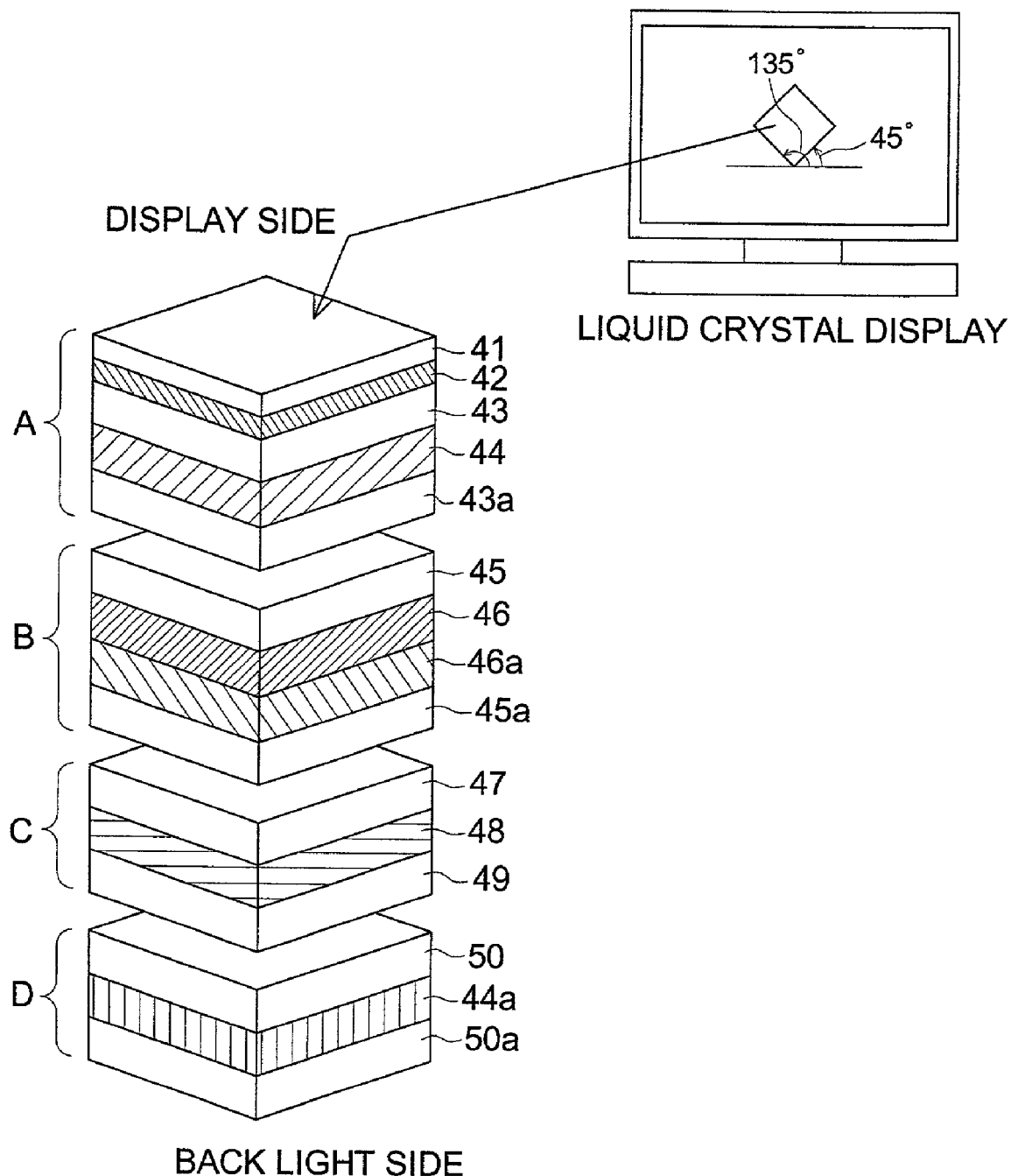
FIG. 8 shows one embodiment of preferable layer structures used in the liquid crystal display of the invention.
Figure 15:
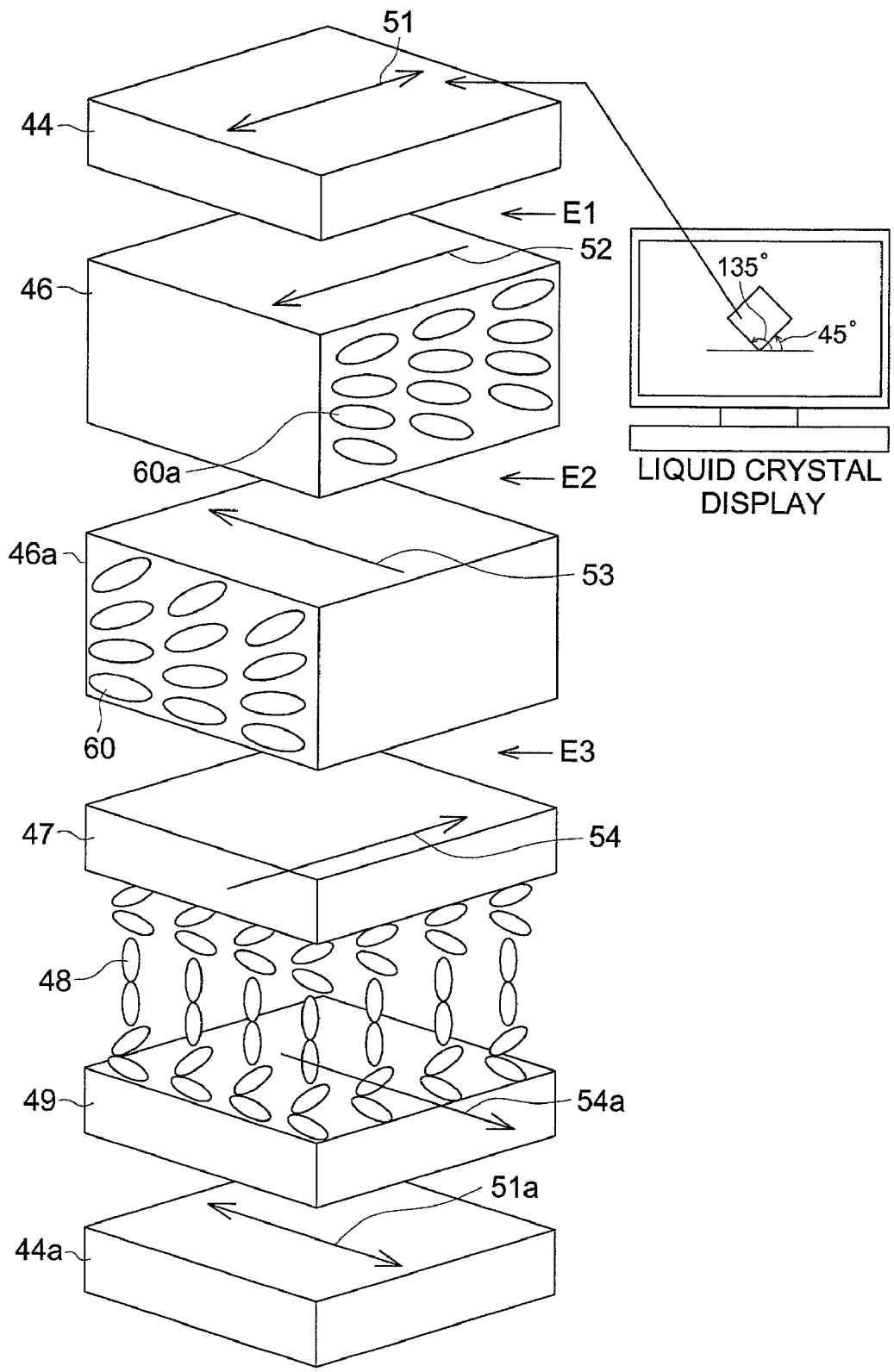
FIG. 15 shows the sectional view of one embodiment of structures used in the liquid crystal display of the invention.
Figure 16:
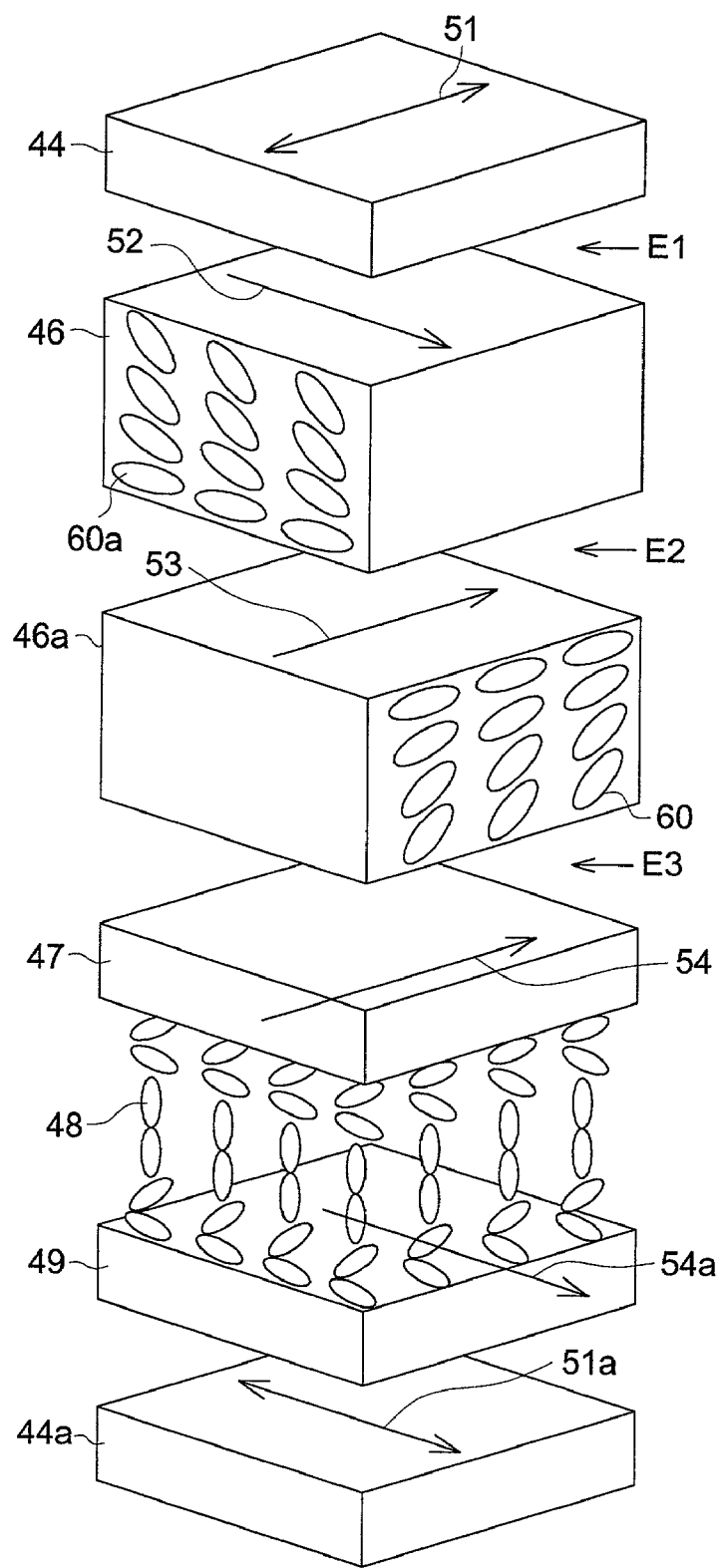
FIG. 16 shows the sectional view of one embodiment of structures used in the liquid crystal display of the invention.
Figure 17:
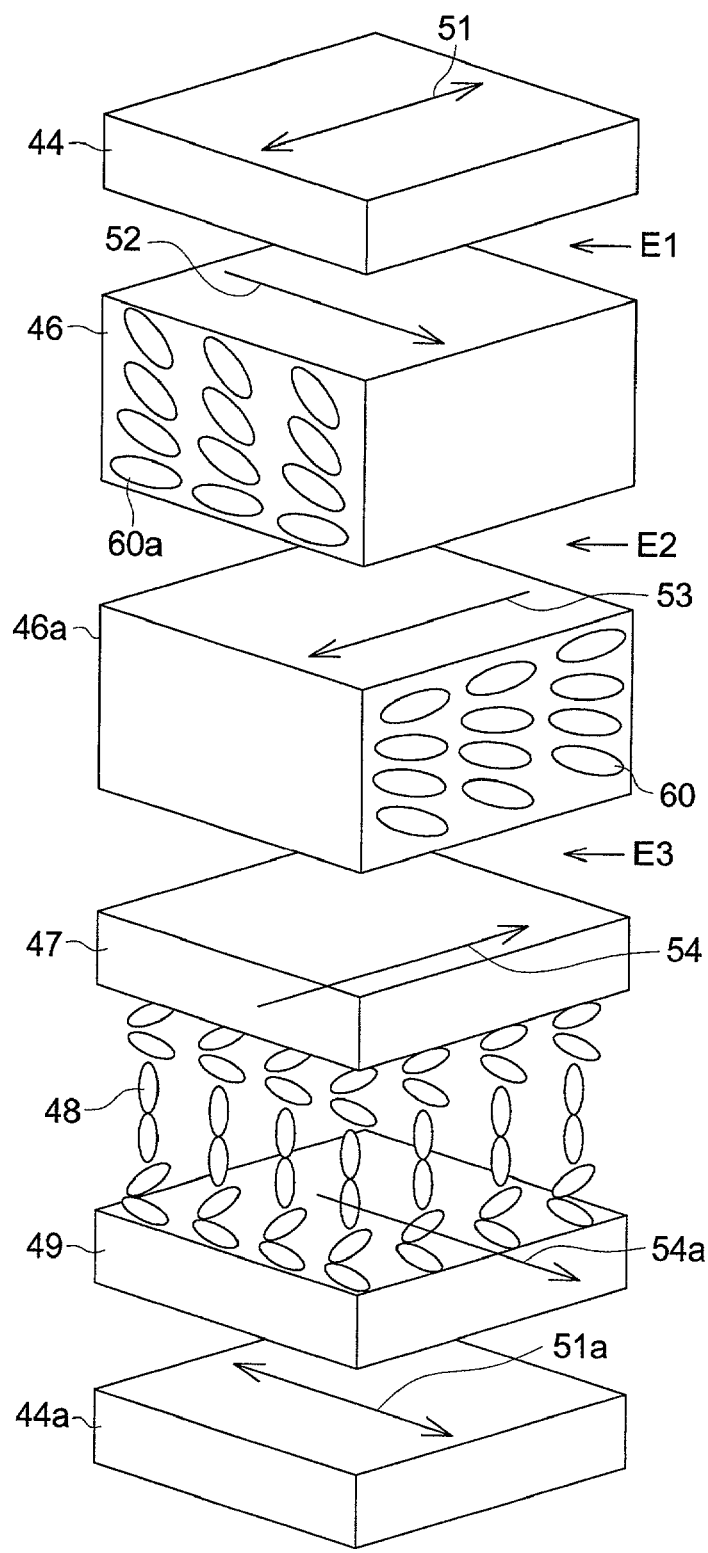
FIG. 17 shows the sectional view of one embodiment of structures used in the liquid crystal display of the invention.
Figure 18:
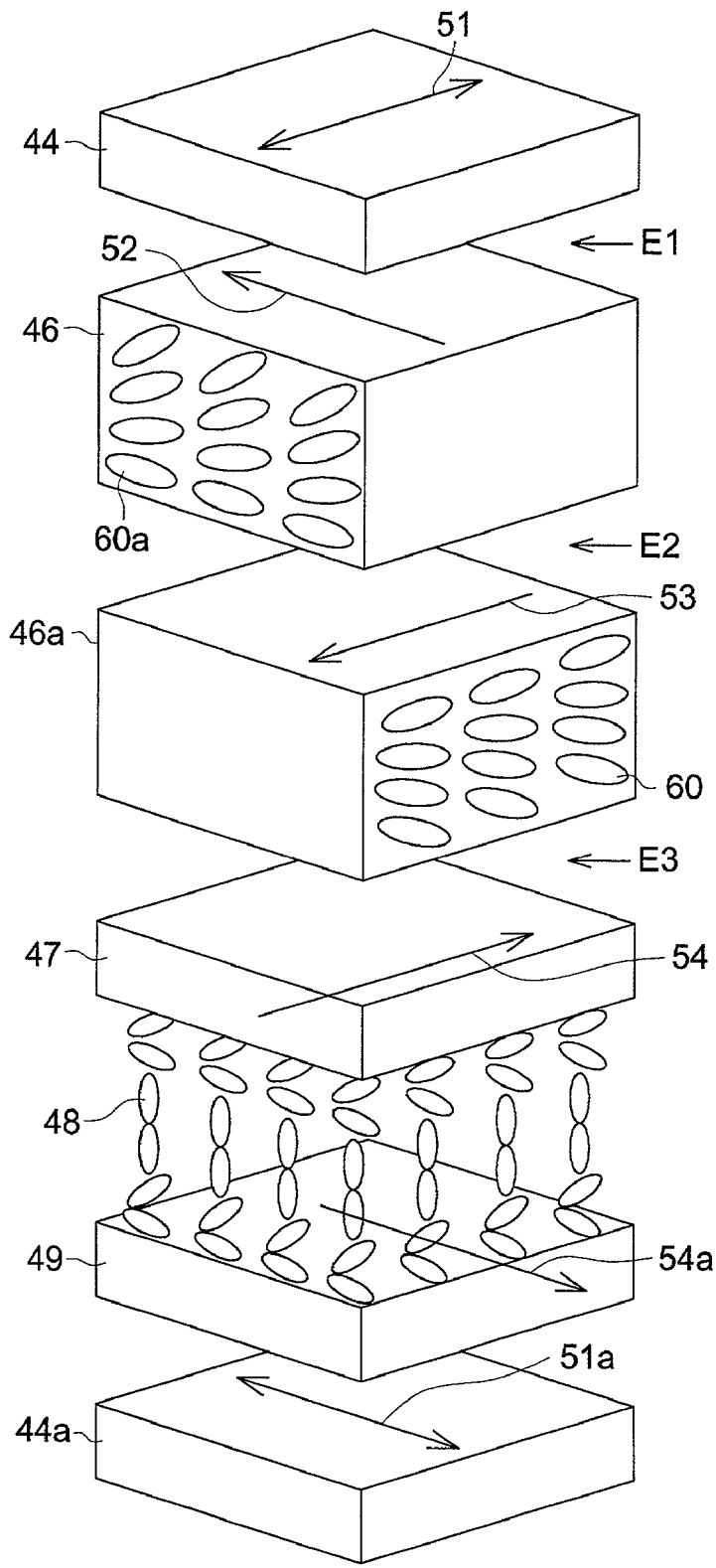
FIG. 18 shows the sectional view of one embodiment of structures used in the liquid crystal display of the invention.
Figure 19:
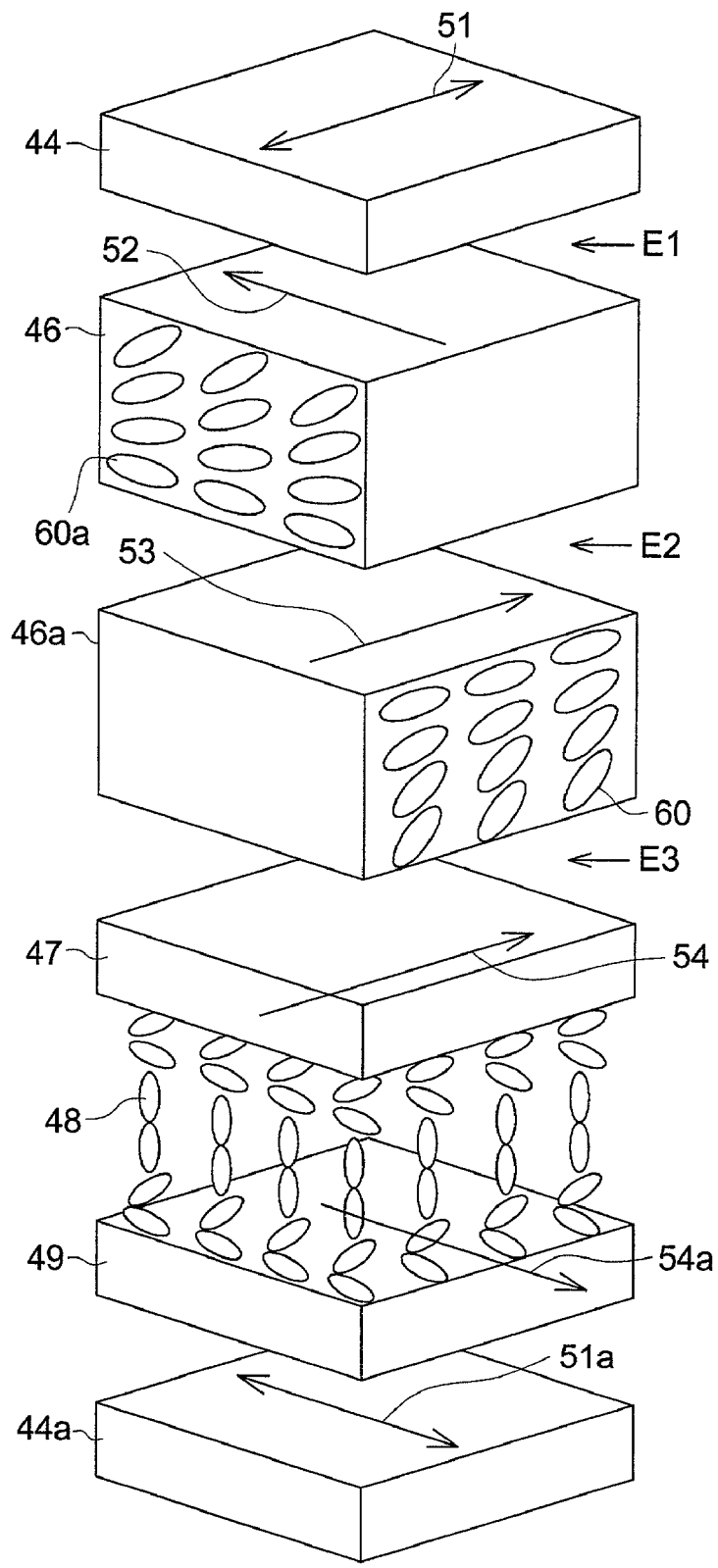
FIG. 19 shows the sectional view of one embodiment of structures used in the liquid crystal display of the invention.
Figure 20:
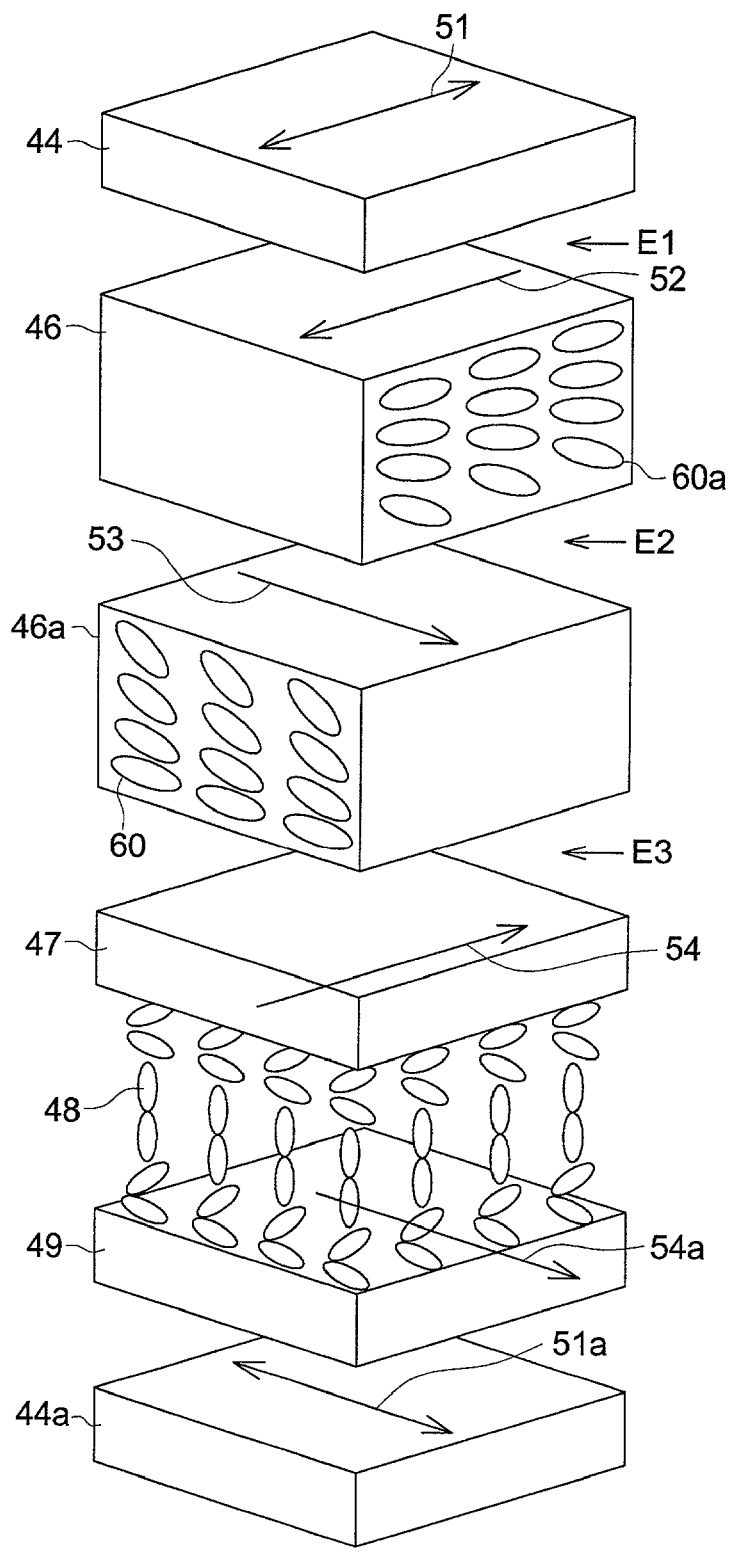
FIG. 20 shows the sectional view of one embodiment of structures used in the liquid crystal display of the invention.
Figure 21:
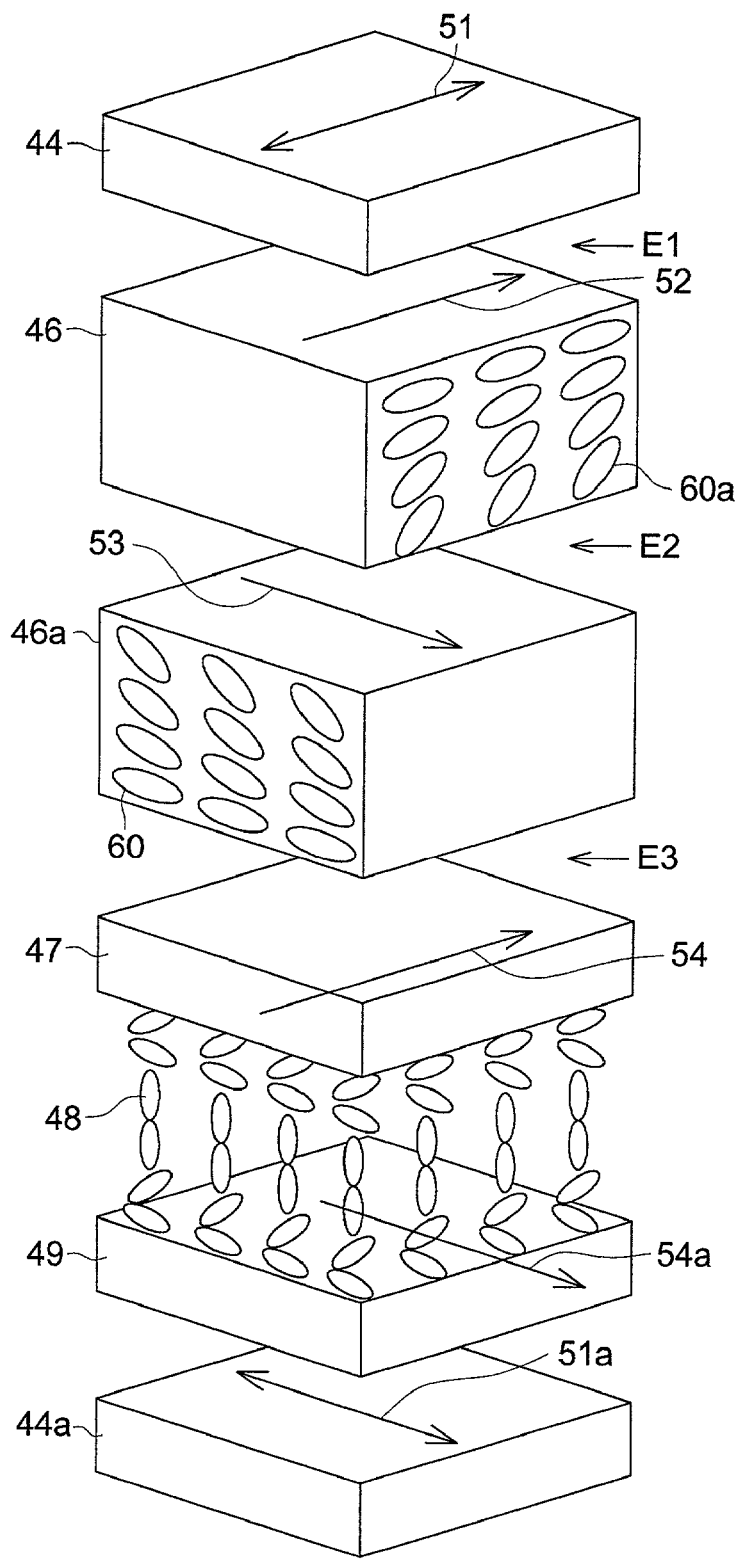
FIG. 21 shows the sectional view of one embodiment of structures used in the liquid crystal display of the invention.
Figure 22:
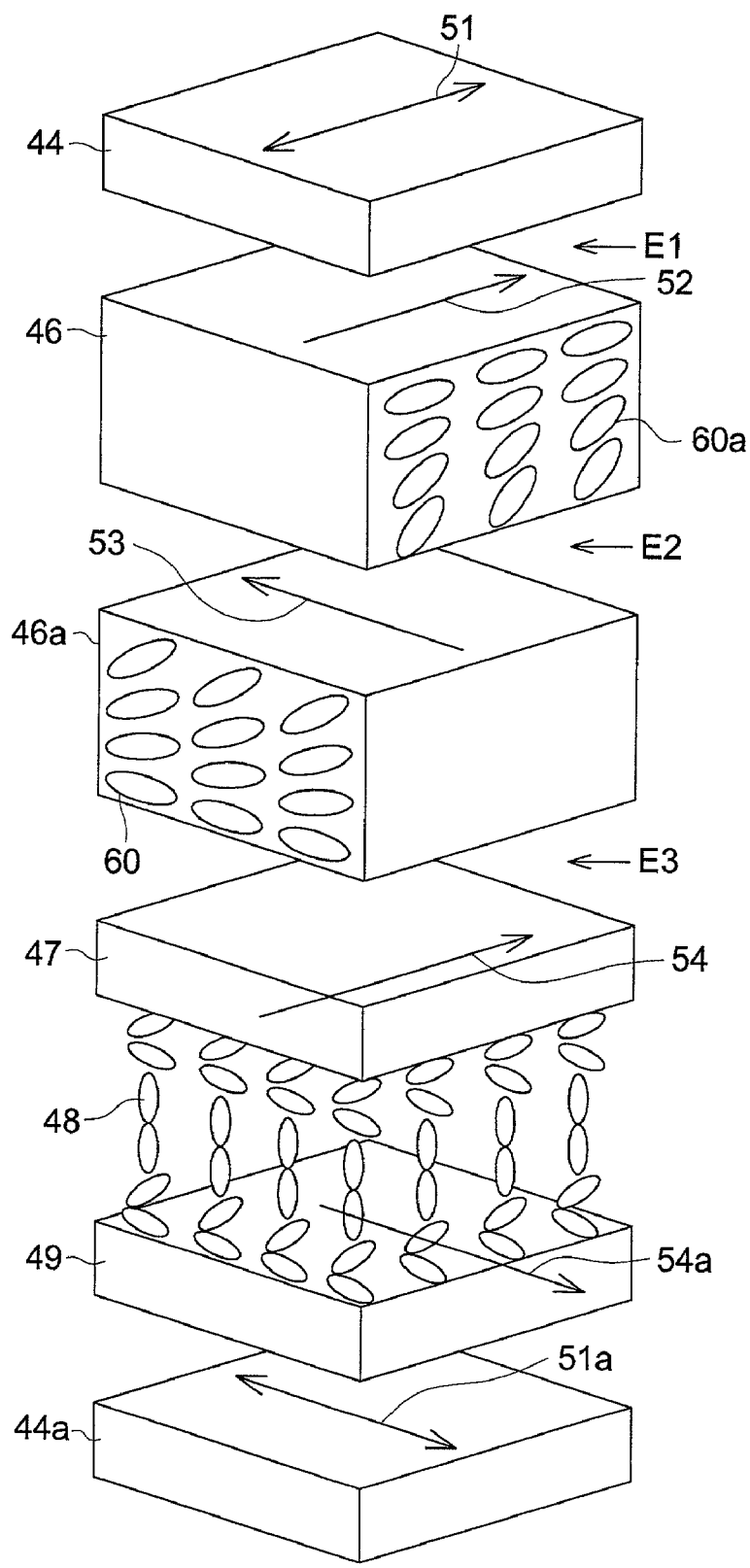
FIG. 22 shows the sectional view of one embodiment of structures used in the liquid crystal display of the invention.
Figure 23:
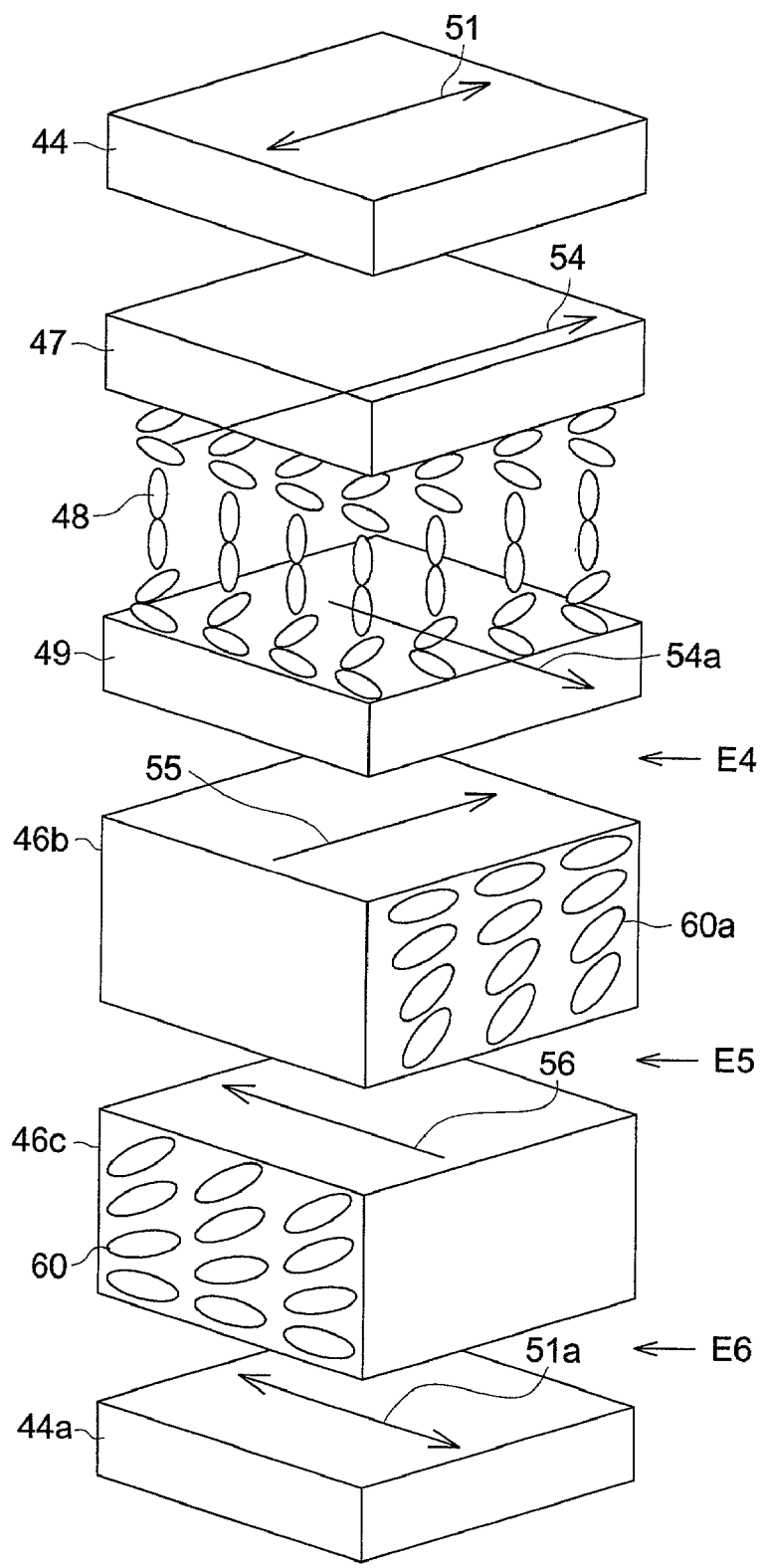
FIG. 23 shows the sectional view of one embodiment of structures used in the liquid crystal display of the invention.
Figure 24:
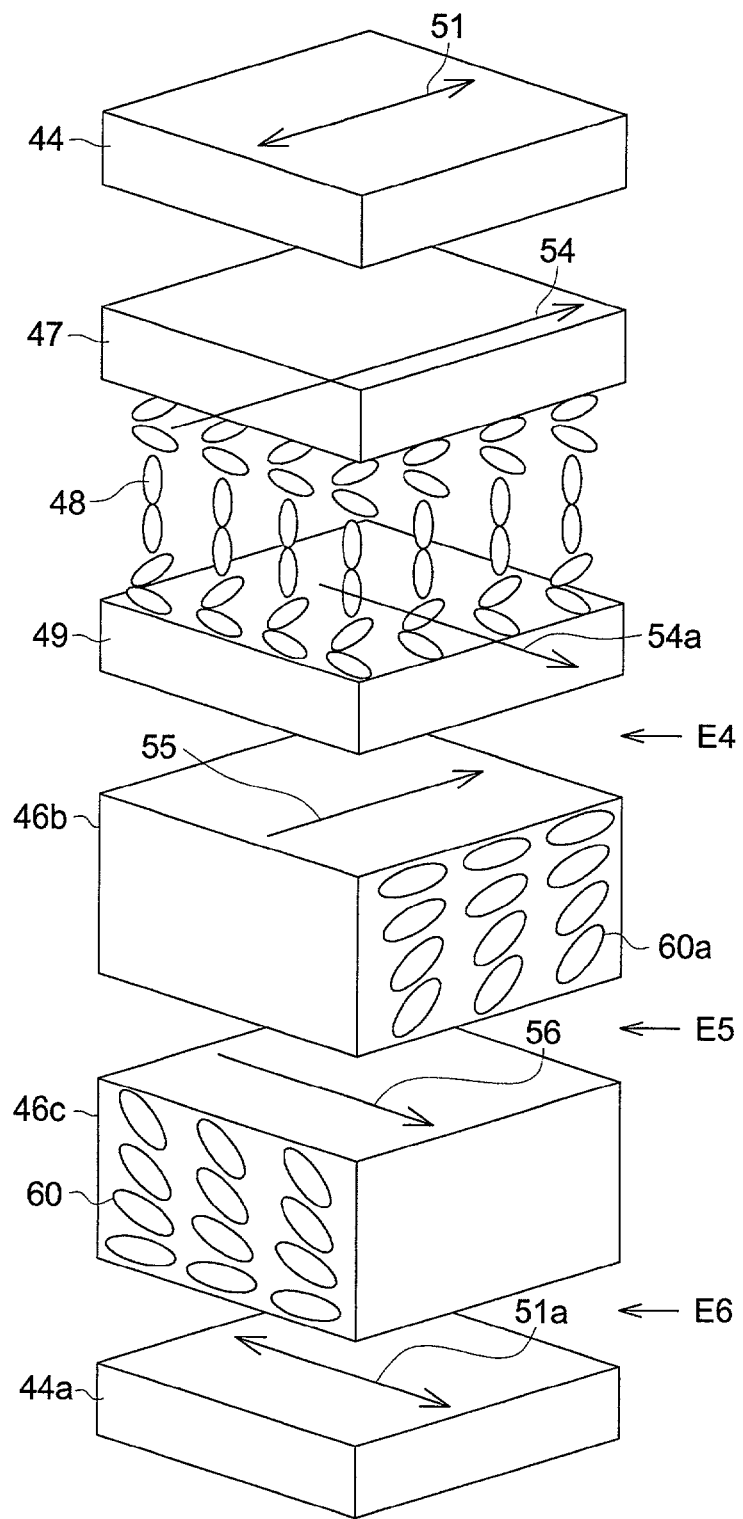
FIG. 24 shows the sectional view of one embodiment of structures used in the liquid crystal display of the invention.
Figure 25:
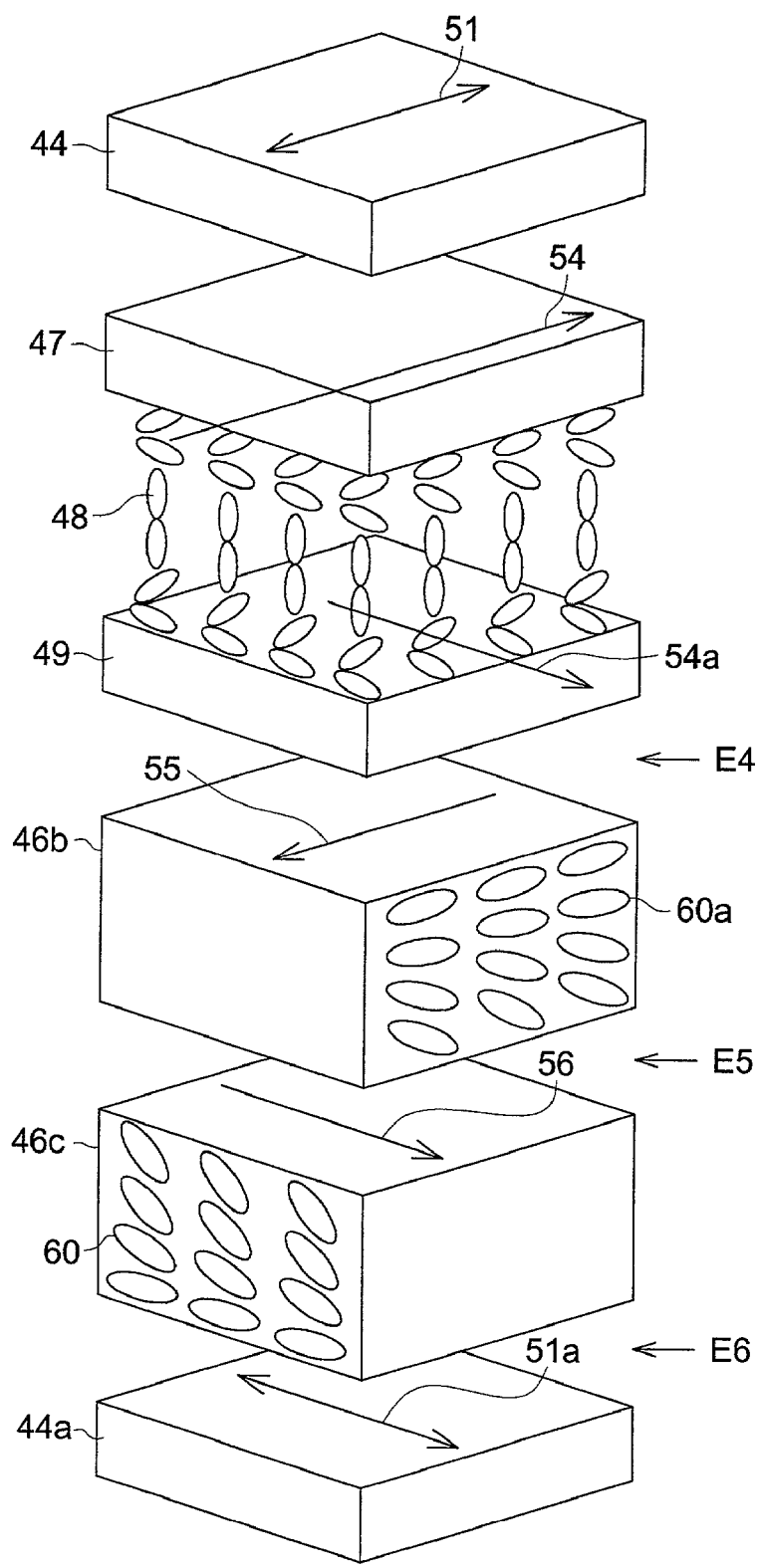
FIG. 25 shows the sectional view of one embodiment of structures used in the liquid crystal display of the invention.
Figure 26:
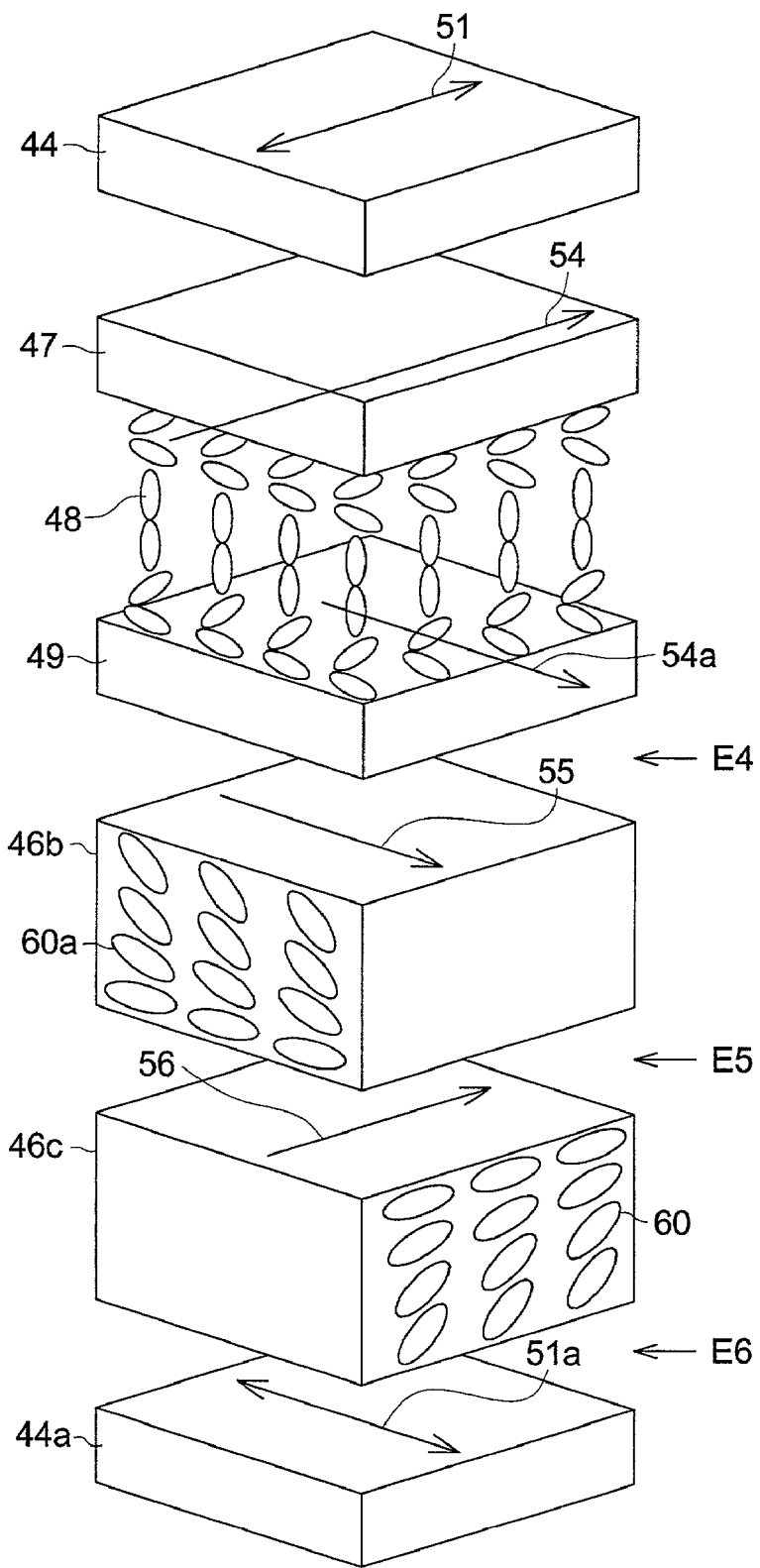
FIG. 26 shows the sectional view of one embodiment of structures used in the liquid crystal display of the invention.
Figure 27:
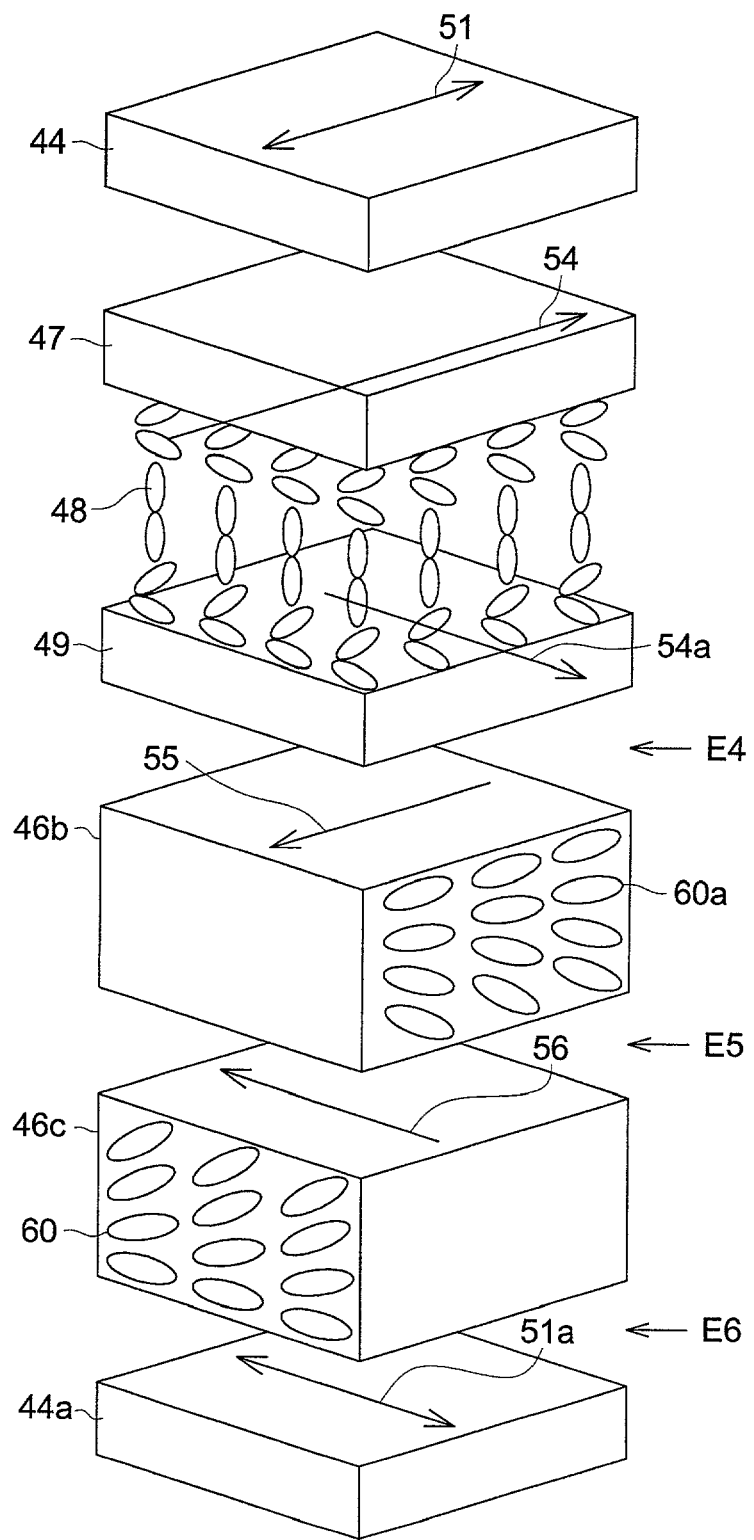
FIG. 27 shows the sectional view of one embodiment of structures used in the liquid crystal display of the invention.
Figure 28:
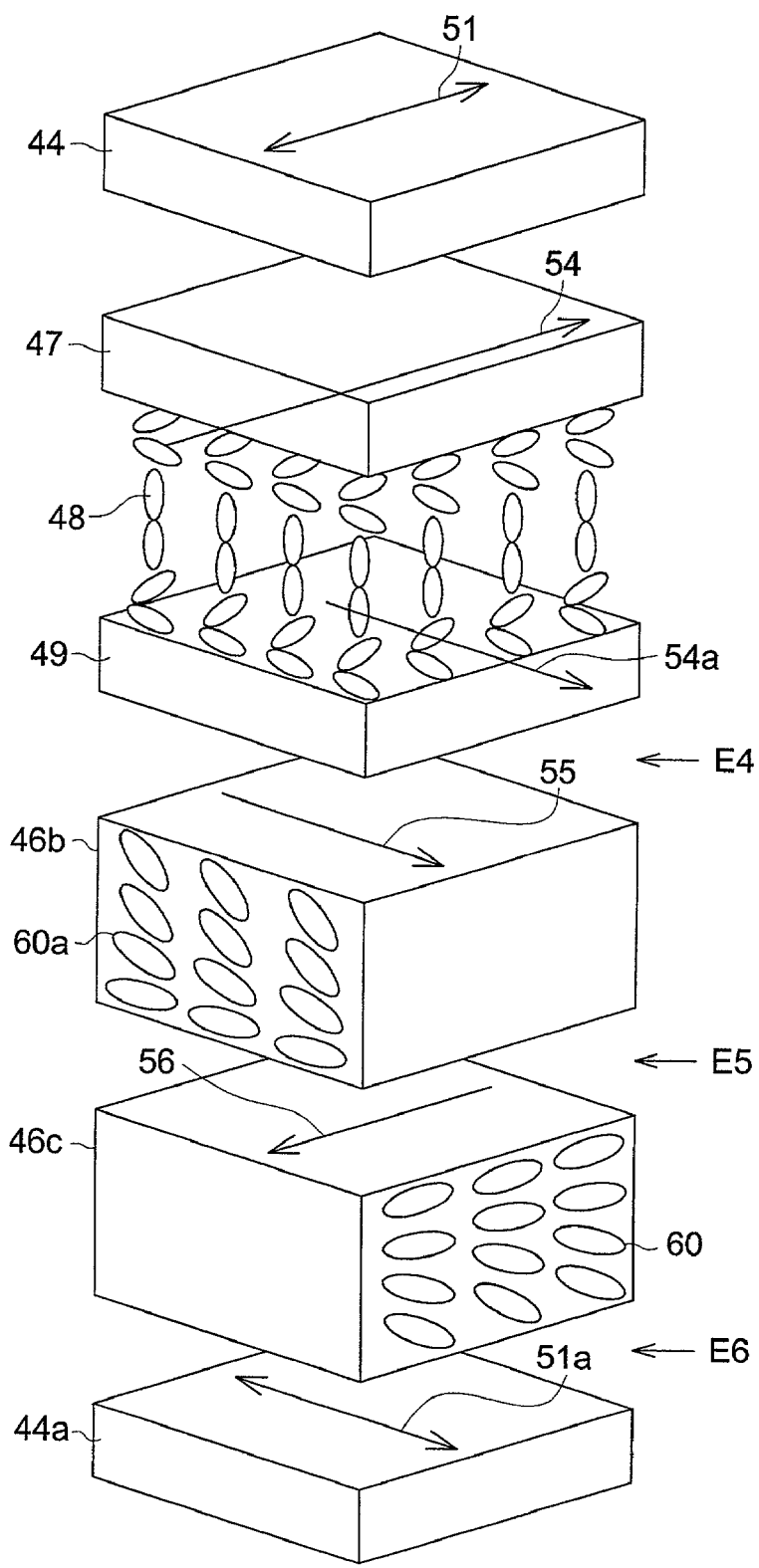
FIG. 28 shows the sectional view of one embodiment of structures used in the liquid crystal display of the invention.
Figure 29:
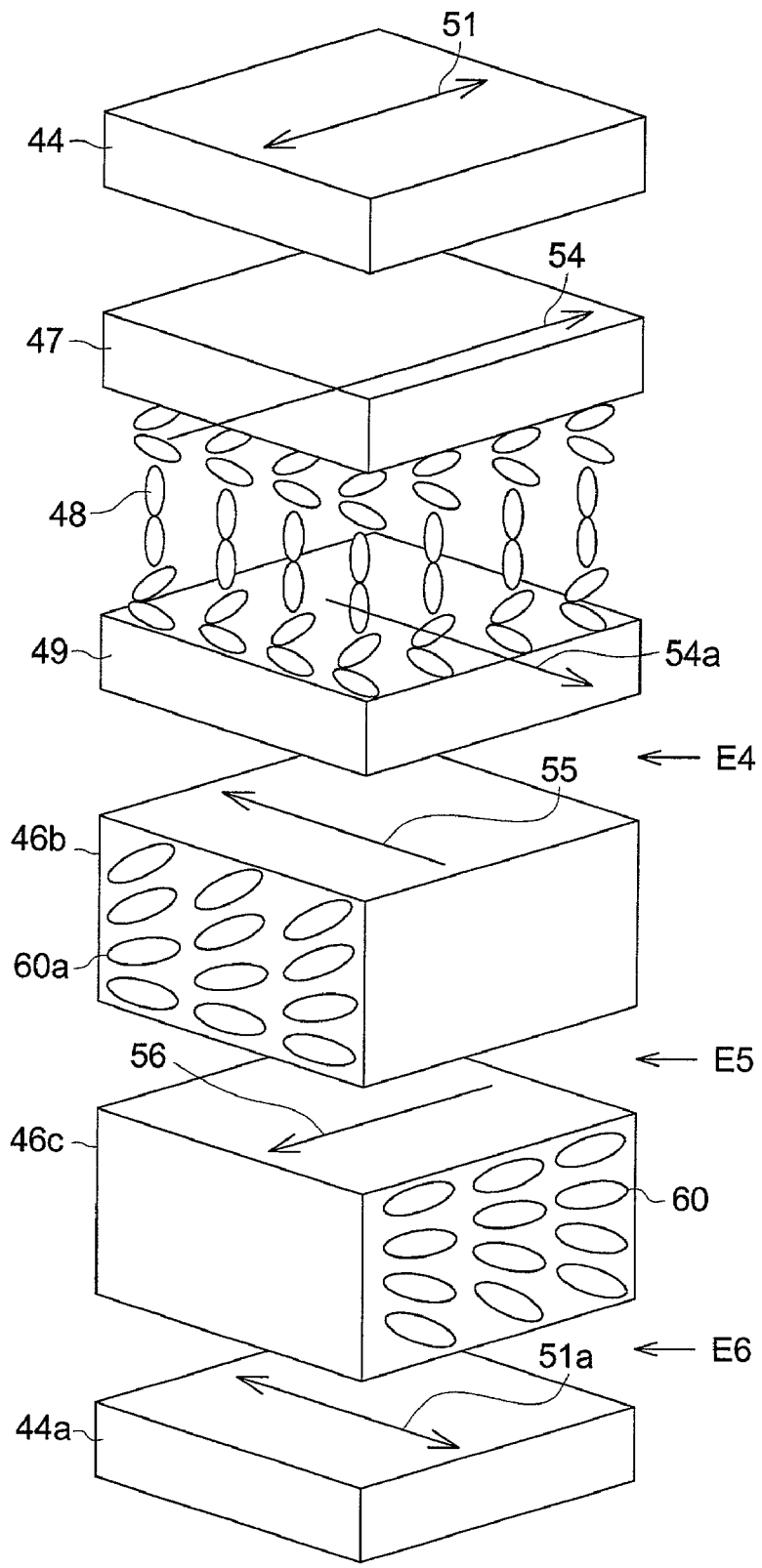
FIG. 29 shows the sectional view of one embodiment of structures used in the liquid crystal display of the invention.
Figure 30:
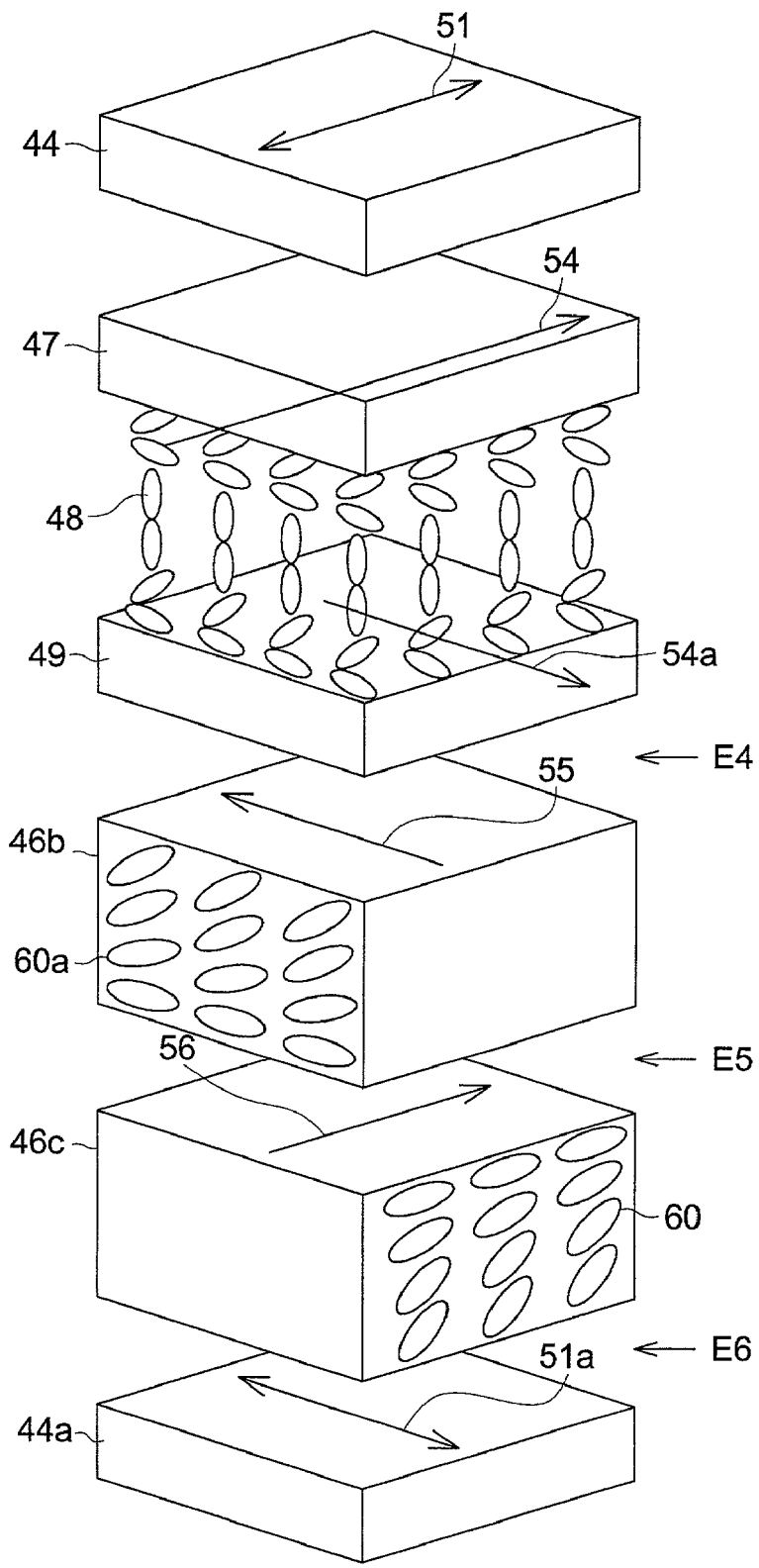
FIG. 30 shows the sectional view of one embodiment of structures used in the liquid crystal display of the invention.
Figure 31:
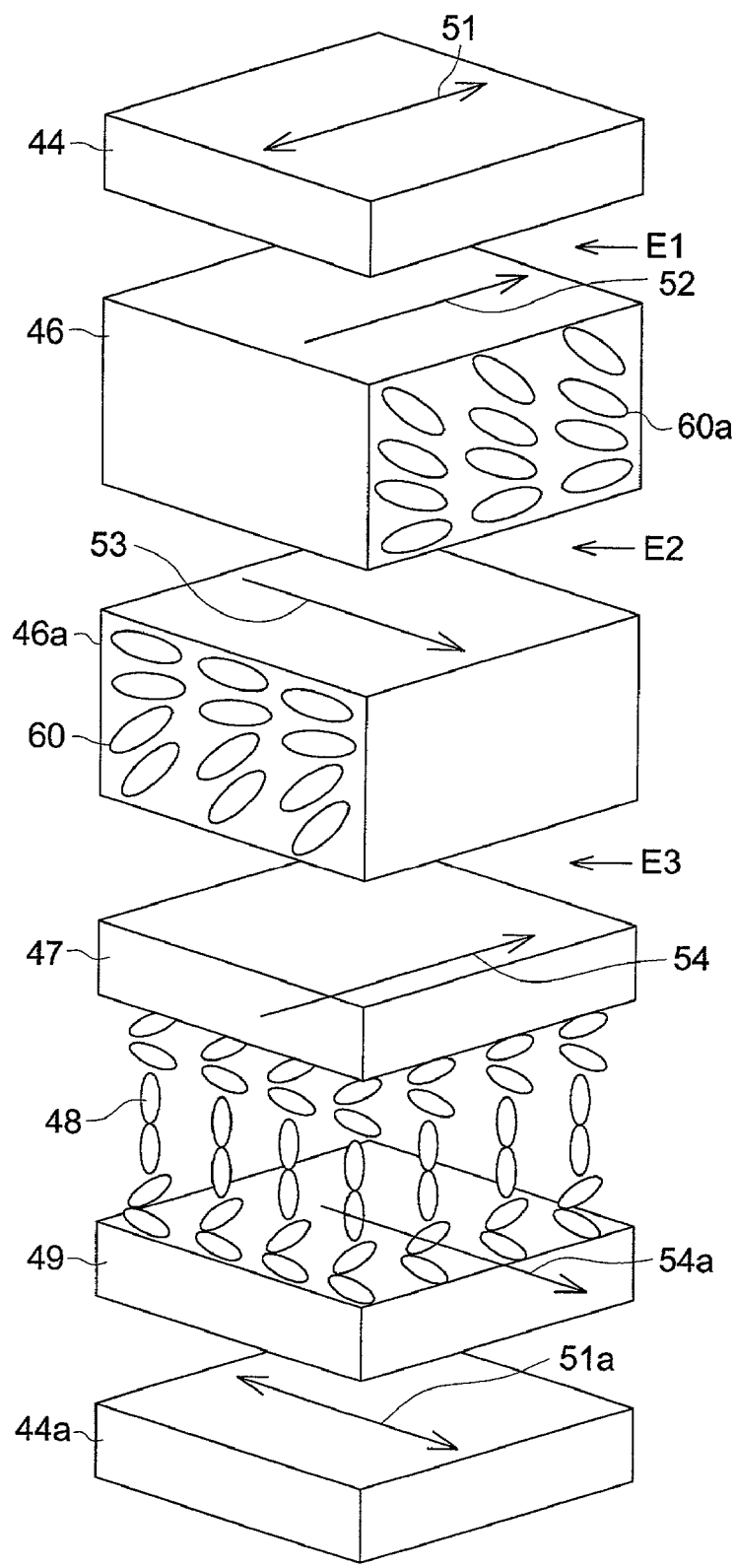
FIG. 31 shows the sectional view of one embodiment of structures used in the liquid crystal display of the invention.
Figure 32:
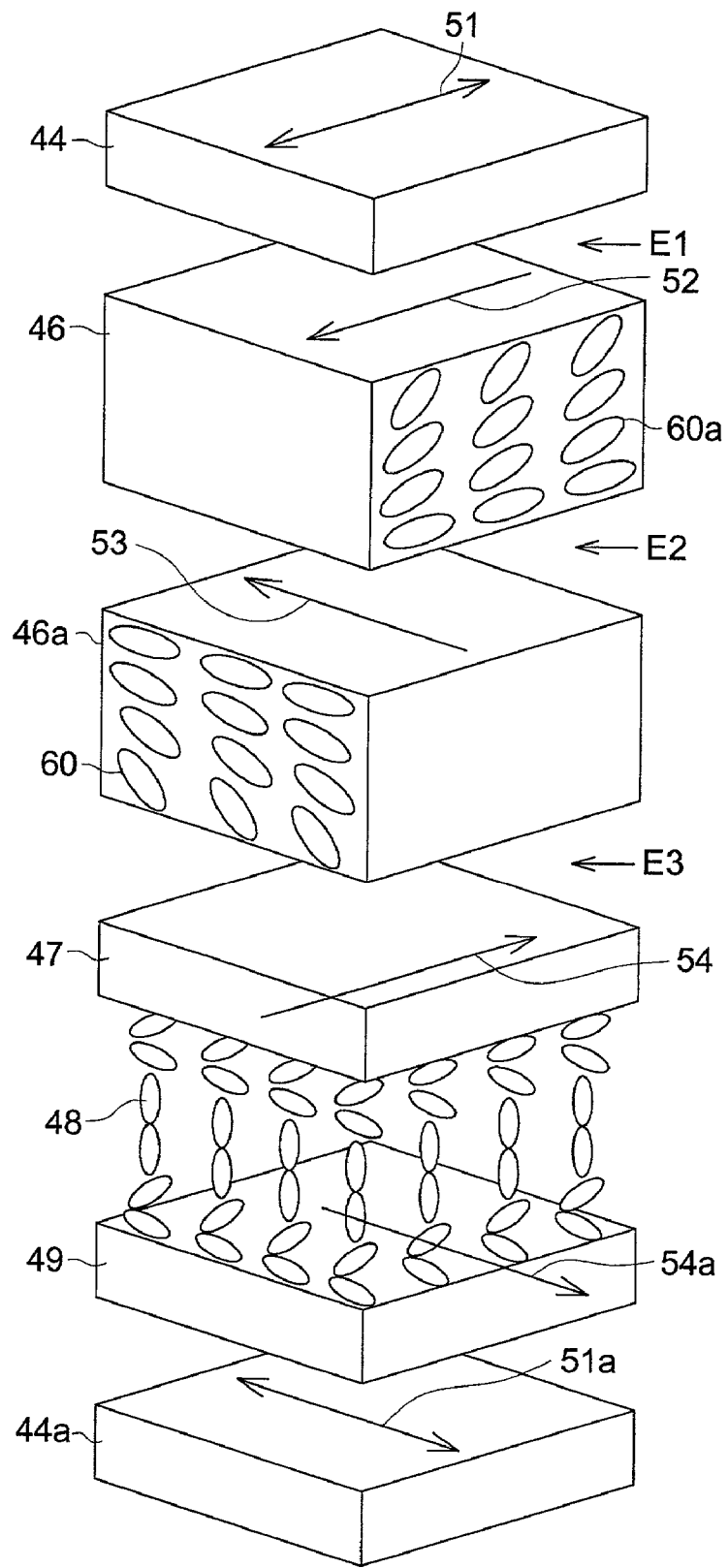
FIG. 32 shows the sectional view of one embodiment of structures used in the liquid crystal display of the invention.
Figure 33:
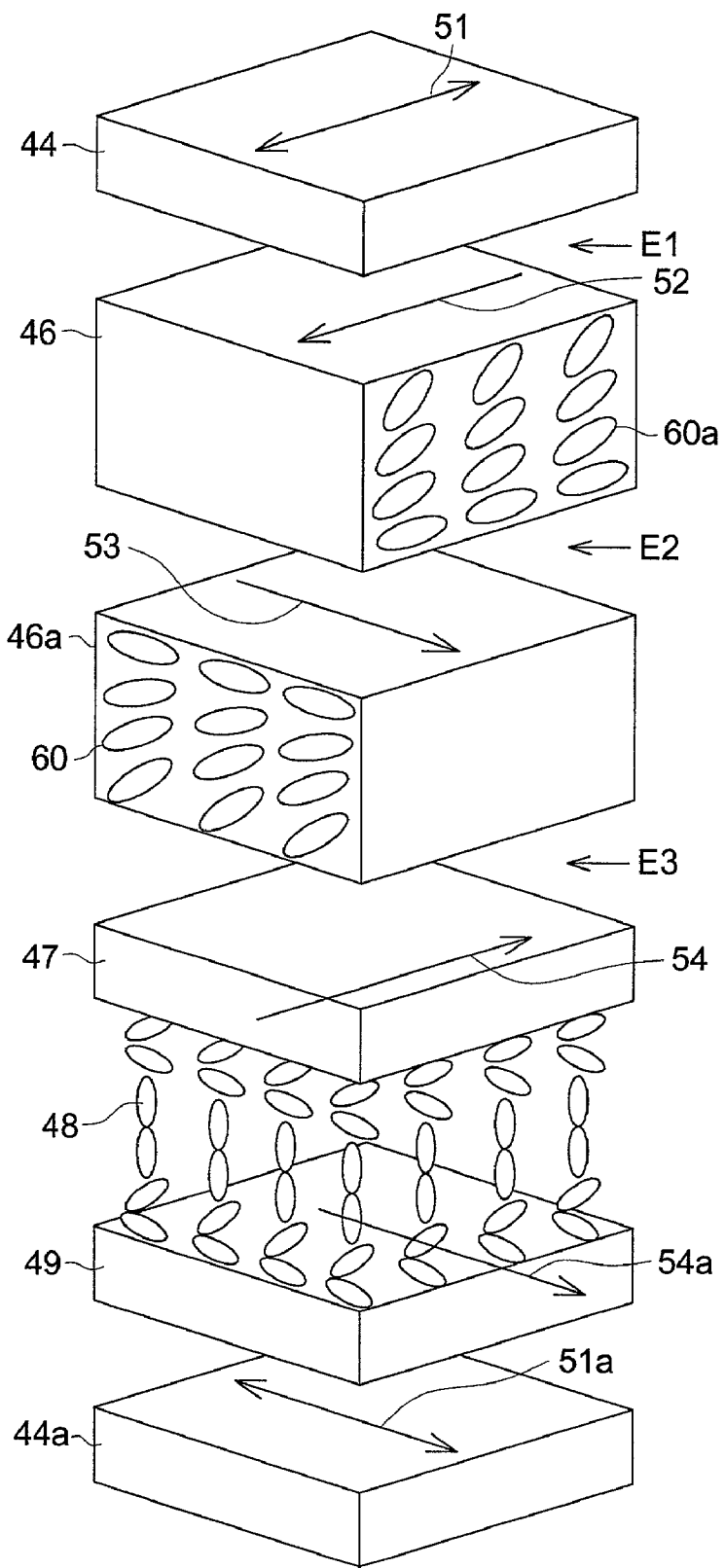
FIG. 33 shows the sectional view of one embodiment of structures used in the liquid crystal display of the invention.
Figure 34:
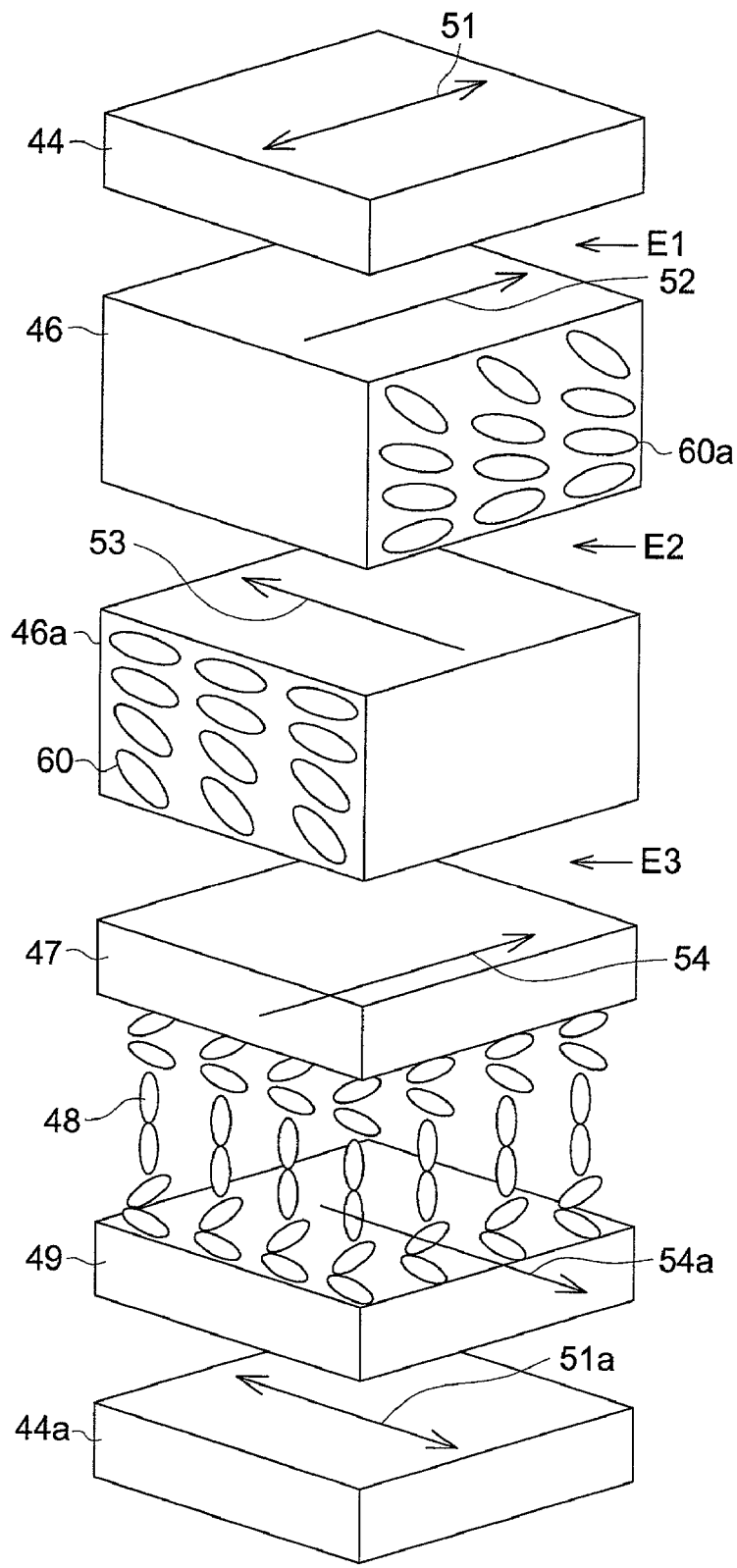
FIG. 34 shows the sectional view of one embodiment of structures used in the liquid crystal display of the invention.
Figure 35:
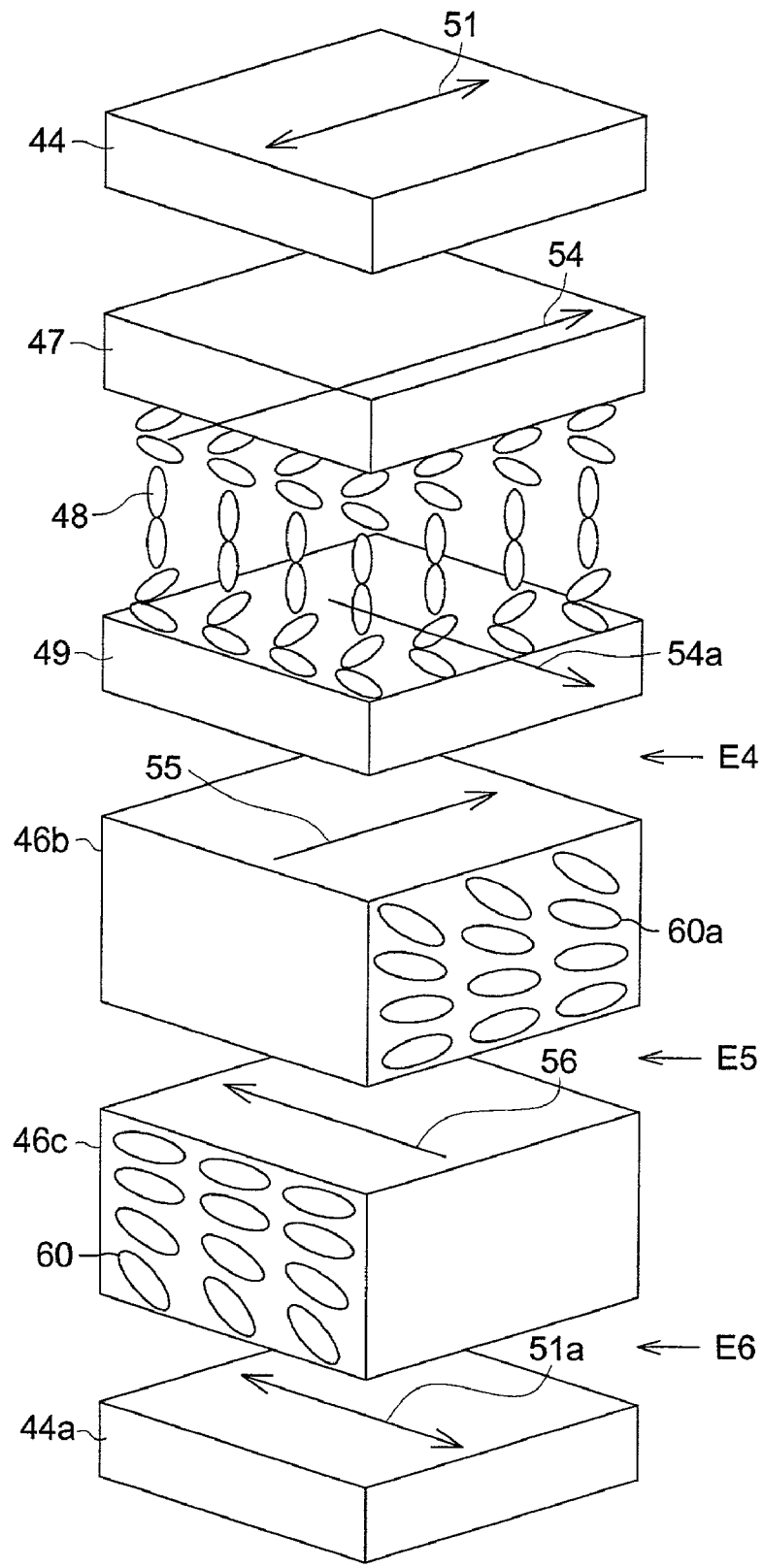
FIG. 35 shows the sectional view of one embodiment of structures used in the liquid crystal display of the invention.
Figure 36:
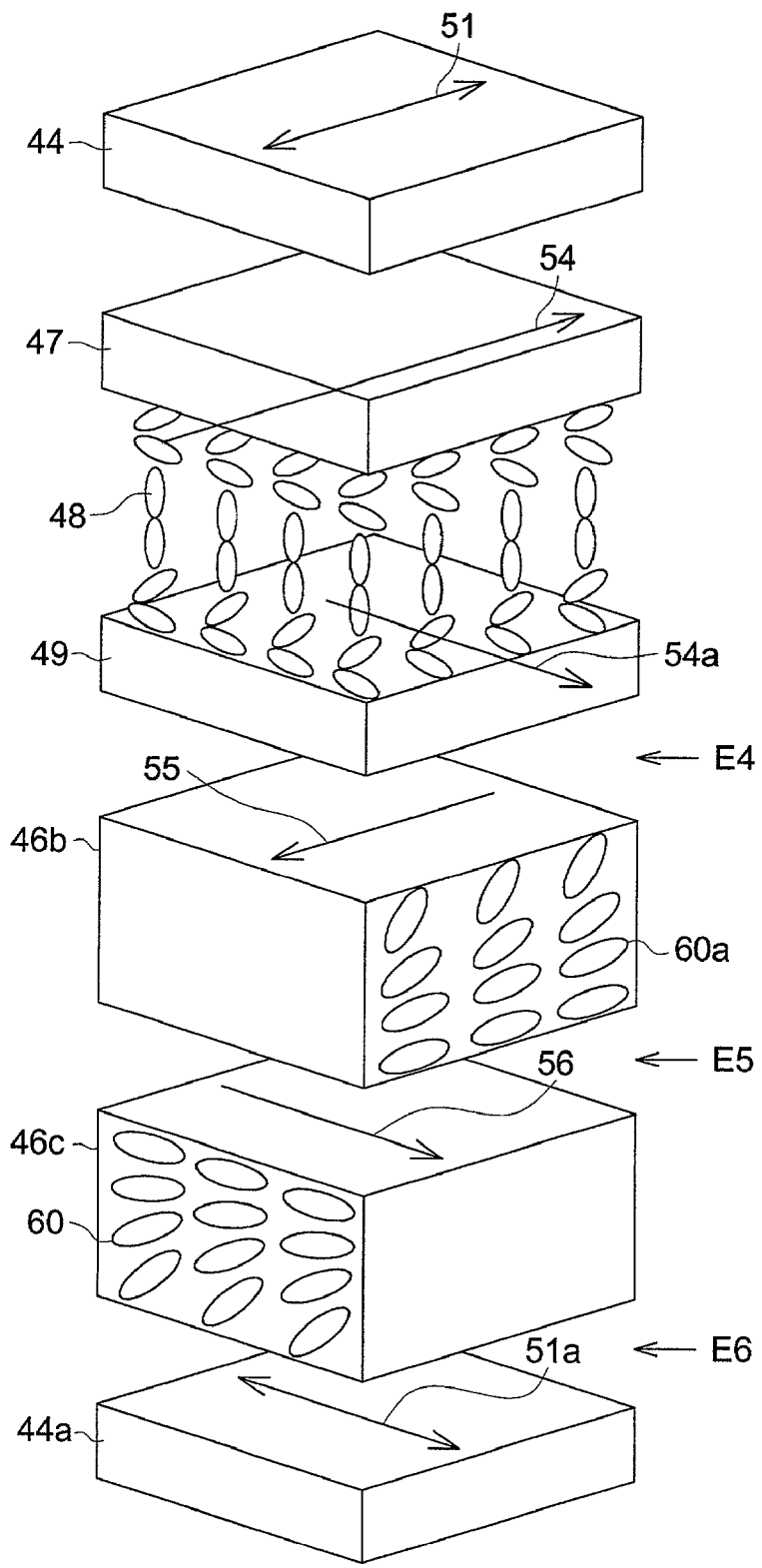
FIG. 36 shows the sectional view of one embodiment of structures used in the liquid crystal display of the invention.
Figure 37:
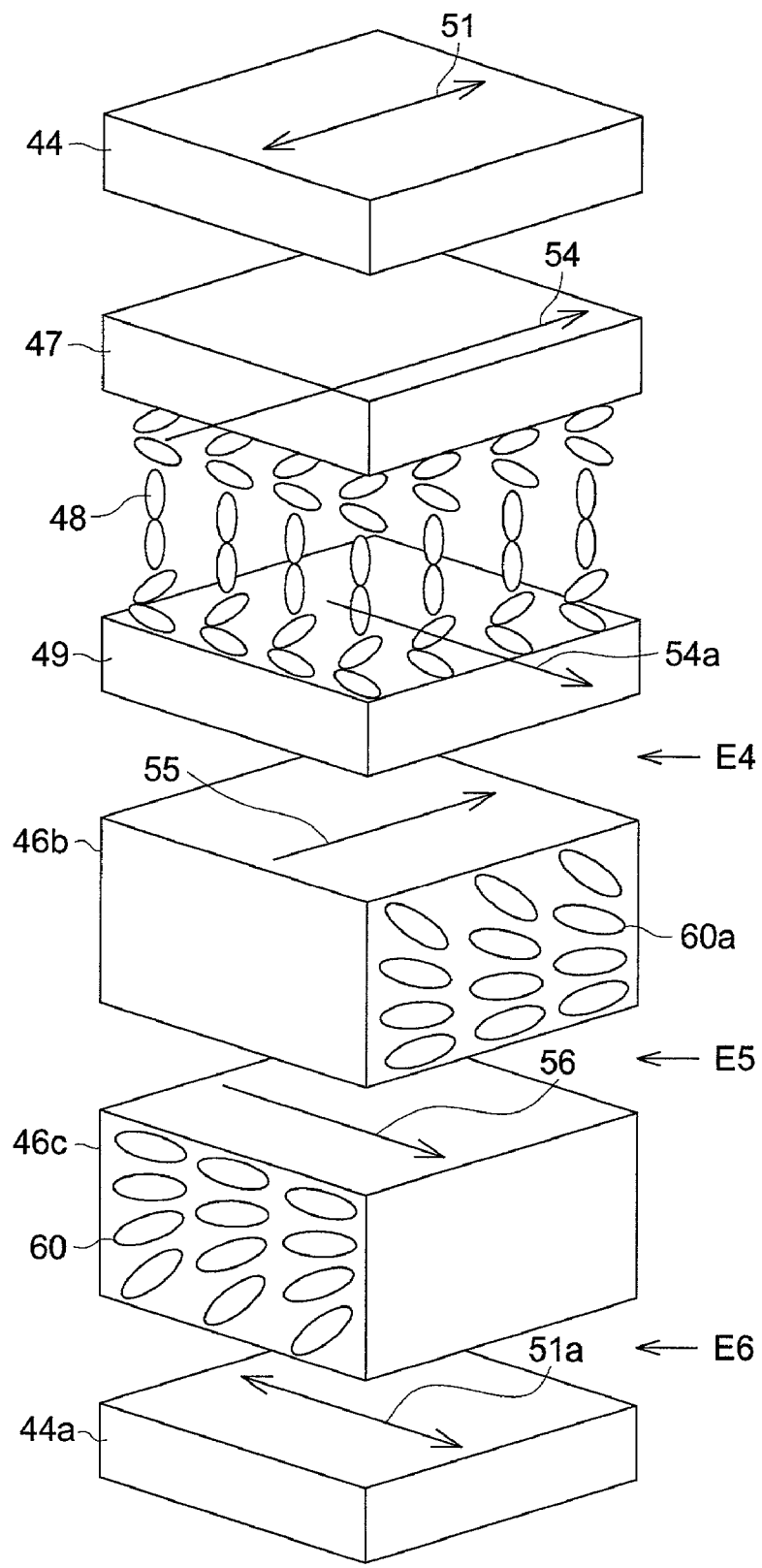
FIG. 37 shows the sectional view of one embodiment of structures used in the liquid crystal display of the invention.
Figure 38:
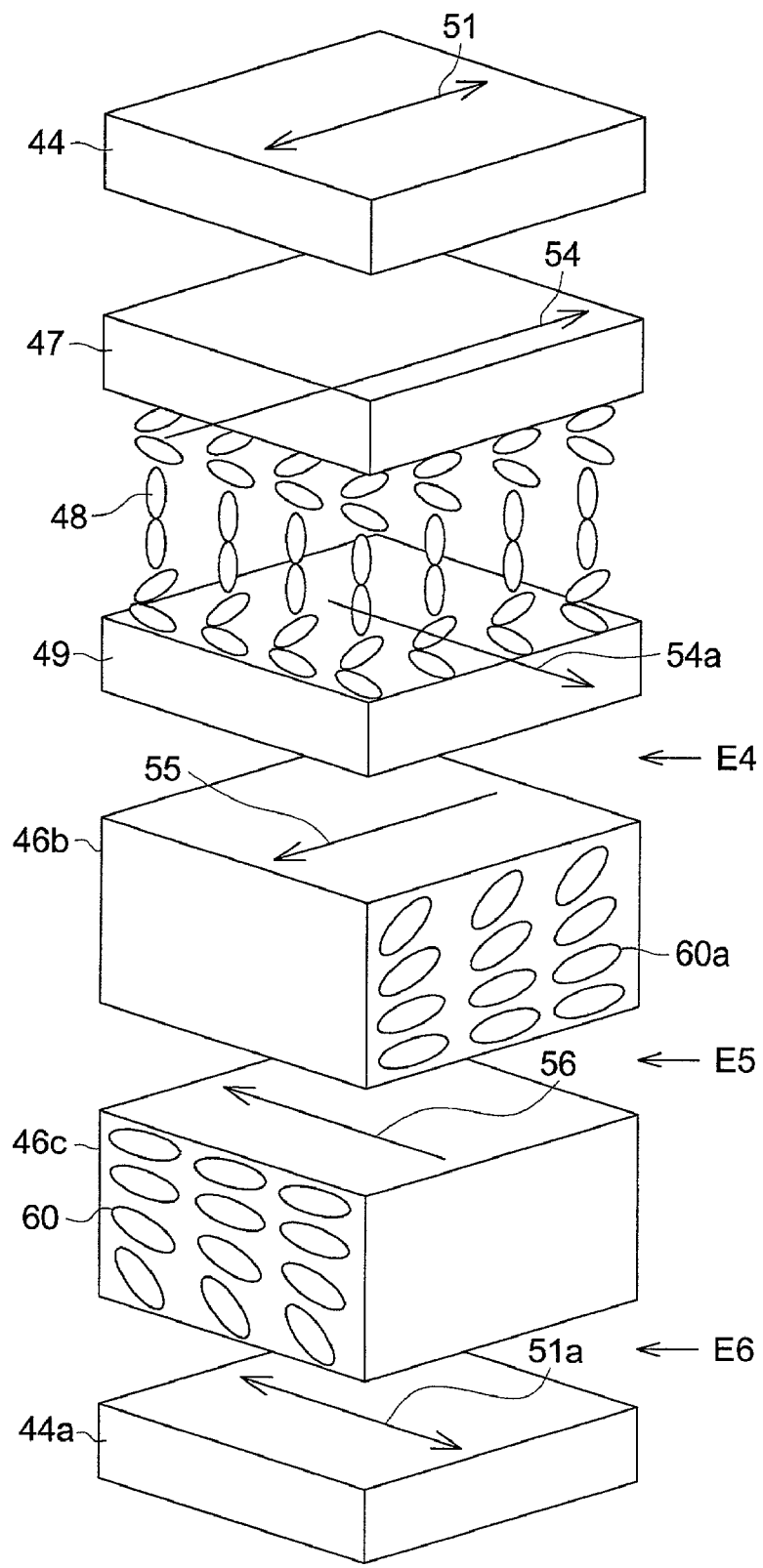
FIG. 38 shows the sectional view of one embodiment of structures used in the liquid crystal display of the invention.

FIGS. 8 to 14 show preferred layer structures used in the liquid crystal display in the invention. The layer structures as shown in FIGS. 8 to 14 each are sectional views of a part of the liquid crystal display panel which is cut in a square form in an angle inclined 45 degrees as shown in FIG. 8. Similarly, the layer structures as shown in FIGS. 15 to 38 each are sectional views of a part of the liquid crystal display panel which is cut in a square form in an angle inclined 45 degrees as shown in FIG. 15.

FIGS. 8, 10(a), 12(a) and 13(a) each show sectional views of the liquid crystal display panel in which the optical compensation sheet of the invention is provided between liquid crystal cell C and polarizing element 44 on the display side (obverse side).

FIGS. 9, 10(b), 12(b) and 13(b) show sectional views of the liquid crystal display panel in which the optical compensation sheet of the invention is provided between liquid crystal cell C and polarizing element 44a on the back light side (rear side).

FIGS. 11(a), 11(b), 14(a) and 14(b) each show a layer structure in which the optical compensation sheet (F1, F2, F3 or F4) is integrated with a polarizing plate. That is, the layer structure as shown in these figures is that in which the optical compensation sheet (comprising a support and an optically anisotropic layer) of the invention is provided on one side of polarizing element 44 or 44a, and is integrated with a polarizing plate comprising the polarizing element.

Figure 9:
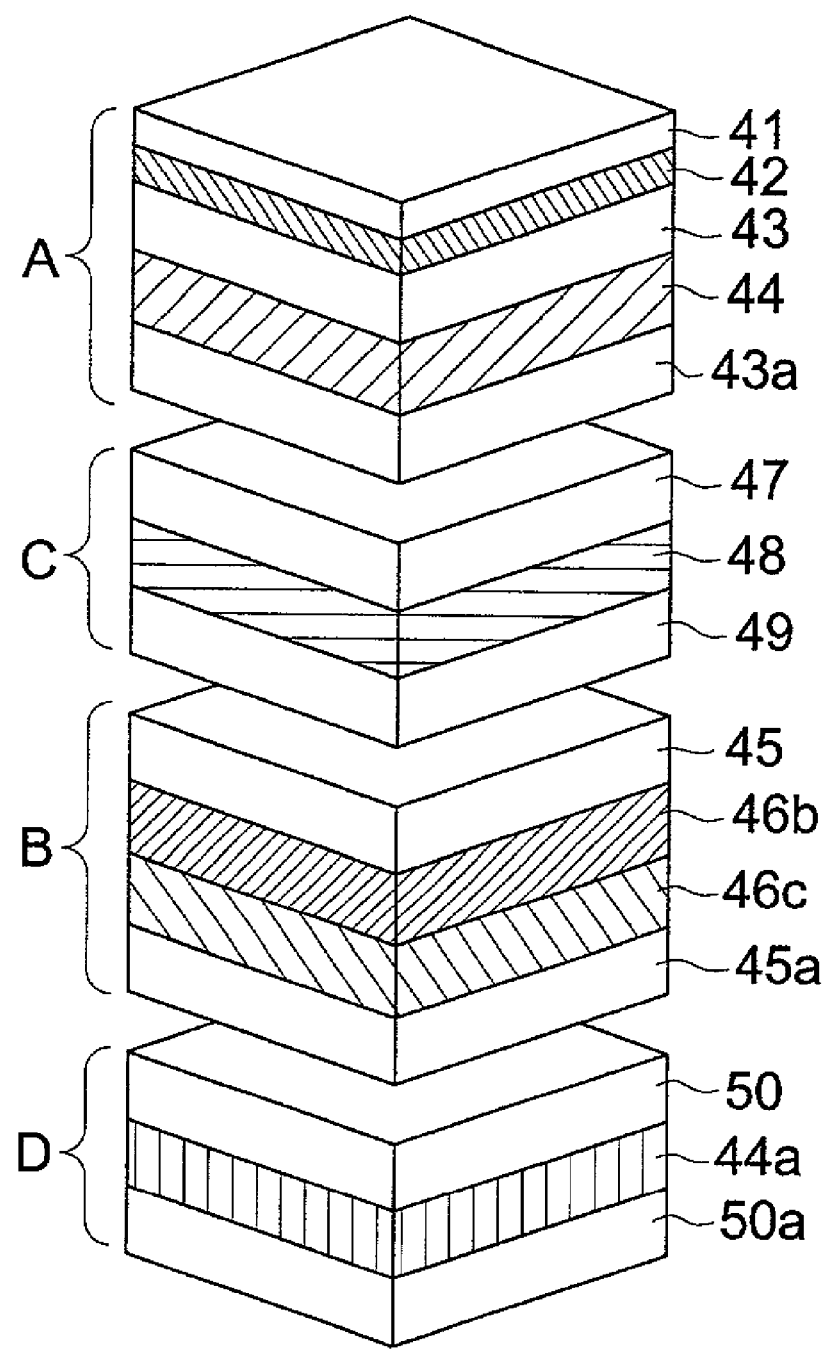
FIG. 9 shows one embodiment of preferable layer structures used in the liquid crystal display of the invention.
Figure 10:
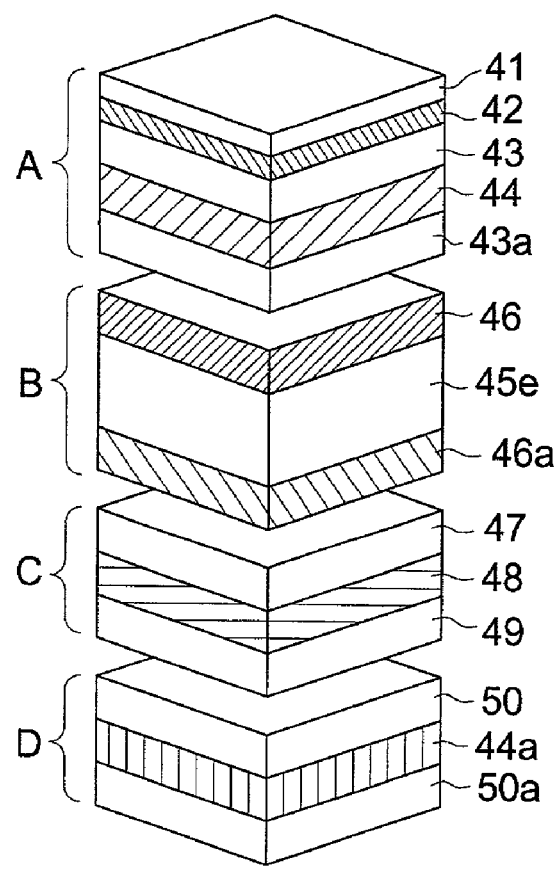
FIGS. 10(a) and 10(b) show two embodiments of preferable layer structures used in the liquid crystal display of the invention.
Figure 10:
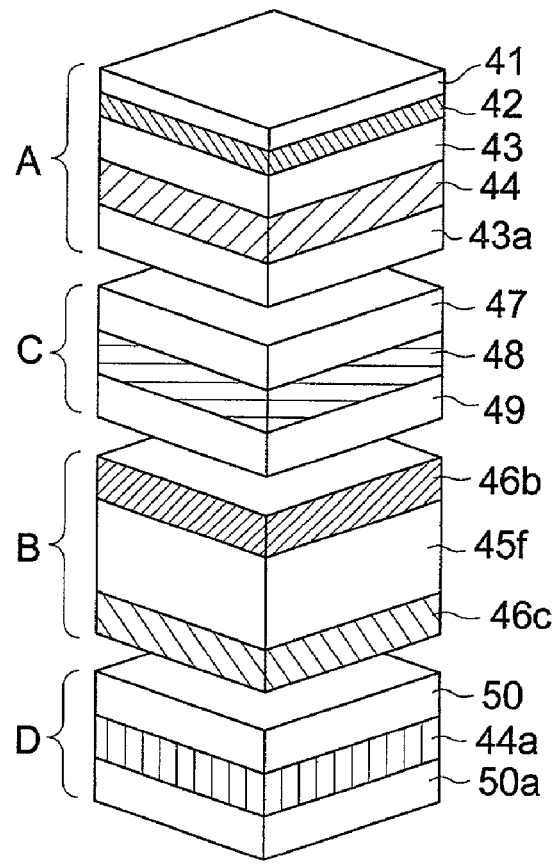
Figure 11:
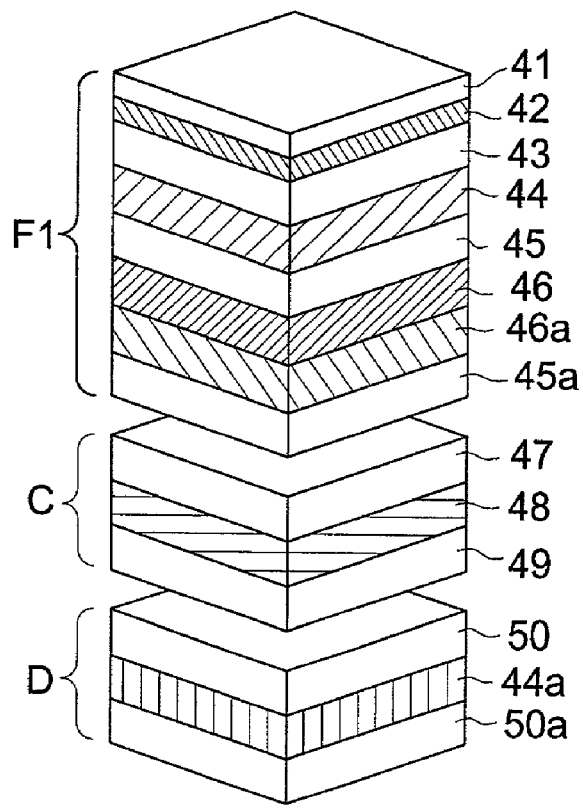
FIGS. 11(a) and 11(b) show two embodiments of preferable layer structures used in the liquid crystal display of the invention.
Figure 11:
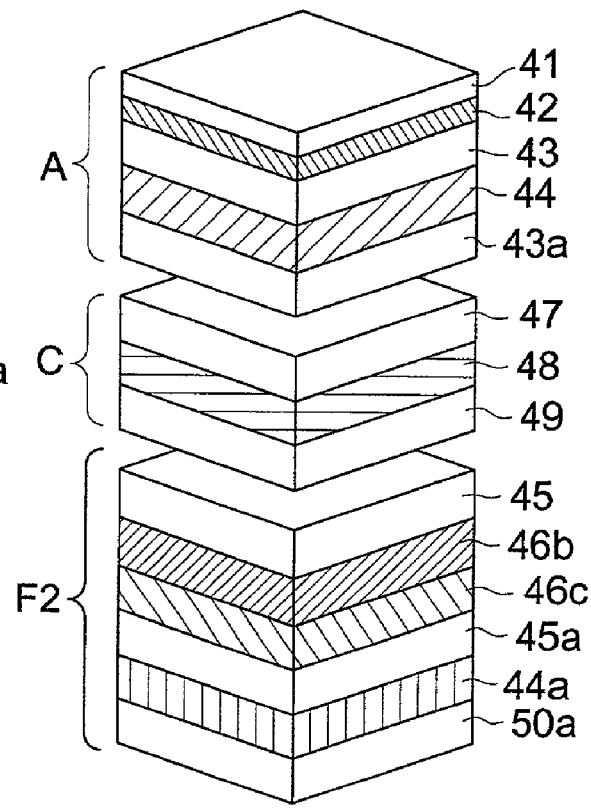
Figure 12:
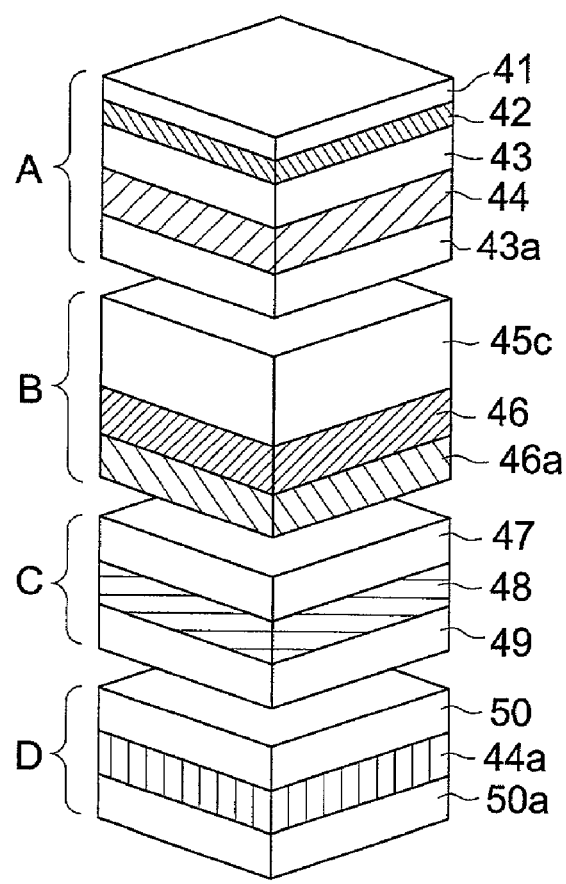
FIGS. 12(a) and 12(b) show two embodiments of preferable layer structures used in the liquid crystal display of the invention.
Figure 12:
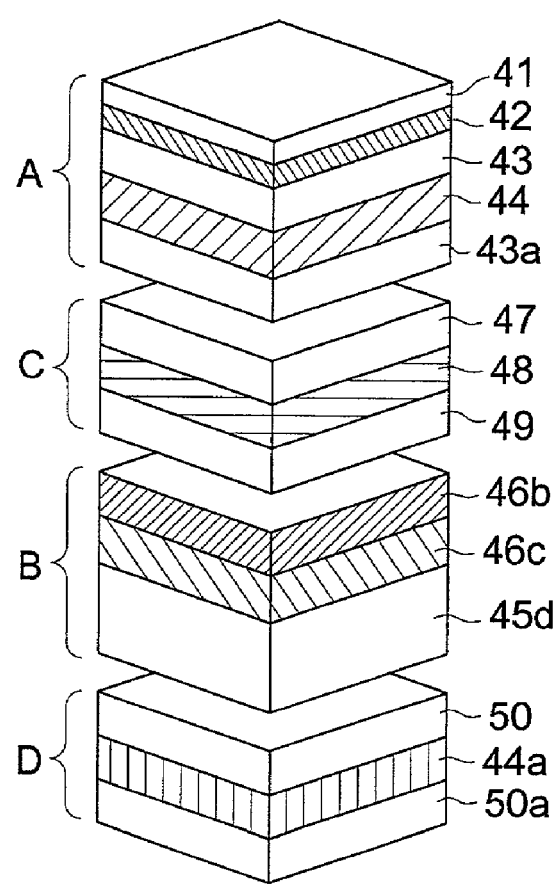

Optical compensation sheet B in FIG. 8 or 9 shows a layer structure in which optically anisotropic layer 46b provided on support 45 is laminated onto optically anisotropic layer 46c provided on support 45a directly or through an adhesive layer (not illustrated) so that the two optically anisotropic layers face each other.

Optical compensation sheet B in FIG. 10(a) shows a layer structure which optically anisotropic layer 46 is provided on one side of support 45e and optically anisotropic layer 46a is provided on the other side of support 45e. Optical compensation sheet B in FIG. 10(b) shows a layer structure in which optically anisotropic layer 46b is provided on one side of support 45f and an optically anisotropic layer 46c is provided on the other side of support 45f.

Optical compensation sheet F1 in FIG. 11(a) shows a layer structure in which optically anisotropic layer 46 provided on support 45 is laminated onto optically anisotropic layer 46a provided on support 45a directly or through an adhesive layer (not illustrated) so that the two optically anisotropic layers 46 and 46a face each other, and the laminate is further provided on one side of polarizing element 44, wherein the optical compensation sheet is integrated with a polarizing plate as a protective film. Each of the optical compensation sheets shown in FIGS. 11(b), 14(a) and 14(b) also shows a layer structure in which the optical compensation sheet is also integrated with a polarizing plate as a protective film.

Optical compensation sheet B in FIG. 12(a) shows a layer structure in which the two optically anisotropic layers 46 and 46a are provided on one side of support 45c, and optical compensation sheet B in FIG. 12(b) shows a layer structure in which the two optically anisotropic layers 46b and 46c are provided on one side of support 45d. Herein, liquid crystal cell C is provided to face the optically anisotropic layers.

Optical compensation sheet B in FIG. 13(a) shows a layer structure in which the two optically anisotropic layers 46 and 46a are provided on one side of support 45e, and optical compensation sheet B in FIG. 13(b) shows a layer structure in which the two optically anisotropic layers 46b and 46c are provided on one side of support 45f. Herein, liquid crystal cell C is provided to face the supports.

FIGS. 15 to 38 explain in detail the two optically anisotropic layers constituting the optical compensation sheet. These figures explain in detail the arrangement of orientation direction 52, 53, 55 or 56 of the optically anisotropic layers, in which liquid crystal compounds are oriented and fixed, rubbing direction 54 or 54a of the substrate of the liquid crystal cell and the direction of absorption axis 51 or 51a of the polarizing plate.

FIGS. 15 to 22 and FIGS. 31 to 34 show a liquid crystal display in which two optically anisotropic layers are provided between the liquid crystal cell and the polarizing element 44 on the display (obverse) side. FIGS. 23 to 30 and FIGS. 35 to 38 show a liquid crystal display in which two optically anisotropic layers are provided between the liquid crystal cell and the polarizing element 44a on the back light (rear) side. In FIGS. 15 to 38, symbol 60 or 60a represents an optically anisotropic compound.

Optically anisotropic layers 46 and 46a as shown in FIGS. 8, 10(a), 11(a), 12(a), 13(a) and 14(a) can have the same orientation direction as the optically anisotropic layers selected from FIGS. 15 to 22 or FIGS. 31 to 34, and their arrangement as illustrated in the figures can be made.

Optically anisotropic layers 46b and 46c as shown in FIGS. 9, 10(b), 11(b), 12(b), 13(b) and 14(b) can have the same orientation direction as the optically anisotropic layers selected from FIGS. 23 to 30 or FIGS. 35 to 38, and their arrangement as illustrated in the figures can be made.

The preferred examples will be explained, but another combination can be similarly explained. FIG. 12(a) is one example showing a preferred layer structure. Herein, polarizing plate A shows a polarizing plate on the display side (obverse side of the panel), and optical compensation sheet B shows the optical compensation sheet of the invention. Liquid crystal cell C shows a liquid crystal cell used in the liquid crystal display in the invention. Polarizing plate D shows a polarizing plate on the back right side (rear side of the panel). Polarizing plate A has a structure in which anti-reflection layer 41 comprised of one or more layers, anti-glare layer 42, polarizing plate protective film 43, polarizing element 44, and polarizing plate protective film 43a are laminated in this order with anti-reflection layer 41 facing outwardly.

Optical compensation sheet B, which is the optical compensation sheet of the invention, has two optically anisotropic layers 46 and 46a, and support 45c. Optically anisotropic layer 46 of optical compensation sheet B is formed, preferably according to the following procedures. Optically anisotropic layer 46 is formed on support 45c by preferably coating a subbing layer (not illustrated) on a support 45c, providing a first oriented layer on the subbing layer, and coating a first liquid crystal compound layer on the oriented layer, followed by orientation and fixation treatment. Optical compensation sheet B is a sheet in which optically anisotropic layer 46a is formed on optically anisotropic layer 46, which is prepared by providing a second oriented layer on optically anisotropic layer 46, and coating a second liquid crystal compound layer on the second oriented layer, followed by orientation and fixation treatment. There is another method for preparing optical compensation sheet B, which transfers optically anisotropic layer 46a provided on a support onto optically anisotropic layer 46 on a support 45c.

Liquid crystal cell C, which is a liquid crystal cell used in the invention, has a structure in which liquid crystal compound 48 is provided between substrates 47 and 49.

Polarizing plate D has a structure in which polarizing element 44a is sandwiched between polarizing plate protective films 50 and 50a.

In. FIGS. 15 to 38, E1, E2, E3, E4, E5 and E6 each show a position at which a support for an optically anisotropic layer can be provided.

As explained above, optically anisotropic layers 46 and 46a in FIG. 12(a) are arranged in the same orientation directions as those of optically anisotropic layers 46 and 46a as shown in one selected from FIGS. 15 to 22 or FIGS. 31 to 34. It is especially preferred in remarkable increase of viewing angle that optically anisotropic layers 46 and 46a in FIG 12(a) are arranged in a liquid crystal display so that the orientation direction of optically anisotropic layers 45 and 46a, the absorption axis direction of polarizing elements 44 and 44a and the rubbing direction of liquid crystal cell have a combination as shown in detail in FIG. 15.

EXAMPLE

The invention will be detailed according to the following examples, but is not limited thereto. The term "parts" is parts by weight, unless otherwise specified.

Example 1

<Preparation of Transparent Supports 1 and 2>

Transparent supports 1 and 2 were prepared employing the following dope composition 1.

| (Dope composition 1) | |
|---|---|
| Cellulose triacetate synthesized from cotton linter (Acetic acid value of 61.0%) | 50 parts |
| Cellullose triacetate synthesized from tree pulp (Acetic acid value of 61.0%) | 50 parts |
| Tinubin 326 (UV absorbent 1, produced by Ciba Specialty Co., Ltd.) | 0.5 parts |
| Tinubin 328 (UV absorbent 2, produced by Ciba Specialty Co., Ltd.) | 0.5 parts |
| Triphenyl phosphate (plasticizer A) | 12 parts |
| Fine silica particles (Aerosil 200 produced by Nihon Aerosil Co. Ltd., 0.016 μm, matting agent 1) | 0.1 parts |
| Methylene chloride | 460 parts |
| Ethanol | 40 parts |

The above dope composition 1 was incorporated and tightly closed in a vessel and stirred at 80° C. while pressure was applied to obtain a dope. The dope was filtered, cooled at 33° C., cast uniformly on a rotating endless stainless steel belt of 6 m (effective length 5.5 m), which was wound on two drums), evaporated until the residual solvent amount reached 50 percent, peeled from the stainless steel belt at a peeling tension of 9.8 N/m, and dried while transporting at a conveyance tension of 127 N/m on many rollers to obtain a 80 μm thick cellulose triacetate (TAC) film (transparent support 1). Transparent support 2 was prepared in the same manner as transparent support 1 above, except that the thickness was changed to 40 μm.

<Preparation of Oriented Film>

An oriented layer was coated on the above obtained support according to the following procedures to obtain invented films giving various orientations.

<Preparation of Oriented Film A-1>

Transparent support 1 was coated with a gelatin layer (having a thickness of 0.1 μm), further coated on the gelatin layer with a solution in which one gram of straight chained alkyl modified polyvinyl alcohol. (MP203, manufactured by Kuraray Co., Ltd.) was dissolved in 100 ml of a mixture solvent of methanol/water (=1:4) employing a wire bar #3, dried at 80° C. employing hot air, and subjected to a rubbing treatment. Thus, oriented film A-1 was obtained.

<Preparation of Oriented Film A-2>

Transparent support 1 was coated with a gelatin layer (having thickness of 0.1 μm), further coated on the gelatin layer with a solution in which one gram of alkyl modified polyvinyl alcohol having the following chemical structure was dissolved in 100 ml of a mixture solvent of methanol water (=1:4) employing a wire bar #3, dried at 65° C. employing hot air, and subjected to a rubbing treatment. Thus, oriented film A-2 was obtained.

With respect to the rubbing direction, when viewing the oriented layer coated support from the oriented layer, the direction, in which the support was rubbed straightly, was defined as the –direction of the Y axis and the direction in the support plane perpendicular to the Y axis was defined as the X axis, which was defined as standard. Hereinafter, with respect to the direction in the sheet plane, the rubbing direction was defined as standard direction, unless otherwise specified.

-continued

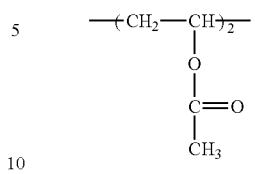

<Preparation of Oriented Film A-3>

A 1 weight % polyamic acid solution in which polyamic acid having the following structure was dissolved in a fixture solvent of NMP/DMF (=9:1) was coated on an aluminium plate employing a spin coater, and heated at 200° C. for two hours to obtain a polyimide film. The polyamic acid used here was prepared according to a method described in Polymer Preprins Japan Vol. 47, No. 11 (1998) 2894–2895. The resulting polyimide film was irradiated with a 0.96 mJ polarized ultraviolet light having a wavelength of 222 nm employing UER 20H (produced by Ushio electric Co., Ltd.). Thus, oriented film A-3 was obtained. The polarized light irradiation axis was defined as the X axis.

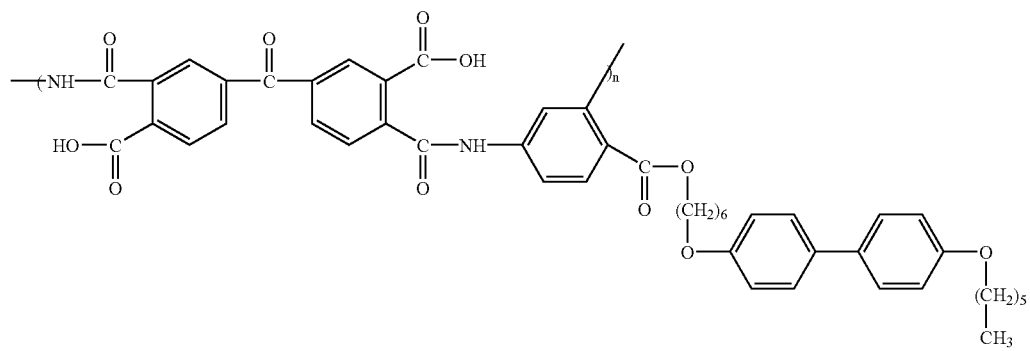

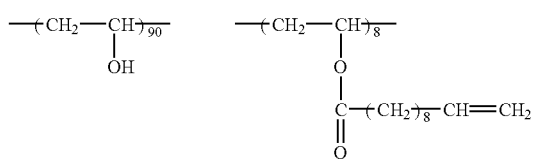

(Evaluataion Method of Orientation Characteristics of Liquid Crystal Compound)

With respect to the optical compensation sheet of the invention orientation characteristics of the oriented film and orientation characteristics of a liquid crystal compound which were obtained by a combination of the liquid crystal compound and the oriented film were evaluated as follows.

Employing the above obtained three oriented films and solutions LC-1 and LC-2 as shown below, each of the oriented films was evaluated. The liquid crystal compounds used in the solutions LC-1 and LC-2 develop an enanetropic nematic phase.

(Composition of solution LC-1)

| | |
|---|---|
| MEK (methylethyl ketone) | 89.5 parts |
| Compound 1 | 2 parts |
| Compound 2 | 4 parts |

-continued

| | |
|---|---|
| Compound 3 | 3 parts |
| Ilugacure 369 (produced by Ciba Specialty Co., Ltd.) | 1.5 parts |

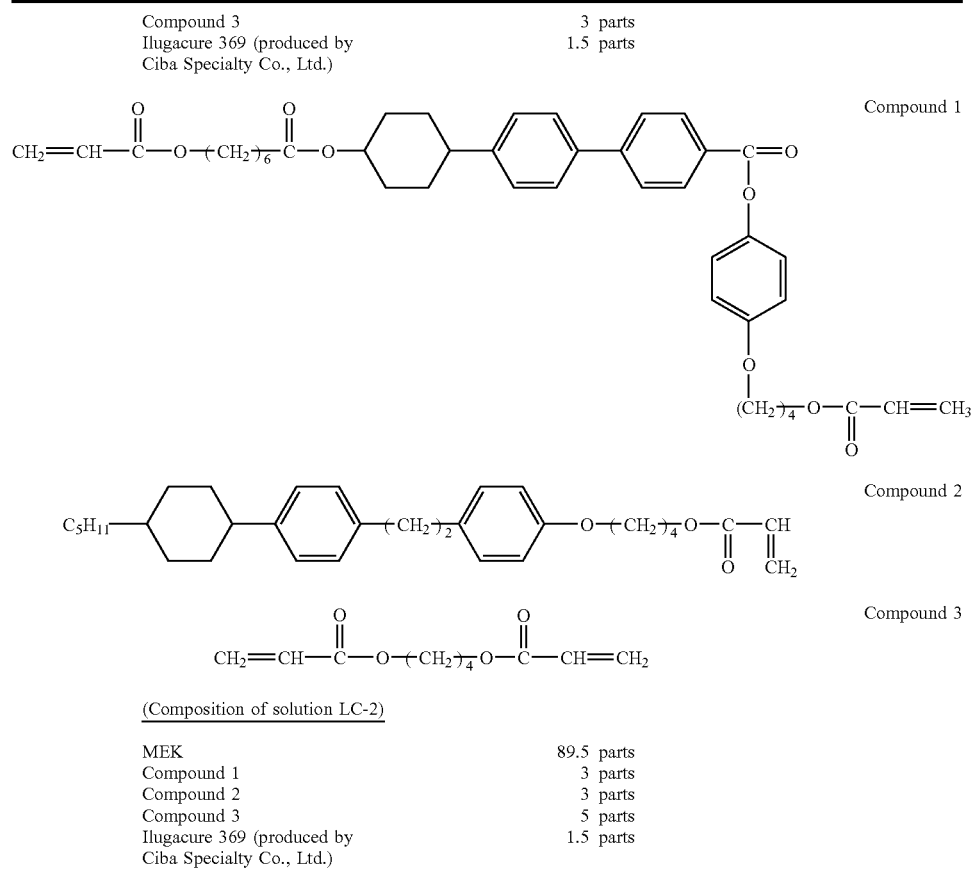

Compound 1

Compound 2

Compound 3

(Composition of solution LC-2)

| | |
|---|---|
| MEK | 89.5 parts |
| Compound 1 | 3 parts |
| Compound 2 | 3 parts |
| Compound 3 | 5 parts |
| Ilugacure 369 (produced by Ciba Specialty Co., Ltd.) | 1.5 parts |

An oriented layer was coated on a glass slide and subjected to orientation treatment. Solution LC-1 or LC-2 was coated on the resulting oriented layer, dried to obtain a liquid crystal layer and the oriented layer was laminated to be in an antiparallel direction to obtain a test sample. Orthoscope and conoscope images were observed in the liquid crystal temperature range, employing a hot stage, and an average tilt angle of the test sample subjected to the anti-paralell treatment was measured by automatic double refractometer. Further, a tilt angle was measured employing crystal rotation method. Solution LC-1 or LC-2 was coated on each of the oriented layer, dried and subjected to heat treatment. Thus, samples, in which one side of the liquid crystal layer had an oriented layer and the other side of the liquid crystal layer faced the atmospheric air, were obtained The resulting samples were evaluated in the same manner as above. The results are shown in Table 1.

TABLE 1

| Oriented layer | Liquid crystal solution used | Sample subjected to antiparallel treatment Tilt angle | Sample having a liquid crystal layer facing atmospheric air Average tilt angle |
|---|---|---|---|
| A-1 | LC-1 | 4 degrees | 36 degrees |
| | LC-2 | 4 degrees | 7 degrees |
| A-2 | LC-1 | Homeotropic | 83 degrees |
| | LC-2 | Homeotropic | 47 degrees |

TABLE 1-continued

| Oriented layer | Liquid crystal solution used | Sample subjected to antiparallel treatment Tilt angle | Sample having a liquid crystal layer facing atmospheric air Average tilt angle |
|---|---|---|---|
| A-3 | LC-1 | Homeotropic | 46 degrees |
| | LC-2 | Homeotropic | 78 degrees |

As is apparent from Table 1, pretilt angles of the oriented films A-1, A-2 and A-2 were not more than about 5 degrees, not less than 80 degrees and not less than 80 degrees, respectively.

(Preparation of Optical Compensation Sheet 1)

The above solution LC-1 was coated on the oriented film A-1 above employing a wire bar #5, dried at 55° C. for 30 seconds, heated at 75° C. for 30 seconds, nitrogen purged at 98 kPa for 60 seconds, and hardened with ultraviolet light of 450 mJ under an oxygen concentration of 0.1%. Thus, sheet P-1 having one liquid crystal orientation layer was obtained.

Next, the solution used in preparation of oriented film A-2, in which alkyl modified polyvinyl alcohol was dissolved in a mixture solvent of methanol/water (=1:4), was coated on sheet P-1 employing a wire bar #3, dried at 65° C. employing hot air, and subjected to a rubbing treatment to form an oriented film. The rubbing treatment was carried out in the –direction of X axis, regarding positioning of sheet P-1 as standard. The solution LC-2 above was coated on the resulting oriented film employing a wire bar #5, dried at 55° C. for 30 seconds, heated at 75° C. for 30 seconds, nitrogen purged at 98 kPa for 60 seconds, and hardened with ultraviolet light of 450 mJ under an oxygen concentration of 0.1%. Thus, optical compensation 1 having two liquid crystal compound-containing layers on one side of a transparent support, as shown in FIG. 1, was obtained.

(Preparation of Optical Compensation Sheet 2)

Figure 2:
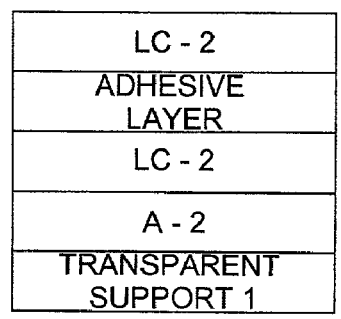
FIG. 2 shows one embodiment of the optical compensation of the invention.

The above solution LC-2 was coated on the oriented film A-2 above employing a wire bar #5, dried at 55° C. for 30 seconds, heated at 75° C. for 30 seconds, nitrogen purged at 98 kPa for 60 seconds, and hardened with ultraviolet light of 450 mJ under an oxygen concentration of 0.1%. Thus, sheet P-2 having one liquid crystal orientation layer was obtained. Next, an adhesive SK Dain 2092 (produced by Soken Kagaku Co.) was coated on the liquid crystal orientation layer of P-2 to obtain a first sheet with an adhesive layer. Further, a second sheet, which was prepared in the same manner as in the above P-2 except that A-3 was used as an oriented film, was laminated onto the resulting first sheet so that the liquid crystal orientation layer of the second sheet faced he adhesive layer, and then the aluminium plate and polyimide film were peeled from the laminate. Thus, optical compensation 2 having two liquid crystal compound-containing layers on one side of a transparent support and having an adhesive layer between the two liquid crystal compound-containing layers, as shown in FIG. 2, was obtained. The rubbing direction at the lamination was adjusted so that the +Y direction of sheet P-2 coincided with the −X direction of the second sheet.

(Preparation of Optical Compensation Sheet 3)

Figure 3:
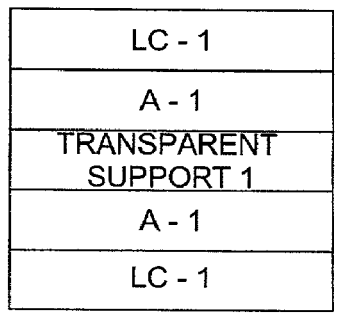
FIG. 3 shows one embodiment of the optical compensation of the invention.

As described below, oriented film A-1 was coated on each side of support, and one liquid crystal compound-containing layer was further coated on each of the coated oriented film. A solution, in which one gram of straight-chained alkyl modified polyvinyl alcohol was dissolved in a mixture solvent of methanol/water (=1:4), was coated on the surface of the support of sheet P-1 opposite the liquid crystal orientation layer, employing a wire bar #3, dried at 65° C. employing hot air, and subjected to rubbing treatment to form an oriented layer. The rubbing treatment was carried out in the −X direction, viewing from the liquid crystal orientation layer of P-1. Subsequently, solution LC-1 above was coated on the resulting oriented layer employing a wire bar #5 and processed in the same manner as above to obtain a hardened liquid crystal orientation layer. Thus, optical compensation sheet 3 having one optically anisotropic layer on each side of the transparent support was obtained, as shown in FIG. 3.

(Preparation of Optical Compensation Sheet 4)

As described below, the second optically anisotropic layer of optical compensation sheet 2 was prepared by employing oriented film 3. A lamination sheet prepared as described below was laminated on the first optically anisotropic layer firstly prepared in the same manner as in optical compensation sheet 2. A 1 weight % polyamic acid solution in which polyamic acid was dissolved in a mixture solvent of NMP/DMF (=9:1) was coated on an aluminium plate employing a spin coater, and heated at 200° C. for two hours to obtain a polyimide film. The polyamic acid used here was prepared according to Polymer Preprints, Japan Vol. 47 No. 11 (1998) 2894–2895. The polyimide film was irradiated at 0.96 mJ with a polarized ultraviolet light having a wavelength of 222 nm employing UER 20H (produced by Ushio electric Co., Ltd.) to form an oriented film.

The polarization irradiation axis was the X axis. The solution LC-1 was coated on the oriented film employing a wire bar #5, and processed in the same manner as above to obtain a hardened liquid crystal compound layer for lamination. Thus, a lamination sheet (P-2) was obtained. Next, a mixture of 100 parts of an adhesive SK Dain 2092 (produced by Soken Kagaku Co.) and 5 parts of E-AX (produced by Soken Kagaku Co.) was coated on the first optically anisotropic layer, employing a wire bar #5 to form an adhesion layer. The lamination sheet was laminated on the resulting adhesion layer so that the hardened liquid crystal compound layer faced the adhesion layer, and the aluminium plate and polyimide film were peeled from the laminate. The lamination was carried out so that the +Y direction of the lamination layer coincided with the −X direction of P-2. Thus, optical compensation sheet 4 was obtained.

(Preparation of Optical Compensation Sheet 5)

An optical compensation sheet 5 was prepared in the same manner as optical compensation sheet 1, except that a first optical crystal compound-containing layer (an optical crystal compound-containing layer closer to the support) and a second optical crystal compound-containing layer were interchanged. That is, an oriented layer and optical crystal compound-containing layer were coated on a support in that order in the same manner as in P-2, and then, an oriented layer and optical crystal compound-containing layer as used in P-1 were coated in that order on the resulting optical crystal compound-containing layer. Rubbing of the latter oriented layer was carried out in the direction of the −X axis. Thus, optical compensation sheet 5 was obtained.

The two hardened optical crystal compound-containing layers each had a thickness of 0.9 μm.

An average tilt angle of the above obtained optical compensation sheet was measured employing KOBRA produced by Oja Keisoku Co. The average tilt angle of the optically anisotropic layer is obtained by subtracting an average tilt angle of the support from that of the optical compensation sheet. An average tilt angle exceeding 45° is considered as showing that there are many liquid crystal molecules to be almost perpendicularly oriented.

Figure 4:
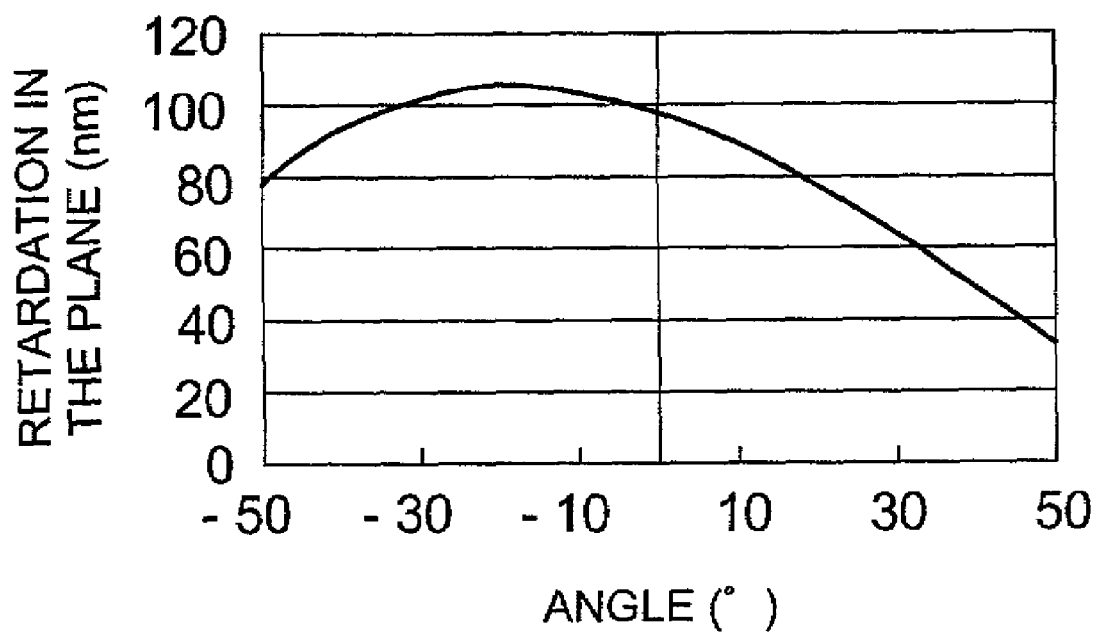
FIG. 4 shows a method of obtaining an average tilt angle from the relationship between retardation in the plane and an angle.

The above average tilt angle will be explained employing FIG. 4 shows the result obtained by measuring a retardation of an optically anisotropic layer which has been formed by providing the above LC-1 on oriented film A-1, orienting and fixing it. As is seen in FIG. 4, when the tilt angle of an optically positive uniaxial liquid crystal compound varies continuously in the sheet thickness direction, the average tilt angle is considered to be an angle giving maximum of a retardation in the plane perpendicular to the direction giving maximum index in the sheet plane, the retardation being measured along that direction while rotating the direction giving minimum index in the sheet plane as a rotational axis. The optically anisotropic layer, in which the tilt angle of the liquid crystal compound varies continuously, has no optic axis as a whole layer.

(Preparation of Optical Compensation Sheet 6)

An oriented film was prepared in the same manner as in oriented film A-1, except that transparent support 2 was used. LC-1 was coated on the orientation layer of the resulting oriented film in the same manner as in P-1 to obtain a first sheet having an optically anisotropic layer. An adhesive layer was coated on the optically anisotropic layer employing a wire bar #3. A second sheet with an optically anisotropic layer, which was prepared separately in the same manner as in the first sheet, was laminated onto the first sheet through the adhesive layer so that the two optically anisotropic layers faced each other. Thus, optical compensation sheet 6 was obtained which had the two optically anisotropic layers between the supports. The lamination was carried out so that the +Y direction of the second sheet coincided with the –X direction of the first sheet with an adhesive layer.

(Preparation of Comparative Optical Compensation Sheets 1, and 3)

Comparative optical compensation sheet 1 was prepared in the same manner as in optical compensation sheet 1, except that P-1 was replaced with P-2. Comparative optical compensation sheet 2 was prepared in the same manner as in optical compensation sheet 2, except that P-2 was replaced with P-1 Comparative optical compensation sheet 3 was prepared in the same manner as in optical compensation sheet 3, except that one of the two P-1's was replaced with P-2.

(Evaluation of Viewing Angle)

Viewing angle of the above obtained optical compensation sheets 1 to 6 and comparative optical compensation sheets 1 to 3 were measured.

Figure 5:
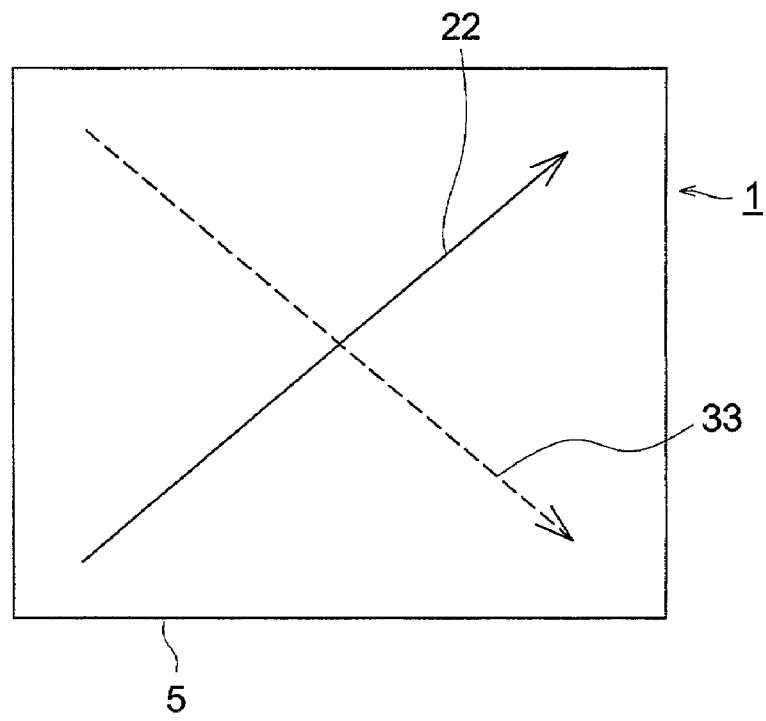
FIG. 5(a) shows the front view of optical compensation sheet 1 adhered to a liquid crystal cell (not illustrated).
FIG. 5(b) shows the sectional view of optical compensation sheet 1.
Figure 5:
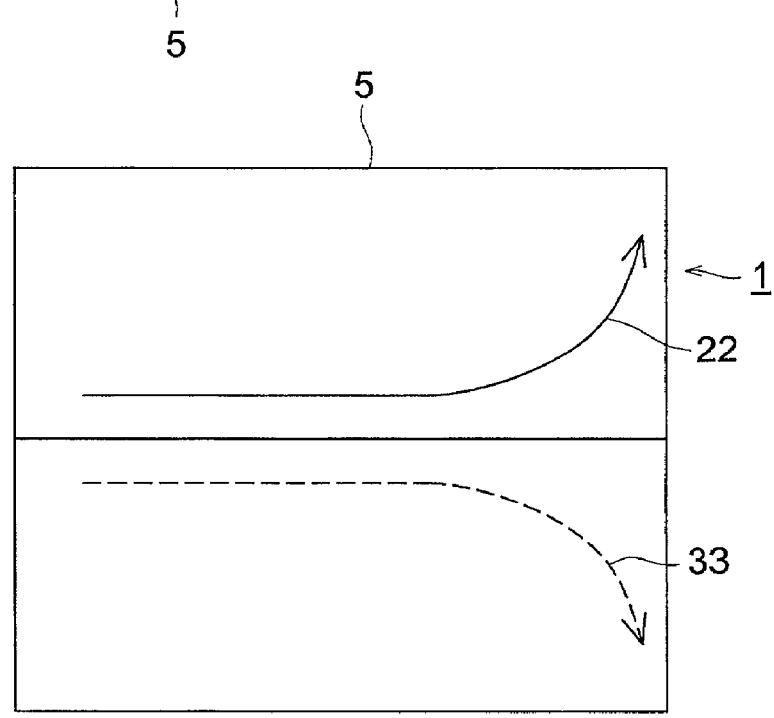
Figure 6:
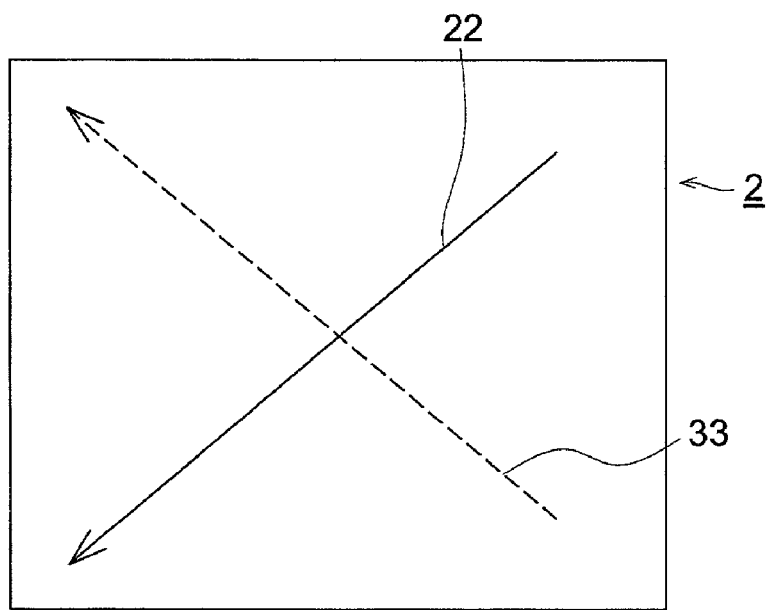
FIG. 6(a) shows the front view of optical compensation sheet 2 adhered to a liquid crystal cell (not illustrated).
FIG. 6(b) shows the sectional view of optical compensation sheet 2.
Figure 6:
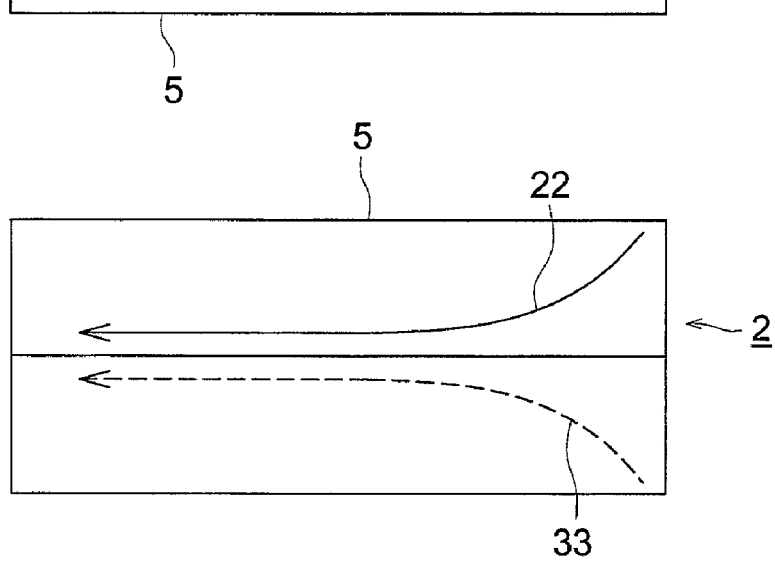
Figure 7:
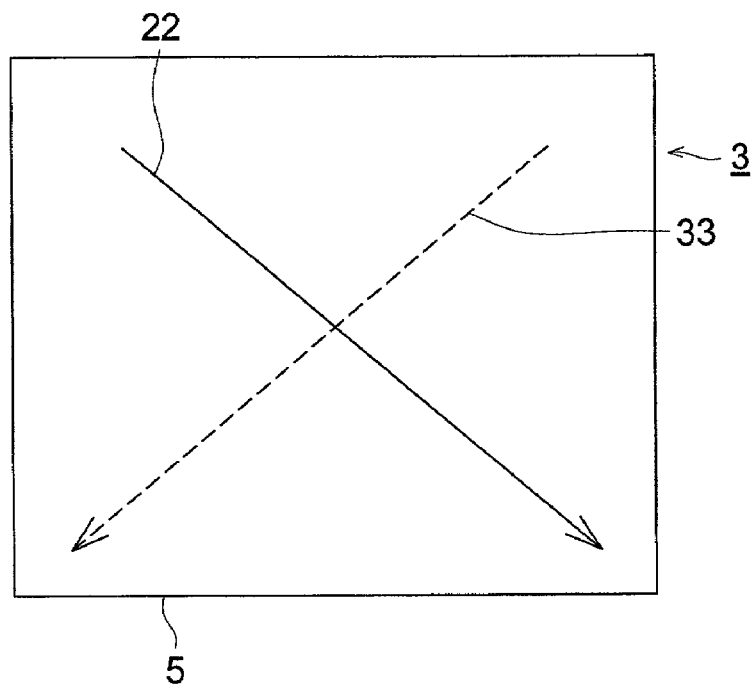
FIG. 7(a) shows the front view of optical compensation sheet 3 adhered to a liquid crystal cell (not illustrated).
FIG. 7(b) shows the sectional view of optical compensation sheet 3.
Figure 7:
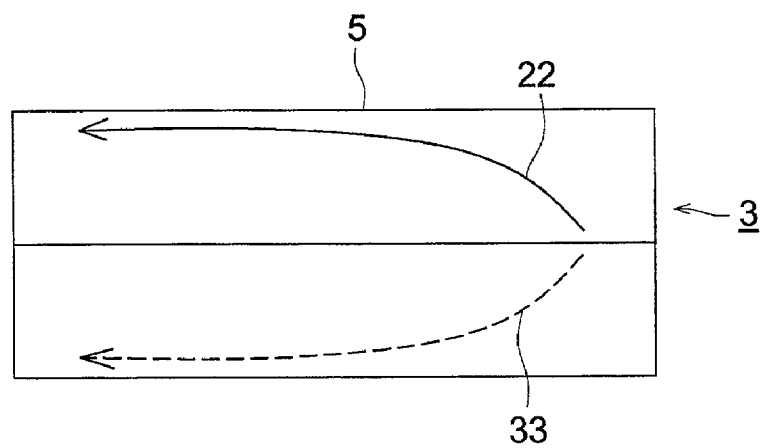

When viewing angle of for example, optical compensation sheets 1 to 3 was measured, the optical compensation film of the panel of a 15 inches display MultiSync LCD1525J produced by NEC Co., Ldt., was peeled, and the optical compensation sheets 1 to 3 were laminated thereto so that the liquid crystal compound was oriented as shown in FIGS. 5, 6, and 7, to obtain a sample for test. The viewing angle of the resulting sample was measured employing an EZ-Contrast of ELDIM Co., Ltd. The viewing angle was represented by a range of an angle inclined to the direction normal to the plane of the liquid crystal panel showing a contrast ratio during white/black display of 10 or more.

FIGS. 5, 6 and 7 show optical compensation sheets, in which optical compensation sheets 1, 2 and 3 were laminated on a liquid crystal cell (not illustrated), respectively.

FIGS. 5(*a*), 6(*a*) and 7(*a*) show front views of the optical compensation sheets 1, 2 and 3 laminated onto the liquid crystal cell, respectively. FIGS. 5(*b*), 6(*b*) and 7(*b*) show the sectional views of the optical compensation sheets observed from side 5. Arrow 22 shown in solid line shows an oriented direction of the liquid crystal compound positioned in the obverse side of the observer side, and arrow 33 shown in broken line shows an oriented direction of the liquid crystal compound positioned on the rear side.

The front views of the optical compensation sheets represented by FIGS. 5(*a*), 6(*a*) and 7(*a*) show the optical compensation sheets of the invention in which the orientation directions of the two liquid crystal compounds in the two liquid crystal compound layers cross each other.

The sectional views of the optical compensation sheets represented by FIGS. 5(*b*), 6(*b*) and 7(*b*) show the optical compensation sheets in which the angles of the orientation directions of the two liquid crystal compounds to the sheet plane continuously or stepwise vary to increase or decrease in the thickness direction but in the direction contrary to each other.

The optical compensation sheets of the invention provided good viewing angles that viewing angle at the left and right portions was 60 degrees or more, viewing angle at the upper portions was 45 degrees or more, and viewing angle at the lower portions was 35 degrees or more. In contrast, the viewing angles at the left and right portions of the comparative optical compensation sheets were quite different from each other, and provided poor viewing angles as compared to those of the optical compensation sheets of the invention.

As is apparent from the above, the optical compensation sheet of the invention provided greatly improved viewing angle employing only a single sheet.

Example 2

<Preparation of Transparent Support>

Transparent supports 1 and 2 were prepared in the same manner as in Example 1.

The thickness (μm), a retardation ($R_O$) in the plane and a retardation ($R_t$) in the thickness direction of the transparent supports 1 and 2 are shown below.

|  | Thickness | $R_O$ | $R_t$ |
|---|---|---|---|
| Transparent support 1 | 80 μm | 2.0 nm | 52.2 nm |
| Transparent support 2 | 40 μm | 1.2 nm | 30.3 nm |

In the above, $R_O$ and $R_t$ represent retardations of the transparent support represented by the following formulae (a) and (b), respectively.

$$R_O = (nx - ny) \times d \quad (a)$$

$$R_t = \{(nx - ny)/2 - nz\} \times d \quad (b)$$

In the above formulae, nx represents refractive index in the x direction giving maximum refractive index in the plane. ny represents refractive index in the y direction in the plane perpendicular to the X direction, nz represents refractive index in the thickness direction, and d represents a thickness (nm).

<Preparation of Support>

A gelatin subbing layer was coated on the transparent support 1, and solution 1 having the following composition was coated on the gelatin subbing layer, dried to give a thickness of 0.3 μm, and subjected to rubbing treatment. Thus, support 1 was obtained. Support 2 was obtained in the same manner as in support 1, except that solution 2 having the following composition was used instead of solution 1.

The supports 1 and 2 with a gelatin subbing layer had no substantial difference with respect to optical properties, as compared to transparent supports 1 and 2.

(Solution 1)

| Modified poval 1 having the following chemical structure | 1.0 part |
|---|---|
| Water | 95.0 parts |
| Methanol | 4.0 parts |

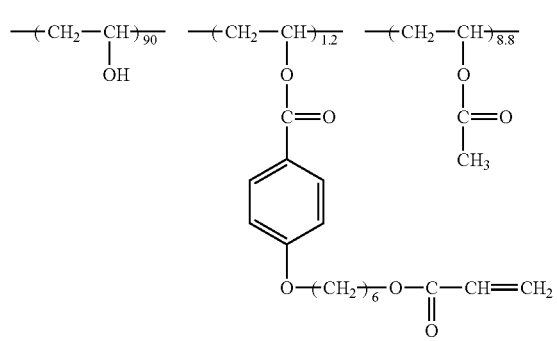

-continued (Solution 2)

| | |
|---|---|
| Modified poval 2 having the following chemical structure | 1.0 part |
| Water | 92.0 parts |
| Methanol | 7.0 parts |

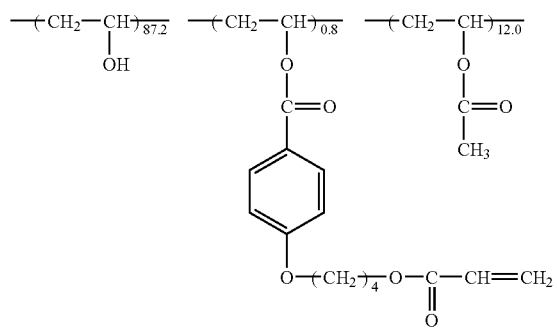

With respect to the orientation direction of the liquid crystal molecules in the optical compensation sheets as shown below, the direction rubbed, when viewing from the firstly coated oriented layer side, is defined as the +Y direction. Further, on lamination, this direction is employed as the direction of the optical compensation sheet, unless otherwise specified.

The following solutions LC-3 and LC-4 were used as a composition containing a liquid crystal compound for preparation of an optical compensation sheet.

<Preparation of Optical Compensation Sheet>

(Preparation of Optical Compensation Sheet 7)

Solution was coated on support 1, dried, subjected to rubbing treatment to form a first poval layer. Subsequently, LC-4 was isolated on the first poval layer employing a wire bar #5, dried, heated at 80° C. for 2 minutes, nitrogen purged at 98 kPa for 60 seconds, and hardened with ultraviolet light of 450 mJ under an oxygen concentration of 0.1% to give a first hardened optically anisotropic layer. The first anisotropic layer had a thickness of 1.4 μm, a retardation in the plane ($R_O$) of 85 nm, and a retardation ($R_e$) of 10 nm. The direction giving maximum of $R_e$ was inclined at 35 degrees to the direction normal to the anisotropic layer plane.

The above solution 2 was coated on the resulting first anisotropic layer, dried, subjected to rubbing treatment to form a second poval layer. The rubbing was carried out in the +X direction of the defined direction. Subsequently, LC-3 was coated on the second poval layer employing a wire bar #5 dried, heated at 80° C. for 2 minutes, nitrogen purged at 98 Pa for 60 seconds, and hardened with ultraviolet light of 450 mJ under an oxygen concentration of 0.1% to give a second hardened optically anisotropic layer. The second anisotropic layer had a thickness of 1.4 μm, a retardation in the plane ($R_O$) of 95 nm, and a retardation value ($R_e$) of 110 nm. The direction giving maximum of $R_e$ was inclined at 36 degrees to the direction normal to the anisotropic layer plane.

(Preparation of Optical Compensation Sheet 8)

Optical compensation sheet 8 was prepared in the same manner as in optical compensation sheet 7, except that LC-3 and LC-4 were coated employing a wire bar #4.

(Composition of solution LC-3)

| | |
|---|---|
| MEK (methylethyl ketone) | 89.5 parts |
| Compound 1 | 2 parts |
| Compound 4 | 4 parts |
| Compound 5 | 3 parts |
| Ilugacure 369 (produced by Ciba Specialty Co., Ltd.) | 1.5 parts |

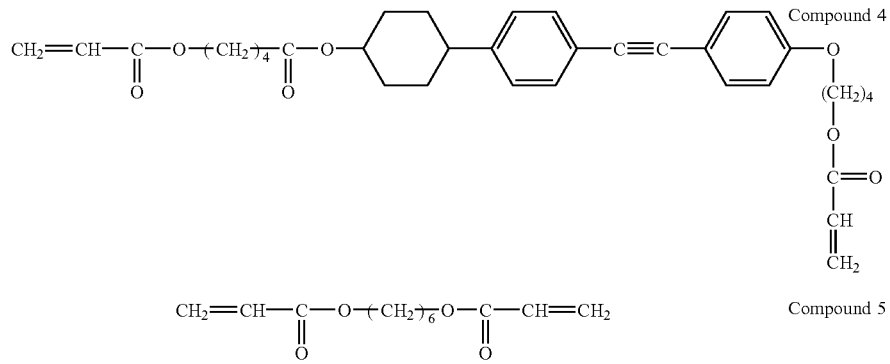

(Composition of solution LC-4)

| | |
|---|---|
| MEK | 89.5 parts |
| Compound 1 | 3 parts |
| Compound 4 | 3 parts |
| Compound 5 | 5 parts |
| Ilugacure 369 (produced by Ciba Specialty Co., Ltd.) | 1.5 parts |

The first and second anisotropic layers both had a thickness of 1.0 μm. The first anisotropic layer had a retardation in the plane ($R_O$) of 65 nm and a retardation value ($R_e$) of 86 nm. The direction giving maximum of $R_e$ was inclined at 31 degrees to the direction normal to the anisotropic layer plane. The second anisotropic layer had a retardation ($R_O$) in the plane of 61 nm and a retardation ($R_e$) of 88 nm. The direction giving maximum of $R_e$ was inclined at 42 degrees to the direction normal to the anisotropic layer plane.

(Preparation of Optical Compensation Sheet 9)

Two optical compensation sheets were prepared in the same manner as the first anisotropic layer of optical compensation sheet 7 except that LC-3 was used instead of LC-4. An adhesive SK Dain 2092 (produced by Soken Kagaku Co.) was coated on the optically anisotropic layer of one sheet to obtain a first sheet with an adhesive layer. The other sheet was laminated onto the resulting first sheet so that the anisotropic layer of the other sheet faced the adhesive layer. Thus, optical compensation sheet 9 as shown in FIG. 8 was obtained which had the support on each side of the optically anisotropic layer, and had the adhesive layer between the two optically anisotropic layers. The lamination was carried out so that the +Y direction of the first sheet with an adhesive layer coincided with the –X direction of the other sheet.

(Preparation of Optical Compensation Sheet 10)

Optical compensation sheet 10 was prepared in the same manner as optical compensation sheet 9, except that the above two sheets were laminated so that the two supports of the two sheets faced each other.

(Preparation of Optical Compensation Sheet 11)

Only the first anisotropic layer of optical compensation sheet 7 was coated on support 1 to obtain a first sheet. A second sheet was prepared in the same manner as the first anisotropic layer of optical compensation sheet 7, except that an aluminium plate was used as a support. An adhesive SK Dain 2092 (produced by Soken Kagaku Co.) was coated on the optically anisotropic layer of the first sheet to obtain a first sheet with an adhesive layer. The second sheet was laminated onto the adhesive layer so that the anisotropic layer of he second sheet faced the adhesive layer, and the +Y direction of the first sheet coincided with the –X direction of the optically anisotropic layer on the aluminium plate. Subsequently, the aluminium plate was peeled from the laminate to obtain optical compensation sheet 11.

(Preparation of Optical Compensation Sheet 12)

A gelatin subbing layer was coated on each side of transparent support 1, and solution 1 was coated on each gelatin subbing layer, dried, subjected to rubbing treatment to obtain a sheet. With respect to the rubbing direction, when viewing the sheet from one side, the obverse surface of the sheet was rubbed in the +Y direction, and the reverse surface in the +X direction. Subsequently, LC-4 was coated on one side of the sheet employing a wire bar #5, dried, heated at 80° C. for 2 minutes, nitrogen purged at 98 kPa for 60 seconds, and hardened with ultraviolet light of 450 mJ under an oxygen concentration of 0.1% to give a hardened optically anisotropic layer. An optically anisotropic layer was provided on the other side of the sheet in the same manner as in the one side of the sheet. Thus, optical compensation sheet 12 was obtained.

(Preparation of Optical Compensation Sheet 13)

Optical compensation sheet 13 was prepared in the same manner as in optical compensation sheet 7, except that transparent support 2 was used.

(Preparation of Optical Compensation Sheet 14)

Optical compensation sheet 14 was prepared in the same manner as in optical compensation sheet 12, except that LC-4 was coated employing a wire bar #6. The optically anisotropic layer on each side of the sheet had a thickness of 2.2 μm, a retardation in the plane ($R_O$) of 171 nm and a retardation value ($R_e$) of 210 nm. The direction giving maximum of $R_e$ was inclined at 46 degrees to the direction normal to the optically anisotropic layer plane.

(Preparation of Optical Compensation Sheet 15)

Optical compensation sheet 15 was prepared in the same manner as in optical compensation sheet 12, except that LC-4 was coated employing a wire bar #3. The optically anisotropic layer on each side of the sheet had a thickness of 0.6 μm a retardation in the plane ($R_O$) of 46 nm and a retardation ($R_e$) of 60 nm. The direction giving maximum of $R_e$ was inclined at 21 degrees to the direction normal to the optically anisotropic layer plane.

(Preparation of Optical Compensation Sheet 16)

Optical compensation sheet 16 was prepared in the same manner as in optical compensation sheet 12, except that LC-4 diluted with methylethyl ketone by a factor of two was coated employing a wire bar #4. The optically anisotropic layer on each side of the sheet had a thickness of 0.5 lam, a retardation in the plane ($R_O$)of 37 nm and a retardation ($R_e$) at 46 nm. The direction giving maximum of $R_e$ was inclined at 18 degrees to the direction normal to the optically anisotropic layer plane.

(Preparation of Comparative Optical Compensation Sheet 4)

Comparative optical compensation sheet 4 was prepared in the same manner as in optical compensation sheet 16, except that solution 2 was used. The optically anisotropic layer on each side of the sheet had a thickness of 0.5 μm, a retardation in the plane ($R_O$) of 54 nm and a retardation ($R_e$) of 55 nm. The direction giving maximum of $R_e$ was inclined at 89 degrees to the direction normal to the optically anisotropic layer plane.

(Preparation of Comparative Optical Compensation Sheet 5)

A gelatin subbing layer was coated on each side of transparent support 1, and solution 2 was coated on each gelatin subbing layer, dried, subjected to rubbing treatment to obtain a sheet. With respect to the rubbing direction, when viewing the sheet from one side, the obverse surface of the sheet was rubbed in the +Y direction, and the reverse surface in the +X direction. Subsequently, LC-2 diluted with methylethyl ketone by a factor of two was coated on one side of the sheet employing a wire bar #3, dried, heated at 80° C. for 2 minutes, nitrogen purged at 98 kPa for 60 seconds, and hardened with ultraviolet light of 450 mJ under an oxygen concentration of 0.1% to give a hardened optically anisotropic layer. An optically anisotropic layer was provided on the other side of the sheet in the same manner as in the one side of the sheet. Thus, comparative optical compensation sheet 5 was obtained. The optically anisotropic layer on each side of the sheet had a thickness of 0.3 μm, a retardation in the plane ($R_O$) of 33 nm and a retardation ($R_e$) of 34 nm. The direction giving maximum of $R_e$ was inclined at 89 degrees to the direction normal to the optically anisotropic layer plane.

(Preparation of Comparative Optical Compensation Sheet 6)

Comparative optical compensation sheet 6 was prepared in the same manner as in comparative optical compensation sheet 6, except that LC-4 was used instead of LC-2 diluted with methylethyl ketone by a factor of two. The optically anisotropic layer on each side of the sheet had a thickness of 2.2 μm, a retardation in the plane ($R_0$) of 237 nm and a retardation ($R_e$) of 239 nm. The direction giving maximum of $R_e$ inclined at 88 degrees to the direction normal to the optically anisotropic layer plane.

(Preparation of Comparative Optical Compensation Sheet 7)

Comparative optical compensation sheet 7 was prepared in the same manner as in comparative optical compensation sheet 5, except that solution 1 was used and LC-3 diluted with methylethyl ketone by a factor of two was coated employing a wire bar #3. The optically anisotropic layer on each side of the sheet had a thickness of 0.3 μm, a retardation in the plane ($R_0$) of 11 nm and a retardation ($R_e$) of 24 nm. The direction giving a maximum value of $R_e$ was inclined at 15 degrees to the direction normal to the optically anisotropic layer plane.

Optical characteristics of the above optical compensation sheets 7 through 16 and comparative optical compensation sheets 4 through 7 are shown in Table 2.

Each optical compensation sheet was evaluated as follows:

(Evaluation Method)

When viewing angle of for example, optical compensation sheets 1 to 3 was measured, the optical compensation sheet on each side of the display panel of a 15 inches display MultiSync LCD1525J produced by NEC Co., Ldt., was peeled. Subsequently, each of optical compensation sheets 7 to 16 and comparative optical compensation sheets 4 to 7 was laminated to have a layer structure as shown in Table 3 in combination with the liquid crystal cell, and further, a polarizing plate was laminated on each side of the display panel adjusting its transmission axis (or absorption axis). Thus, a liquid crystal display sample employing each of optical compensation sheets 7 to 16 and comparative optical compensation sheets 4 to 7 was obtained. The resulting sample was evaluated for reversal area, hue and contrast employing an EZ-Contrast of ELDIM Co., Ltd.

TABLE 2

| Optical compensation sheet No. | Support | $R_0$ nm | $R_t$ nm | $R_0$ nm | $R_0$ nm | $R_t$ nm | *1 | Thickness μm | $R_0$ nm | $R_e$ (max) nm | *2 | *3 |
|---|---|---|---|---|---|---|---|---|---|---|---|---|
| 7 | 45c | 2.0 | 52.2 | — | — | — | 46 | 1.4 | 85 | 110 | 35 | 46a |
| 8 | 45c | 2.0 | 52.2 | — | — | — | 46 | 1.4 | 61 | 88 | 42 | 46a |
| 9 | 45 | 2.0 | 52.2 | 45a | 2.0 | 52.2 | 46 | 1.4 | 85 | 110 | 35 | 46a |
| 10 | 45c | 2.0 | 52.2 | — | — | — | 46 | 1.4 | 85 | 110 | 35 | 46a |
| 11 | 45e | 2.0 | 52.2 | — | — | — | 46 | 1.4 | 95 | 110 | 36 | 46a |
| 12 | 45e | 2.0 | 52.2 | — | — | — | 46 | 1.4 | 95 | 110 | 36 | 46a |
| 13 | 45c | 1.2 | 30.3 | — | — | — | 46 | 1.4 | 85 | 110 | 35 | 46a |
| 14 | 45e | 2.0 | 52.2 | — | — | — | 46 | 2.2 | 171 | 201 | 46 | 46a |
| 15 | 45e | 2.0 | 52.2 | — | — | — | 46 | 0.6 | 46 | 60 | 21 | 46a |
| 16 | 45e | 2.0 | 52.2 | — | — | — | 46 | 0.5 | 37 | 46 | 20 | 46a |
| Comp. 4 | 45e | 2.0 | 52.2 | — | — | — | 46 | 0.5 | 44 | 45 | 89 | 46a |
| Comp. 5 | 45e | 2.0 | 52.2 | — | — | — | 46 | 0.3 | 33 | 34 | 89 | 46a |
| Comp. 6 | 45e | 2.0 | 52.2 | — | — | — | 46 | 2.2 | 237 | 240 | 88 | 46a |
| Comp. 7 | 45e | 2.0 | 52.2 | — | — | — | 46 | 0.3 | 11 | 55 | 150 | 46a |

| Optical compensation sheet No. | Thickness μm | $R_0$ nm | $R_e$ (max) nm | *2 | *4 | $R_t$ nm | *5 | *6 | *7 |
|---|---|---|---|---|---|---|---|---|---|
| 7 | 1.4 | 95 | 110 | 36 | 42 | 134 | 7.1 | 1.10 | *8 |
| 8 | 1.0 | 65 | 86 | 31 | 40 | 116 | −4.4 | 0.91 | *8 |
| 9 | 1.4 | 85 | 110 | 35 | 29 | 186.2 | 8.1 | 1.09 | *8 |
| 10 | 1.4 | 95 | 110 | 36 | 29 | 186.2 | 8.1 | 1.09 | *8 |
| 11 | 1.4 | 95 | 110 | 36 | 41 | 134 | 7.1 | 1.10 | *9 |
| 12 | 1.4 | 95 | 110 | 36 | 41 | 134 | 7.1 | 1.10 | *8 |
| 13 | 1.4 | 95 | 110 | 36 | 47 | 112 | 6 | 1.10 | *8 |
| 14 | 2.2 | 171 | 201 | 46 | 38 | 202 | 16.2 | 1.12 | *9 |
| 15 | 0.6 | 46 | 60 | 21 | 55 | 98 | 4.4 | 1.04 | *8 |
| 16 | 0.5 | 37 | 46 | 89 | 54 | 86 | 4 | 1.01 | *8 |
| Comp. 4 | 0.5 | 44 | 45 | 89 | 0 | 84 | — | 0.66 | *10 |
| Comp. 5 | 0.3 | 33 | 34 | 89 | 0 | 78 | — | 0.67 | *10 |
| Comp. 6 | 2.2 | 237 | 240 | 88 | 2 | 340 | 0 | 0.61 | *10 |
| Comp. 7 | 0.3 | 11 | 55 | 15 | 76 | 59 | 0 | 0.68 | *11 |

*1: Optically anisotropic layer 1 (Layer A)
*2: Average tilt angle (degree)
*3: Optically anisotropic layer 2 (Layer B)
*4: Average tilt angle of sheet (degree)
*5: $R_e$ (589.3) − $R_e$ (480)
*6: $R_e$ (480)/$R_e$ (589.3)
*7: Stepwise varying (Layer A)/(Layer B)
*8: Increase/Decrease
*9: Decrease/Increase
*10: Parallel/Parallel
*11: Perpendicular/Perpendicular The lamination of the Liquid crystal cell and the optical compensation sheet gas carried out so that the direction giving maximum refractive index of the optically anisotropic layer on one side coincided with the transmission axis of the polarizing plate.

TABLE 3

| Liquid crystal display sample No. | Layer structure | Reversal boundary | | | | Hue | | Boundary of Contrast ratio 10:1 | | | | General evaluation |
|---|---|---|---|---|---|---|---|---|---|---|---|---|
| | | upper portions | lower portions | right side | left side | upper and lower portion | right and left sides | upper portions | lower portions | right side | left side | |
| Before peeling (LCD 1525) | — | 30° | 30° | 50° | 50° | D | D | 45° | 35° | 55° | 55° | — |
| 7 | FIG. 14(a) | 50° | not more than 65° | 50° | 50° | A | A | 40° | 45° | 55° | 55° | A |
| 8 | FIG. 14(a) | 50° | 55° | 45° | 45° | A | A | 40° | 45° | 55° | 55° | A |
| 9 | FIG. 11(a) | 50° | not more than 65° | 50° | 50° | A | A | 40° | 45° | 55° | 55° | A |
| 10 | FIG. 10(a) | 50° | not more than 65° | 50° | 50° | A | A | 40° | 45° | 55° | 55° | A |
| 11 | FIG. 10(a) | 50° | not more than 65° | 50° | 50° | A | A | 40° | 45° | 55° | 55° | A |
| 12 | FIG. 10(a) | 50° | not more than 65° | 50° | 50° | A | A | 40° | 45° | 55° | 55° | A |
| 13 | FIG. 14(a) | 48° | not more than 65° | 45° | 45° | A | A | 40° | 45° | 50° | 50° | A |
| 14 | FIG. 10(a) | 48° | 65° | 45° | 45° | A | B | 38° | 40° | 50° | 50° | B |
| 15 | FIG. 10(a) | 45° | 50° | 40° | 40° | A | B | 35° | 40° | 52° | 52° | B |
| 16 | FIG. 10(a) | 40° | 50° | 40° | 40° | A | B | 35° | 40° | 52° | 52° | B |
| Comp. 4 | FIG. 10(a) | 25° | 25° | 40° | 40° | C | B | 20° | 30° | 40° | 40° | C |
| Comp. 5 | FIG. 10(a) | 25° | 25° | 40° | 40° | C | B | 20° | 30° | 40° | 40° | C |
| Comp. 6 | FIG. 10(a) | 30° | 30° | 40° | 40° | C | B | 20° | 30° | 40° | 40° | C |
| Comp. 7 | FIG. 10(a) | 25° | 25° | 40° | 40° | C | B | 20° | 35° | 40° | 40° | C |

Comp.: Comparative

In "Hue" row of the above Table, when viewing the resulting samples obliquely, symbol "A" shows no color change, the same hue reproduction as CRT, and greatly improved hue reproduction as compared with conventional TN type liquid crystal panels, symbol "B" provides the results poorer than symbol "A" but greatly improved hue reproduction as compared with conventional TN type liquid crystal panels, symbol "C" provides improved hue reproduction as compared with conventional TN type liquid crystal panels but great color change and symbol "D" provides undesired hue change in the same degree as conventional TN type liquid crystal panels.

In "General evaluation" row of the above Table, when viewing the resulting samples obliquely, symbol "A" provides greatly improved results as compared with conventional TN type liquid crystal panels, symbol "B" provides the results poorer than symbol "A" but greatly improved results as compared with conventional TN type liquid crystal panels, and symbol "C" provides improved results as compared with conventional TN type liquid crystal panels but requires further improvement.

As is apparent from Table 3, inventive optical compensation sheets are markedly excellent in optical properties such as viewing angle properties in the reversal area particularly lower portions), image hue (in the upper portions, lower portions, right side, and left side), and contrast as compared to comparative optical compensation sheets.

Example 3

A cellulose triacetate film used as a support for conventional polarizing plates was prepared according to the following procedures.

One hundred weight parts of cellulose triacetate with an acetyl substitution degree of 2.92 and a viscosity average polymerization degree of 300, 2 weight parts of ethyl phthalylethyl glycolate. 10 weight parts of triphenylphosphate, 350 weight parts of methylene chloride, and 50 weight parts of ethanol were placed in a tightly sealed vessel gradually heated to 45° C. in 60 minutes while stirring slowly and completely dissolved to obtain a dope. The pressure in the vessel was 1.2 atmosphere.

Thereafter, the resulting dope was filtered, employing Azumi filter paper No. 244, produced by Azumi Roshi Co., Ltd., and allowed to stand for 24 hours to defoam.

Five weight parts of the above cellulose triacetate, 3 weight parts of tinubin 326 (produced by Ciba Specialty Co. Ltd.), 7 weight parts of tinubin 109 (produced by Ciba Specialty Co. Ltd.), 5 weight parts of tinubin 171 (produced by Ciba Specialty Co. Ltd.), 1 weight part of AEROSIL 200V (produced by Nihon Aerosil Co., Ltd.), and a mixture of 90 weight parts of methylene chloride and 10 weight parts of ethanol were mixed while stirring to obtain a UV absorbent solution.

One hundred weight parts of the above dope and 2 weight parts of the above solution were mixed in a static mixer, and was uniformly cast at 35° C. on a stainless steel belt from a die. The cast dope was dried for one minute on the stainless steel belt of which opposite surface was brought into contact with 35° C. water, further maintained for 15 seconds on the stainless steel belt of which opposite surface was brought into contact with 15° C. water, and then peeled from the belt.

At peeling, the residual solvent content of the web was 70 weight percent. The peeled web was dried at 120° C. for 10 minutes, while holding both edges of the peeled film. Thus, a cellulose triacetate film with a thickness of 80 μm was obtained. An anti-reflection layer was formed on the resulting film according to he method described in Japanese Patent O.P.I. Publication No. 11-246692. Thus, a cellulose triacetate film with an antireflection layer was obtained.

Next, a polarizing plate was prepared according to the following procedure.

One hundred parts of polyvinyl alcohol with an average polymerization degree of 3800 and a saponification degree of 99.5 mol % were dissolved in water to obtain a 5.0 weight % polyvinyl alcohol solution. The solution was cast on a polyethyene terephthalate film and dried to obtain a film. The resulting film was immersed in an aqueous solution mixture of an aqueous 0.2 g/liter iodine solution and an aqueous 65 g/liter potassium iodide at 30° C. for 240 seconds, then immersed in an aqueous solution mixture of an aqueous 70 g/liter boric acid solution and an aqueous 30 g/liter potassium iodide solution for 5 minutes, being transported while being uniaxially stretched by a factor of 6.0 in the transporting direction, and dried to obtain a polarized film.

Each of the above cellulose triacetate film and the cellulose triacetate film with an antireflection layer was wound on a 200 mm glass fiber reinforced resin core to obtain two roll films with a length of 1500 m and a width of 660 mm. The resulting roll films were immersed in an aqueous 2 mol/liter sodium hydroxide solution at 60° C. for one minutes washed with water and dried. Each of the resulting saponified roll films was continuously adhered roll to roll as a protective film, through a polyvinyl alcohol type adhesive to each side of the above obtained polarized film wound on another core, Thus, a roll of polarizing plate with an antireflection layer was obtained.

Fifty polarizing plates with a size of 5×5 cm were cut at intervals of 1 m from intermediate portions of the above obtained roll of the polarizing plate with an antireflection layer. The surface on the side without an antireflection layer of the resulting polarizing plate was adhered to optical compensation sheet 7 prepared in Example 2 of the same size as the cut polarizing plate. Thus, 50 polarizing plates with an antireflection layer and with an optical compensation sheet were obtained.

A polarizing plate having only the cellulose triacetate from on each side as a protective film was adhered to the optical compensation sheet 7 in the same manner as above. Thus, 50 polarizing plates with an optical compensation sheet were obtained.

Of the 50 polarizing plates with an antireflection layer and with an optical compensation sheet, the number of the polarizing plates without defects was counted. The number of the polarizing plates without defects was 34. Similarly, of the 50 polarizing plates without an antireflection layer and with an optical compensation sheet, the number of the polarizing plates without defects was counted. The number of the polarizing plates without defects was 42. As is apparent from the above, the yield of the polarizing plate, to which higher function such as the antireflection layer was added, was lowered.

EFFECTS OF THE INVENTION

The present invention can provide an optical compensation sheet in which, when viewing a liquid crystal display obliquely, viewing angle properties such as coloration or image reversal phenomenon in the displayed image are easily improved by the use of only one sheet, and can also provide a liquid crystal display employing the optical compensation sheet, in which viewing angle properties are greatly improved.

Disclosed embodiment can be varied by a skilled person without departing from the spirit and scope of the invention.

What is claimed is:

1. A liquid crystal display comprising a liquid crystal cell having a first surface and a second surface provided between a first polarizing plate and a second polarizing plate,
    wherein an optical compensation sheet is provided either between the first polarizing plate and the first surface of the liquid crystal cell or between the second polarizing plate and the second surface of the liquid crystal cell, and only provided on one side of the liquid crystal cell, the optical compensation sheet comprising at least two optically anisotropic layers each formed by orienting an optically anisotropic compound, and the orientation direction in the optically anisotropic layer plane of the optically anisotropic compound in the two optically anisotropic layers intersecting each other at an angle of from 80 to 100 degrees, and
    wherein, viewing the two optically anisotropic layers from one side of the optical compensation sheet,
    one of the two optically anisotropic layers, when the optically anisotropic compound is uniaxial, is oriented so that a first angle of the optic axis of the uniaxial optically anisotropic compound to the optical compensation sheet plane increases continuously or stepwise in the thickness direction of the optical compensation sheet, or when the optically anisotropic compound is biaxial, is oriented so that a second angle of a direction giving maximum refractive index of the biaxial optically anisotropic compound to the optical compensation sheet plane increases continuously or stepwise in the thickness direction of the optical compensation sheet, and
    the other optically anisotropic layer, when the optically anisotropic compound is uniaxial, is oriented so that the first angle decreases continuously or stepwise in the thickness direction of the optical compensation sheet, or when the optically anisotropic compound is biaxial, is oriented so that the second angle decreases continuously or stepwise in the thickness direction of the optical compensation sheet.

2. The liquid crystal display of claim 1, wherein the orientation direction of one of the two optically anisotropic layers is substantially perpendicular to the transmission axis of the first polarizing plate and is substantially parallel to the transmission axis of the second polarizing plate, or the orientation direction of one of the two optically anisotropic layers is substantially perpendicular to the transmission axis of the second polarizing plate and is substantially parallel to the transmission axis of the first polarizing plate.

3. The liquid crystal display of claim 1, wherein the optically anisotropic compound is a liquid crystal compound.

4. The liquid crystal display of claim 3, wherein the optically anisotropic compound is a positive uniaxial liquid crystal compound, the at least two optically anisotropic layers each are formed by orienting the positive uniaxial liquid crystal compound, and the orientation directions in the optically anisotropic layer plane of the liquid crystal compound in the two optically anisotropic layers intersect each other at an angle of from 80 to 100 degrees, and wherein, viewing the two optically anisotropic layers from one side of the optical compensation sheet, one of the two optically anisotropic layers is oriented so that the first angle of the optic axis of the liquid crystal compound to the optical compensation sheet plane increases continuously or stepwise in the thickness direction of the optical compensation sheet and the other optically anisotropic layer is oriented so that the first angle decreases continuously or stepwise in the thickness direction of the optical compensation sheet.

5. The liquid crystal display of claim 3, wherein the optically anisotropic compound is a biaxial liquid crystal compound, the at least two optically anisotropic layers each are formed by orienting the biaxial liquid crystal compound, and the orientation directions in the optically anisotropic layer plane of the liquid crystal compound in the two optically anisotropic layers intersect each other at an angle of from 80 to 100 degrees, and wherein, viewing the two optically anisotropic layers from one side of the optical compensation sheet, one of the two optically anisotropic layers is oriented so that the second angle of a direction giving maximum refractive index of the liquid crystal compound molecule to the optical compensation sheet plane increases continuously or stepwise in the thickness direction of the optical compensation sheet and the other optically anisotropic layer is oriented so that the second angle decreases continuously or stepwise in the thickness direction of the optical compensation sheet.

6. The liquid crystal display of claim 3, wherein the optically anisotropic compound is a negative uniaxial liquid crystal compound, the at least two optically anisotropic layers each are formed by orienting the negative uniaxial liquid crystal compound, and the orientation directions in the optically anisotropic layer plane of the liquid crystal compound in the two optically anisotropic layers intersect each other at an angle of from 80 to 100 degrees, and wherein, viewing the two optically anisotropic layers from one side of the optical compensation sheet, one of the two optically anisotropic layers is oriented so that the first angle of the optic axis of the liquid crystal compound to the optical compensation sheet plane increases continuously or stepwise in the thickness direction of the optical compensation sheet and the other optically anisotropic layer is oriented so that the first angle decreases continuously or stepwise in the thickness direction of the optical compensation sheet.

7. The liquid crystal display of claim 3, wherein the at least two optically anisotropic layers comprise a first optically anisotropic layer formed by orienting a positive uniaxial liquid crystal compound and a second optically anisotropic layer formed by orienting a biaxial liquid crystal compound, and the orientation directions in the optically anisotropic layer plane of the two liquid crystal compounds in the first and second optically anisotropic layers intersect each other at an angle of from 80 to 100 degrees, and wherein, viewing the two optically anisotropic layers from one side of the optical compensation sheet, the first optically anisotropic layer is oriented so that the first angle of the optic axis of the positive uniaxial liquid crystal compound to the optical compensation sheet plane increases continuously or stepwise in the thickness direction of the optical compensation sheet, and the second optically anisotropic layer is oriented so that the second angle of a direction giving maximum refractive index of the biaxial liquid crystal compound molecule to the optical compensation sheet plane decreases continuously or stepwise in the thickness direction of the optical compensation sheet.

8. The liquid crystal display of claim 1, the optical compensation sheet providing a wavelength dispersion property satisfying the following formulae (2) and (3)

$$R_e = (nx1 - ny1) \times d \qquad \text{formula (1)}$$

$$R_e(589.3) - R_e(480) \leq 45 \text{ nm} \qquad \text{formula (2)}$$

$$0.7 \leq R_e(480)/R_e(589.3) \leq 1.4 \qquad \text{formula (3)}$$

wherein, regarding the direction giving maximum refractive index in the plane of the optical compensation sheet as the X axis, the direction in the optical compensation sheet plane normal to the X axis as the Y axis, and the direction perpendicular to the optical compensation sheet plane as the Z axis, viewing the point (referred to also as the origin), at which the X, Y and Z axes intersect, from any point on the YZ plane perpendicular to the optical compensation sheet plane, and obtaining angle (θ) giving minimum of a retardation in the plane ($R_e$) at wavelength 590 nm represented by formula (1) above in the plane perpendicular to the viewing direction, retardation $R_e$ (589.3) in the plane perpendicular to the viewing direction at the wavelength 589.3 nm and retardation $R_e$ (480) in the plane perpendicular to the viewing direction at the wavelength 480 nm each are measured at angle (θ), and wherein nx1 represents the maximum refractive index at wavelength 590 nm in the plane perpendicular to the viewing direction, ny1 represents the minimum refractive index at wavelength 590 nm in the plane perpendicular to the viewing direction, and d represents a thickness of the sheet.

9. The liquid crystal display of claim 1, wherein the optical compensation sheet comprises at least one support.

10. The liquid crystal display of claim 9, wherein one layer of the two optically anisotropic layers is provided on one side of the support and the other layer of the two optically anisotropic layers is provided on the other side of the support.

11. The liquid crystal display of claim 9, wherein the two optically anisotropic layers are provided on one side of the support.

12. The liquid crystal display of claim 9, wherein the optical compensation sheet comprises two supports, wherein the two optically anisotropic layers are provided between the two supports.

13. The liquid crystal display of claim 9, wherein the support is transparent and substantially optically isotropic.

14. The liquid crystal display of claim 9, wherein the support is transparent and has a negative uniaxial optical property with the optic axis in the direction perpendicular to the optical compensation sheet plane.

15. The liquid crystal display of claim 14, wherein the support satisfies the following formulae (4) and (4'):

$$nx2 \geq ny2 > nz2 \qquad \text{formula (4)}$$

$$(nx2 - ny2)/nx2 \leq 0.01 \qquad \text{formula (4')}$$

wherein nx2 represents the maximum refractive index in the plane of the support, ny2 represents a refractive index in the plane of the support in the direction perpendicular to the direction giving nx2, and nz2 represents a refractive index in the support thickness direction.

16. The liquid crystal display of claim 15, wherein the support has a retardation ($R_t$) in the thickness direction of 5 to 250 nm.

17. The liquid crystal display of claim 9, wherein the support is comprised mainly of cellulose esters.

18. The liquid crystal display of claim 1, wherein at least one of the two optically anisotropic layers has a retardation ($R_0$) in the plane of 50 to 200 nm, $R_0$ being represented by formula (a):

$$R_0 = (nx - ny) \times d \qquad \text{formula (a)}$$

wherein nx represents the maximum refractive index in the plane of the optically anisotropic layer, ny represents a refractive index in the plane of the optically anisotropic layer in the direction perpendicular to the direction giving nx, and d represents a thickness of the optically anisotropic layer.

19. The liquid crystal display of claim 1, wherein at least one of the two optically anisotropic layers satisfies the following:

when the direction normal to the optically anisotropic layer is regarded as 90 degrees, the direction parallel to the optically anisotropic layer and giving maximum refractive index in the plane of the optically anisotropic layer is regarded as zero degrees, and retardation is measured at an incident angle of from 0 to 90 degrees to the optically anisotropic layer, angle θa (°), giving maximum retardation ($R_e$) in the plane at 590 nm represented by the following formula (1) in the plane perpendicular to the incident direction is in the range of from more than zero degrees to less then 90 degrees, and the maximum value of retardation is in the range of from 65 to 250 nm, $$R_e (nx1 - ny1) \times d \qquad \text{formula (1)}$$

wherein nx1 represents the maximum refractive index at 590 nm in the plane perpendicular to the incident direction, ny1 represents the minimum refractive index at 590 nm in the plane perpendicular to the incident direction, and d represents a thickness of the optical compensation sheet.

* * * * *